(12) United States Patent
Zheng et al.

(10) Patent No.: US 12,478,588 B2
(45) Date of Patent: Nov. 25, 2025

(54) NANOPARTICLE FOR PROTEIN DELIVERY

(71) Applicant: THE PENN STATE RESEARCH FOUNDATION, University Park, PA (US)

(72) Inventors: Siyang Zheng, State College, PA (US); Cheng Gong, Malden, MA (US)

(73) Assignee: The Penn State Research Foundation, University Park, PA (US)

( * ) Notice: Subject to any disclaimer, the term of this patent is extended or adjusted under 35 U.S.C. 154(b) by 43 days.

(21) Appl. No.: 17/058,925

(22) PCT Filed: May 28, 2019

(86) PCT No.: PCT/US2019/034119
§ 371 (c)(1),
(2) Date: Nov. 25, 2020

(87) PCT Pub. No.: WO2019/227091
PCT Pub. Date: Nov. 28, 2019

(65) Prior Publication Data
US 2021/0212955 A1 Jul. 15, 2021

Related U.S. Application Data

(60) Provisional application No. 62/676,341, filed on May 25, 2018.

(51) Int. Cl.
*A61K 9/51* (2006.01)
*A61K 38/00* (2006.01)
*A61K 38/02* (2006.01)
*A61K 39/00* (2006.01)

(52) U.S. Cl.
CPC .......... *A61K 9/5123* (2013.01); *A61K 9/5176* (2013.01); *A61K 9/5192* (2013.01); *A61K 38/02* (2013.01)

(58) Field of Classification Search
CPC .. A61K 9/5123; A61K 9/5176; A61K 9/5192; A61K 38/02; A61K 38/00; A61K 9/5115; A61K 9/5184; A61K 2039/55555; A61K 39/385; A61P 35/00
See application file for complete search history.

(56) References Cited

U.S. PATENT DOCUMENTS

| | | |
|---|---|---|
| 4,683,202 A | 7/1987 | Mullis |
| 4,708,871 A | 11/1987 | Geysen |
| 4,946,778 A | 8/1990 | Ladner et al. |
| 5,023,243 A | 6/1991 | Tullis |
| 5,190,931 A | 3/1993 | Inouye |
| 5,928,906 A | 7/1999 | Koster et al. |
| 6,103,489 A | 8/2000 | Arakaki et al. |
| 6,506,559 B1 | 1/2003 | Fire et al. |
| 2013/0337066 A1 | 12/2013 | Zhang et al. |

FOREIGN PATENT DOCUMENTS

| | | | | |
|---|---|---|---|---|
| WO | WO-2016000032 A1 | * | 1/2016 | ......... A61K 47/6949 |
| WO | 2017078609 A1 | | 5/2017 | |

OTHER PUBLICATIONS

Rani, Sweta, and Thomas Ritter. "The exosome—A naturally secreted nanoparticle and its application to wound healing." Advanced materials 28.27 (2016): 5542-5552 (Year: 2016).*
Li et al. ACS Nano 2017, 11, 7006-7018. (Year: 2017).*
Deria et al. J. Am. Chem. Soc. 2016, 138, 14449-14457. (Year: 2016).*
Franzen et al. The Journal of Urology, 195, 1331-1339, May 2016. (Year: 2016).*
Armstrong et al. ACS Nano 2017, 11, 69-83. (Year: 2017).*
Coumans et al. Circulation Research. 2017;120:1632-1648. (Year: 2017).*
Tiwari et al. Scientific reports 7.1 (2017): 12598. (Year: 2017).*
Ren et al. Chem. Commun., 2014, 50, 1000-1002. (Year: 2014).*
Dineen, K. The Jackson Laboratory. https://www.jax.org/news-and-insights/jax-blog/2016/august/women-in-science-remembering-henrietta-lacks, Aug. 1, 2016. (Year: 2016).*
International Search Report and Written Opinion for International Application No. PCT/US2019/034119 dated Sep. 23, 2019.
Illes, B., Hirschle, P., Barnert, S., Cauda, V., Wuttke, S., & Engelke, H. (2017). Exosome-Coated Metal-Organic Framework Nanoparticles: An Efficient Drug Delivery Platform. Chemistry of Materials, 29(19), 8042-8046. doi:10.1021/acs.chemmater.7b02358.
Agrwal, Sudhir, and John Goodchild. "Oligodeoxynucleoside methylphosphonates: synthesis and enzymic degradation." Tetrahedron letters 28.31 (1987): 3539-3542.
Andaloussi, Samir EL, et al. "Extracellular vesicles: biology and emerging therapeutic opportunities." Nature reviews Drug discovery 12.5 (2013): 347-357.
Banerjee, Rahul, et al. "High-throughput synthesis of zeolitic imidazolate frameworks and application to CO2 capture." Science 319.5865 (2008): 939-943.
Barth, Andreas. "Infrared spectroscopy of proteins." Biochimica et Biophysica Acta (BBA)—Bioenergetics 1767.9 (2007): 1073-1101.
Brodin, Jeffrey D., et al. "DNA-mediated cellular delivery of functional enzymes." Journal of the American Chemical Society 137.47 (2015): 14838-14841.
Butcher, Neville J., Gysell M. Mortimer, and Rodney F. Minchin. "Unravelling the stealth effect." Nature nanotechnology 11.4 (2016): 310-311.
Christian, Rosemarie B., et al. "Simplified methods for construction, assessment and rapid screening of peptide libraries in bacteriophage." Journal of molecular biology 227.3 (1992): 711-718.
Chu, Ted C., et al. "Aptamer: toxin conjugates that specifically target prostate tumor cells." Cancer research 66.12 (2006): 5989-5992.

(Continued)

*Primary Examiner* — Mina Haghighatian
(74) *Attorney, Agent, or Firm* — Buchanan Ingersoll & Rooney PC

(57) ABSTRACT

The present invention relates to compositions and methods for delivery of therapeutic agent. In certain aspects, the invention comprises a metal-organic framework nanoparticle encapsulating a protein. In some aspects, the metal-organic framework nanoparticle encapsulating a protein is coated with an extracellular vesicle membrane.

18 Claims, 46 Drawing Sheets

(56) References Cited

OTHER PUBLICATIONS

Cwirla, Steven E., et al. "Peptides on phage: a vast library of peptides for identifying ligands." Proceedings of the National Academy of Sciences 87.16 (1990): 6378-6382.
D'Astolfo, Diego S., et al. "Efficient intracellular delivery of native proteins." Cell 161.3 (2015): 674-690.
Devlin, James J., Lucy C. Panganiban, and Patricia E. Devlin. "Random peptide libraries: a source of specific protein binding molecules." Science 249.4967 (1990): 404-406.
Eckstein, Fritz, and Gerald Gish. "Phosphorothioates in molecular biology." Trends in biochemical sciences 14.3 (1989): 97-100.
Eide, David J. "Zinc transporters and the cellular trafficking of zinc." Biochimica et Biophysica Acta (BBA)—Molecular Cell Research 1763.7 (2006): 711-722.
Ellington, Andrew D., et al. "Targeting PSMA on tumor cells using novel aptamer-gelonin conjugates." (2005): 1455-1455. Abstract 6183.
Escola et al., 1998; Selective enrichment of tetraspan proteins on the internal vesicles of multivesicular endosomes and on exosomes secreted by human B-lymphocytes. Escola JM, Kleijmeer MJ, Stoorvogel W, Griffith JM, Yoshie O, Geuze Hj. J Biol Chem. Aug. 7, 1998; 273(32):20121-7.
Furukawa, H., and K. E. Cordova. "O, Keeffe, M.; Yaghi, OM The chemistry and applications of metal-organic frameworks." Science 341.6149 (2013): 1230444.
Gay, Laurie J., and Brunhilde Felding-Habermann. "Contribution of platelets to tumour metastasis." Nature Reviews Cancer 11.2 (2011): 123-134.
Ghosh, Partha, et al. "Intracellular delivery of a membrane-impermeable enzyme in active form using functionalized gold nanoparticles." Journal of the American Chemical Society 132.8 (2010): 2642-2645.
Gilleron, Jerome, et al. "Image-based analysis of lipid nanoparticle-mediated siRNA delivery, intracellular trafficking and endosomal escape." Nature biotechnology 31.7 (2013): 638-646.
Gu, Zhen, et al. "Tailoring nanocarriers for intracellular protein delivery." Chemical Society Reviews 40.7 (2011): 3638-3655.
Howarth, Ashlee J., et al. "Chemical, thermal and mechanical stabilities of metal- organic frameworks." Nature Reviews Materials 1.3 (2016): 1-15.
Hu, Che-Ming J., et al. "Nanoparticle biointerfacing by platelet membrane cloaking." Nature 526.7571 (2015): 118-121.
Huang, Xiao-Chun, et al. "Ligand-directed strategy for zeolite-type metal-organic frameworks: zinc (II) imidazolates with unusual zeolitic topologies." Angewandte Chemie International Edition 45.10 (2006): 1557-1559.
Iversen, Tore-Geir, Tore Skotland, and Kirsten Sandvig. "Endocytosis and intracellular transport of nanoparticles: Present knowledge and need for future studies." Nano today 6.2 (2011): 176-185.
Jaiswal, Siddhartha, et al. "CD47 is upregulated on circulating hematopoietic stem cells and leukemia cells to avoid phagocytosis." Cell 138.2 (2009): 271-285.
Jean, Steve, et al. "Starvation-induced MTMR 13 and RAB 21 activity regulates VAMP 8 to promote autophagosome-lysosome fusion." EMBO reports 16.3 (2015): 297-311.
Jensen, Samuel A., et al. "Spherical nucleic acid nanoparticle conjugates as an RNAi-based therapy for glioblastoma." Science translational medicine 5.209 (2013): 209ra152-209ra152.
Kamerkar, Sushrut, et al. "Exosomes facilitate therapeutic targeting of oncogenic KRAS in pancreatic cancer." Nature 546.7659 (2017): 498-503.
Kim, Mi-Young, et al. "Tumor self-seeding by circulating cancer cells." Cell 139.7 (2009): 1315-1326.
Koivusalo, Mirkka, et al. "Endocytic trafficking of sphingomyelin depends on its acyl chain length." Molecular biology of the cell 18.12 (2007): 5113-5123.
Kowal, J., et al. (2016). Proteomic comparison defines novel markers to characterize heterogeneous populations of extracellular vesicle subtypes. Proceedings of the National Academy of Sciences, 113(8), E968-E977. doi: 10.1073/pnas.1521230113.
Lässer, Cecilia, et al. "Human saliva, plasma and breast milk exosomes contain RNA: uptake by macrophages." Journal of translational medicine 9.1 (2011):9, 1-8.
Leader, Benjamin, Quentin J. Baca, and David E. Golan. "Protein therapeutics: a summary and pharmacological classification." Nature reviews Drug discovery 7.1 (2008): 21-39.
Liang, Kang, et al. "Biomimetic mineralization of metal-organic frameworks as protective coatings for biomacromolecules." Nature communications 6.1 (2015): 1-8.
Liu, Xiaojuan, et al. "CD47 blockade triggers T cell-mediated destruction of immunogenic tumors." Nature medicine 21.10 (2015): 1209-1215.
Lu, Yue, Wujin Sun, and Zhen Gu. "Stimuli-responsive nanomaterials for therapeutic protein delivery." Journal of controlled release 194 (2014): 1-19.
Macia, E., et al. "T. 110 Kirchhausen." Dev. Cell 10 (2006): 839-850.
Mitragotri, Samir, Paul A. Burke, and Robert Langer. "Overcoming the challenges in administering biopharmaceuticals: formulation and delivery strategies." Nature reviews Drug discovery 13.9 (2014): 655-672.
Monopoli, Marco P., et al. "Biomolecular coronas provide the biological identity of nanosized materials." Nature nanotechnology 7.12 (2012): 779-786.
Moody, Harold M., et al. "Regiospecific inhibition of DNA duplication by antisense phosphate-methylated oligodeoxynucleotides." Nucleic acids research 17.12 (1989): 4769-4782.
Moreira, Carla, et al. "Improving chitosan-mediated gene transfer by the introduction of intracellular buffering moieties into the chitosan backbone." Acta biomaterialia 5.8 (2009): 2995-3006.
Nischan, Nicole, et al. "Covalent attachment of cyclic TAT peptides to GFP results in protein delivery into live cells with immediate bioavailability." Angewandte Chemie International Edition 54.6 (2015): 1950-1953.
Ojida, Akio, et al. "Effective Disruption of Phosphoprotein—Protein Surface Interaction Using Zn (II) Dipicolylamine-Based Artificial Receptors via Two-Point Interaction." Journal of the American Chemical Society 128.6 (2006): 2052-2058.
Pack, Daniel W., David Putnam, and Robert Langer. "Design of imidazole-containing endosomolytic biopolymers for gene delivery." Biotechnology and Bioengineering 67.2 (2000): 217-223.
Pakulska, Malgosia M., Shane Miersch, and Molly S. Shoichet. "Designer protein delivery: From natural to engineered affinity-controlled release systems." Science 351, No. 6279 (2016).
Pan, Yichang, et al. "Rapid synthesis of zeolitic imidazolate framework-8 (ZIF-8) nanocrystals in an aqueous system." Chemical Communications 47.7 (2011): 2071-2073.
Parodi, Alessandro, et al. "Synthetic nanoparticles functionalized with biomimetic leukocyte membranes possess cell-like functions." Nature nanotechnology 8.1 (2013): 61-68.
Parolini, Isabella, et al. "Microenvironmental pH is a key factor for exosome traffic in tumor cells." Journal of Biological Chemistry 284.49 (2009): 34211-34222.
Raposo, Graca, et al. "B lymphocytes secrete antigen-presenting vesicles." Journal of Experimental Medicine 183.3 (1996): 1161-1172.
Reedijk, M., et al. "Tyr721 regulates specific binding of the CSF-1 receptor kinase insert to PI 3'-kinase SH2 domains: a model for SH2-mediated receptor-target interactions." The EMBO Journal 11.4 (1992): 1365-1372.
Roberge, Jacques Y., Xenia Beebe, and Samuel J. Danishefsky. "A strategy for a convergent synthesis of N-linked glycopeptides on a solid support." Science 269.5221 (1995): 202-204.
Schöttler, Susanne, et al. "Protein adsorption is required for stealth effect of poly (ethylene glycol)-and poly (phosphoester)-coated nanocarriers." Nature nanotechnology 11.4 (2016): 372-377.
Schwarze, Steven R., et al. "In vivo protein transduction: delivery of a biologically active protein into the mouse." Science 285.5433 (1999): 1569-1572.
Smith, Douglas M., Jakub K. Simon, and James R. Baker Jr. "Applications of nanotechnology for immunology." Nature Reviews Immunology 13.8 (2013): 592-605.

(56) References Cited

OTHER PUBLICATIONS

Sorkin, Alexander, and Mark Von Zastrow. "Signal transduction and endocytosis: close encounters of many kinds." Nature reviews Molecular cell biology 3.8 (2002): 600-614.
Stec, Wojciech J., et al. "Synthesis and absolute configuration of P-chiral O-isopropyl oligonucleotide triesters." Tetrahedron letters 26.18 (1985): 2191-2194.
Sun, Wujin, et al. "Self-assembled DNA nanoclews for the efficient delivery of CRISPR-Cas9 for genome editing." Angewandte Chemie 127.41 (2015): 12197-12201.
Tenzer, Stefan, et al. "Rapid formation of plasma protein corona critically affects nanoparticle pathophysiology." Nature nanotechnology 8.10 (2013): 772-781.
Ulysse, Luckner, Juanita Cubillos, and Jean Chmielewski. "Photoregulation of cyclic peptide conformation." Journal of the American Chemical Society 117.32 (1995): 8466-8467.
Van Niel et al., 2003 Intestinal epithelial exosomes carry MHC class II/peptides able to inform the immune system in mice. Van Niel G, Mallegol J, Bevilacqua C, Candalh C, Brugière S, Tomaskovic-Crook E, Heath JK, Cerf-Bensussan N, Heyman M. Gut. Dec. 2003; 52(12):1690-7.
Varkouhi, Amir K., et al. "Endosomal escape pathways for delivery of biologicals." Journal of Controlled Release 151.3 (2011): 220-228.
Veenendaal, Liesbeth M., et al. "In vitro and in vivo studies of a VEGF121/rGelonin chimeric fusion toxin targeting the neovasculature of solid tumors." Proceedings of the National Academy of Sciences 99.12 (2002): 7866-7871.
Wan, Yuan, et al. "Rapid magnetic isolation of extracellular vesicles via lipid-based nanoprobes." Nature biomedical engineering 1.4 (2017): 1-11.
Wang, Ming, et al. "Efficient delivery of genome-editing proteins using bioreducible lipid nanoparticles." Proceedings of the National Academy of Sciences 113.11 (2016): 2868-2873.
Wilhelm, Stefan, et al. "Analysis of nanoparticle delivery to tumours." Nature reviews materials 1.5 (2016): 1-12.
Wozniak, Ann L., et al. "Intracellular proton conductance of the hepatitis C virus p7 protein and its contribution to infectious virus production." PLoS pathogens 6.9 (2010): e1001087.
Wubbolts et al., 2003 Proteomic and biochemical analyses of human B cell-derived exosomes. Potential implications for their function and multivesicular body formation. Wubbolts R, Leckie RS, Veenhuizen PT, Schwarzmann G, Möbius W, Hoernschemeyer J, Slot JW, Geuze HJ, Stoorvogel W. J Biol Chem. Mar. 28, 2003; 278(13):10963-72.
Xiang, Jian, et al. "Antigen-loaded upconversion nanoparticles for dendritic cell stimulation, tracking, and vaccination in dendritic cell-based immunotherapy." ACS nano 9.6 (2015): 6401-6411.
Yang, Jian, et al. "Zr-based MOFs shielded with phospholipid bilayers: improved biostability and cell uptake for biological applications." Chemistry of Materials 29.10 (2017): 4580-4589.
Mn, Hao, et al. "Non-viral vectors for gene-based therapy." Nature Reviews Genetics 15.8 (2014): 541-555.
Mn, Hao, et al. "Therapeutic genome editing by combined viral and non-viral delivery of CRISPR system components in vivo." Nature biotechnology 34.3 (2016): 328-333.
Yu, Mikyung, et al. "Nanotechnology for protein delivery: Overview and perspectives." Journal of controlled release 240 (2016): 24-37.
Zhao, Muxun, et al. "Clickable protein nanocapsules for targeted delivery of recombinant p53 protein." Journal of the American chemical society 136.43 (2014): 15319-15325.
Zhou, Li, et al. "DNA-mediated Construction of Hollow Upconversion Nanoparticles for Protein Harvesting and Near-Infrared Light Triggered Release." Advanced Materials 26.15 (2014): 2424-2430.
Xi et al.; "Drug loading techniques for exosome-based drug delivery systems"; Pharmazie 76: 61-67 (2021); dated Dec. 23, 2020; 7 pages.

\* cited by examiner

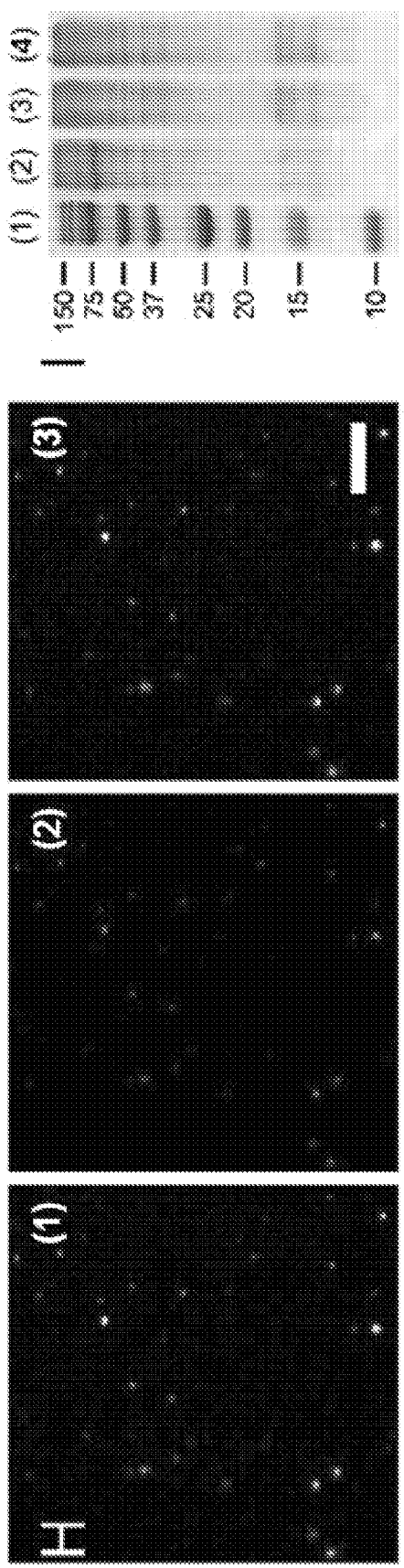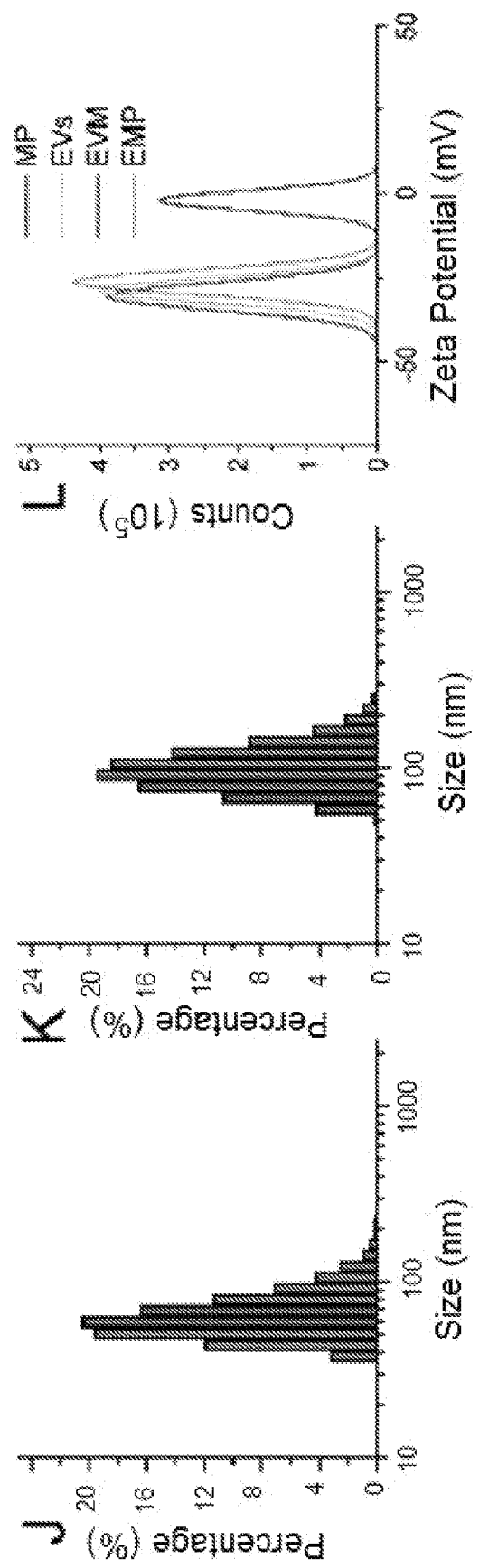
Figure 4H – Figure 4L

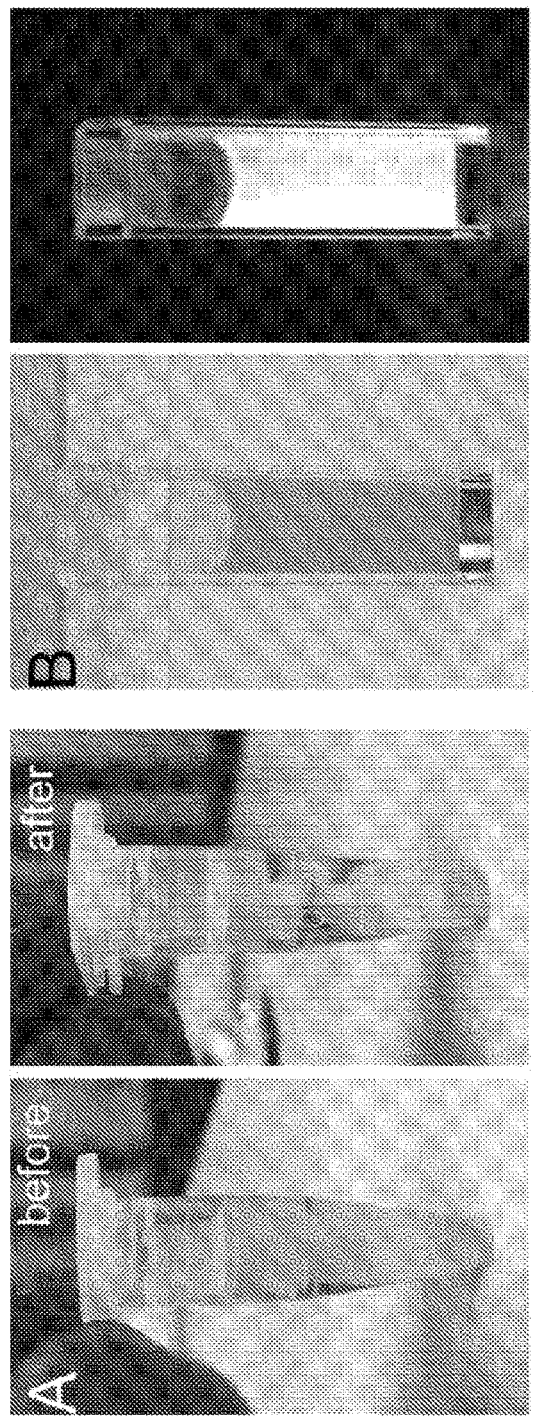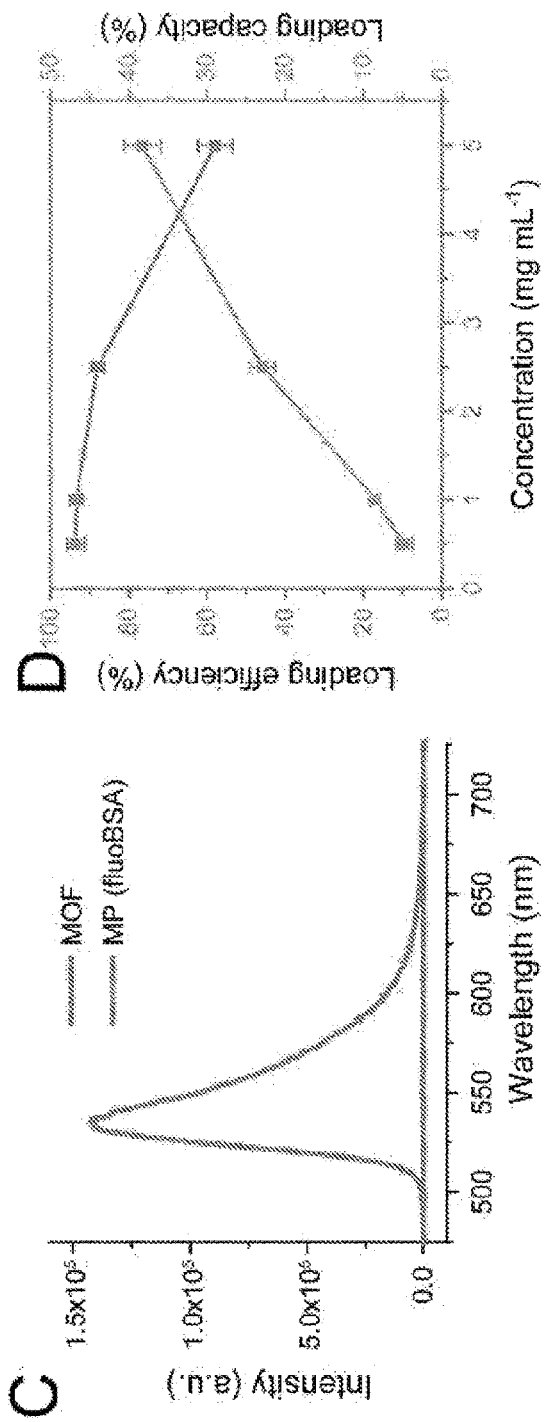
Figure 6A – Figure 6D

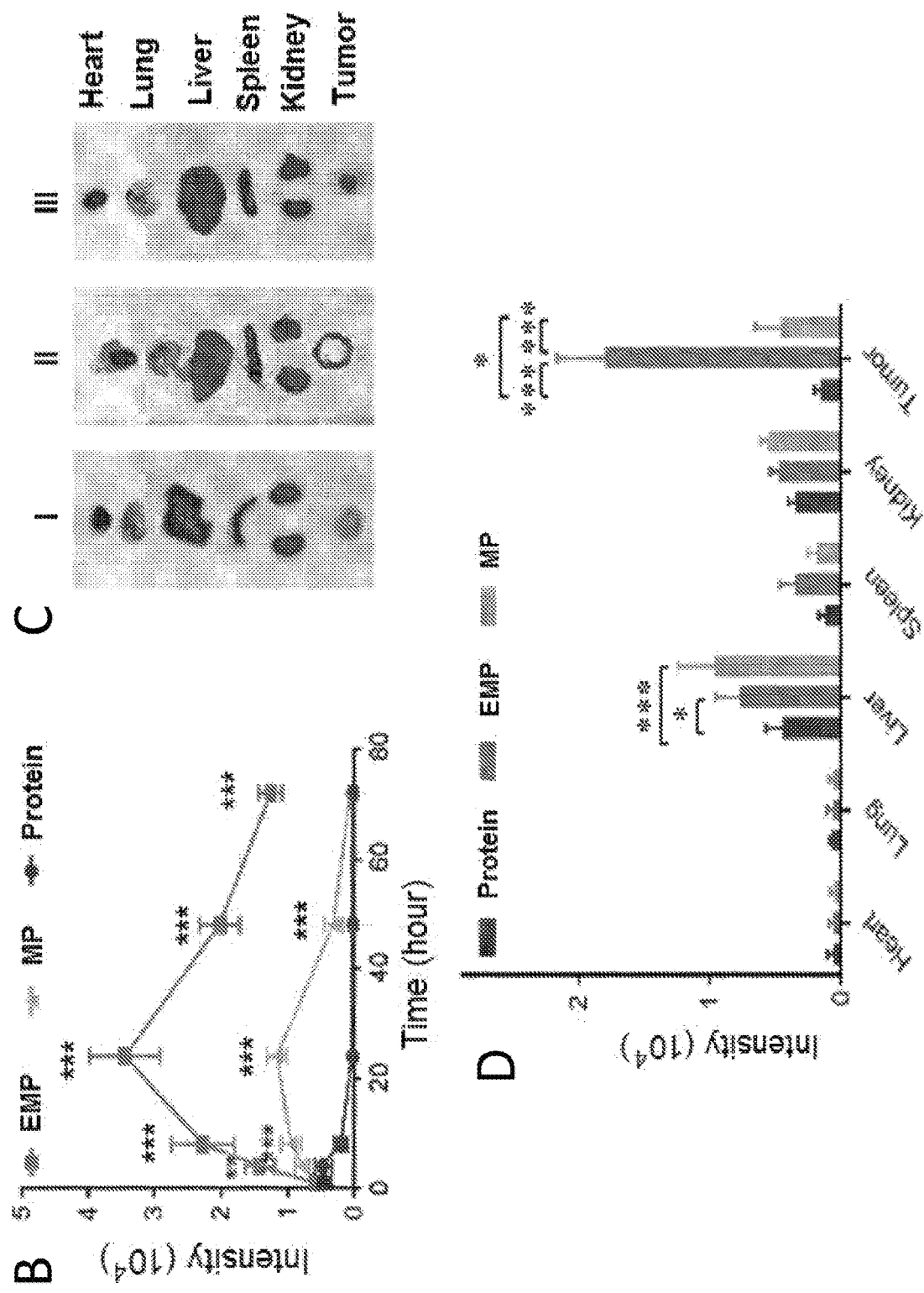
Figure 30B-D

NANOPARTICLE FOR PROTEIN DELIVERY

CROSS-REFERENCE TO RELATED APPLICATIONS

The present application is a national stage application filed under 35 U.S.C. § 371 of PCT International Application No. PCT/US2019/034119, which claims the benefit of U.S. Provisional application No. 62/676,341 filed May 25, 2018, which are incorporated by reference herein in their entirety.

STATEMENT OF FEDERALLY SPONSORED RESEARCH OR DEVELOPMENT

This invention was made with government support under Grant No. CA174508 awarded by the National Institutes of Health. The Government has certain rights in the invention.

BACKGROUND OF THE INVENTION

Proteins play dynamic and diverse roles in various cellular processes, including metabolism, signaling, energetics, gene regulation, and immune response. Many diseases arise from functional alteration or deficiency of intracellular proteins (Leader et al., 2008, Nat. Rev. Drug Discov., 7:21-39). Therefore, protein therapy has great potentials in cell manipulation and disease treatment (Lu et al., 2014, J. Control. Release, 194:1-19; Schwarze et al., 1999, Science, 285:1569-1572; Wang et al., 2016, Proc. Natl. Acad. Sci., 113:2868-2873). Protein therapeutics is often realized indirectly through transfection of DNA or mRNA encoding the effector protein (Jensen et al., 2013, Sci. Transl. Med., 5:209ra152; Yin et al., 2014, Nat. Rev. Genet., 15:541-555). Intracellular delivery of proteins offers high specificity, low toxicity, transient modulation of cell function, and no risk of genomic alteration for medical treatment, which distinguishes it from conventional gene therapy (Yin et al., 2016, Nat. Biotechnol., 34:328-333; Yu et al., 2016, J. Control. Release, 240:24-37). Nonetheless, the formulation and delivery of proteins are fundamentally challenging because proteins have poor cell membrane permeability and high susceptibility to degradation and denaturation (D'Astolfo et al., 2015, Cell, 161:674-690; Pakulska et al., 2016, Science, 351:aac4750). To address these issues, integration of proteins with cell penetrating molecules or functional nanocarriers to assist the internalization are some of the pioneer explorations (Nischan et al., 2015, Angew. Chem. Int. Ed., 54:1950-1953; Gu et al., 2011, Chem. Soc. Rev., 40:3638-3655; Ghosh et al., 2010, J. Am. Chem. Soc., 132:15319-15325; Brodin et al., 2015, J. Am. Chem. Soc., 137:14838-14841; Sun et al., 2015, Angew. Chem. Int. Ed., 54:12029-12033). Especially, polymeric capsules and cages can partly protect proteins to alleviate the fragility of proteins to degradation (Zhao et al., 2014, J. Am. Chem. Soc., 136:15319-15325; Liang et al., 2015, Nat. Commun., 6:7240), while low protein loading efficiency and capacity would limit the therapeutic effectiveness. Moreover, implementation of synthetic carriers in systemic delivery of protein is often suffered from rapid clearance by the phagocyte system (Butcher et al., 2016, Nat. Nanotechnol., 11:310-311; Monopoli et al., 2012, Nat. Nanotechnol., 7:779-786) and low delivery efficiency to the targeted tissue (Mitragotri et al., 2014, Nat. Rev. Drug Discov., 13:655-672), due to their exogenous nature and the lack of specific targeting domains.

Thus, there is a need in the art for novel carriers that perform targeted protein delivery. The present invention addresses this unmet need in the art

SUMMARY OF THE INVENTION

In one embodiment, the invention provides a metal organic framework nanoparticle. In one embodiment, the metal organic framework nanoparticle encapsulates a protein, a peptide, a peptidomimetic, an antibody, a nucleic acid, a small molecule chemical compound, or a protein nucleic acid complex.

In one embodiment, the nanoparticle comprises a zinc ion and an imidazole linker. In one embodiment, the imidazole linker is 2-methylimidazole. In one embodiment, the metal organic framework nanoparticle encapsulates a therapeutic protein or therapeutic peptide.

In one embodiment, the invention provides a nanoparticle comprising an inner core comprising a zinc ion and an imidazole linker encapsulating a peptide and an outer surface comprising an extracellular vesicle membrane (EVM). In one embodiment, the imidazole linker is 2-methylimidazole.

In one embodiment, the EVM is derived from an extracellular vesicle (EV) isolated from a cell. In one embodiment, the cell is a cell isolated from a patient. In one embodiment, wherein the EVM substantially lacks constituents of the EV from which the EVM is derived.

In one embodiment, the invention provides a method for making a metal-organic framework nanoparticle by self-assembly, the method comprising mixing a first aqueous solution comprising a metal ion is mixed with a second aqueous solution comprising an organic ligand. In one embodiment, the metal ion is zinc and the organic ligand is 2-methylimidazole.

In one embodiment, the metal-organic framework nanoparticle encapsulates a protein, wherein the second aqueous solution further comprises the protein. In one embodiment, the ratio of zinc to 2-methylimidazole is about 0.02 to about 2. In one embodiment, the ratio of zinc to 2-methylimidazole is about 0.2.

In one embodiment, the invention provides a method for coating a metal-organic framework nanoparticle with an extracellular vesicle membrane (EVM). In one embodiment, the method comprises extracting the membrane from an extracellular vesicle, forming a solution comprising a metal-organic framework nanoparticle and the membrane, and inducing self-assembly of the membrane on the metal-organic framework nanoparticle.

In one embodiment, extracting the membrane from the extracellular vesicle comprises incubating the extracellular vesicle in a hypotonic solution. In one embodiment, forming a solution comprising a metal-organic framework nanoparticle and the membrane comprises forming a solution comprising a metal-organic framework nanoparticle and the membrane at a membrane to nanoparticle ratio of about 10:1 to about 1:1.

In one embodiment, inducing self-assembly of the membrane on the metal-organic framework nanoparticle comprises ultrasonication and extrusion. In one embodiment, extracellular vesicle is isolated from a biological sample.

In one embodiment, the invention provides a method of targeted delivery of a protein to a cell, the method comprising administering to a subject a composition comprising a nanoparticle of claim 5, wherein the EVM comprises a targeting receptor or peptide. In one embodiment, the EVM is isolated from an extracellular vessel isolated from a biological sample from the subject. In one embodiment, the protein is released at acidic pH.

In one embodiment, invention provides a method for treating a disease or disorder in a subject. In one embodiment, the method comprises administering to a subject a composition comprising a nanoparticle of the invention. In one embodiment, the nanoparticle encapsulates a peptide, wherein the peptide treats the disease or disorder.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 2, comprising FIG. 2A depicts the SEM image of MOF nanoparticles assembled under ligand concentrations of 0.5 M. FIG. 2B depicts the SEM image of MOF nanoparticles assembled under ligand concentrations of 1.25 M. FIG. 2C depicts the SEM image of MOF nanoparticles assembled under ligand concentrations of 2.5 M. FIG. 2D depicts the SEM image of MOF nanoparticles assembled under ligand concentrations of 3.5 M. Scale bars in SEM images 2A-D are 500 nm. FIG. 2E depicts the size of MOF nanoparticles measured from SEM images (n=50). The size of the MOF particles decreases with the increase of the concentration of organic ligands. The nanoparticle size is ~70 nm when the ligand concentration is at 2.5 M.

FIG. 3, comprising FIG. 3A depicts the SEM image of MOF nanoparticles assembled under bovine serum albumin (BSA) concentrations of 0.5 mg mL$^{-1}$. FIG. 3B depicts the SEM image of MOF nanoparticles assembled under BSA concentrations of 1.0 mg mL$^{-1}$. FIG. 3C depicts the SEM image of MOF nanoparticles assembled under bovine serum albumin (BSA) concentrations of 2.5 mg mL$^{-1}$. FIG. 4D depicts the SEM image of MOF nanoparticles assembled under BSA concentrations of 5.0 mg mL$^{-1}$. Scale bars in SEM images 3A-D are 400 nm. FIG. 4E depicts the size of MP nanoparticles measured from SEM images (n=50). Increasing BSA concentration reduces the MP nanoparticle size. The MP nanoparticle size is ~50 nm when the protein concentration is 2.5 mg mL$^{-1}$.

FIG. 4, comprising FIGS. 4A-L, depicts the assembly and characterization of biomimetic nanoparticles. FIG. 4A depicts FTIR characterization of the assembly of the model proteins (BSA) in MP nanoparticles. FIG. 4B depicts N$_2$ adsorption-desorption isotherms, revealing that the MP nanoparticles have the similar porous structure to that of the MOF nanoparticles. The decrease of cavity volume of the MP nanoparticles is due to the encapsulation of proteins in the frame structure. FIG. 4C depicts the pH-responsive release kinetics of the guest proteins from the MP nanoparticles. The protein cargos are more efficiently released at pH=5.0 in comparison to pH=7.4. FIG. 4D depicts a TEM image of MP nanoparticles. FIG. 4E depicts a TEM image of EV nanoparticles. FIG. 4F depicts a TEM image of EVM nanoparticles. FIG. 4G depicts a TEM image of EMP nanoparticles. Scale bars for in TEM images 4D-G are 100 nm. FIG. 4H depicts a confocal microscopy image of EMP nanoparticles camouflaged with fluorescence-labeled EVM: (1) The green fluorescence is from encapsulated protein (fluorescein isothiocyanate tagged BSA, fluoBSA) in MP nanoparticles, (2) the red fluorescence is from the EVM, and (3) the merged fluorescence image. Scale bar: 2 µm. FIG. 4I depicts sodium dodecyl sulfate-polyacrylamide gel electrophoresis (SDS-PAGE) protein patterns of (1) markers, (2) EVs, (3) EVM, and (4) biomimetic nanoparticles without loading cargo proteins. FIG. 4J depicts the size distribution of MP nanoparticles measured by dynamic light scattering (DLS). FIG. 4K depicts the size distribution of EMP nanoparticles measured by DLS. FIG. 4L depicts the zeta potential of MP nanoparticles, EVs, EVM, and EMP nanoparticles.

FIG. 5, comprising FIG. 5A depicts SEM (left) and TEM (right) images of MOF nanoparticles. FIG. 5B depicts SEM (left) and TEM (right) images of MP (BSA) nanoparticles. FIG. 5C depicts SEM (left) and TEM (right) images of MP (Cytochrome c (Cyt c)) nanoparticles. FIG. 5D depicts SEM (left) and TEM (right) images of MP (Gelonin) nanoparticles. The scale bars on FIGS. 5A-D are 500 nm (SEM), 100 nm (TEM). FIG. 5E depicts X-ray powder diffraction (XRD) patterns of MOF and MP nanoparticles which show that the crystal structure of metal-organic frameworks has not been altered by incorporation of proteins. The aqueous assembly of MP nanoparticles could be extended to encapsulation of various proteins without noticeable modify the morphology, crystal structure and the matrix composition of the MP nanoparticles. FIG. 5F depicts Fourier transform infrared (FTIR) spectra of protein MOF and MP nanoparticles indicating the encapsulation of proteins. In comparison to the MOF matrix, the apparent absorption peaks at around 1667 cm$^{-1}$ from MP nanoparticles could be ascribed to the absorption of stretching vibrations from C=O groups of proteins in FTIR spectroscopy (Barth, 2007, BBA-Bioenergetics, 1767:1073-1101), which indicates the successful incorporation of proteins in MOF matrix.

FIG. 6, comprising FIGS. 6A-D, depicts the self-assembly of MP nanoparticles with proteins. FIG. 6A depicts photographs of fluoBSA solution before encapsulation by the one-pot aqueous self-assembly strategy and supernatant of the fluoBSA solution after removing the MP (fluoBSA) nanoparticles. The nearly colorless and transparent supernatant indicates that most of the fluoBSA are incorporated into the MP nanoparticles. FIG. 6B depicts photographs of MP (fluoBSA) under visible light (left) and UV light (right). FIG. 6C depicts fluorescent spectra of MOF and MP (fluoBSA) nanoparticles.

FIG. 6D depicts protein loading efficiency and loading capacity of MP (BSA) nanoparticles at different initial protein concentrations.

FIG. 7, comprising FIG. 7A depicts pore size distribution curves of MOF nanoparticles. FIG. 7B depicts pore size distribution curves of MP nanoparticles.

FIG. 8, comprising FIG. 8A depicts a schematic representation of the caged protein protection by MP nanoparticles. FIGS. 8B-E depict MALDI-TOF mass spectra of native protein Cyt c (FIGS. 8B and 8C) and MP (Cyt c) (FIGS. 8D and 8E) after incubation with trypsin for six hours. FIGS. 8B and 8D are the mass spectra of the expected peptide range, while FIGS. 8C and 8E are those of the expected protein range. #, ##, and ###represent the peaks of Cyt c of $[M+H]^+$ (m/z=M+H), $[M+2H]^{2+}$(m/z=(M+2)/2) and $[M+3H]^{3+}$(m/z=(M+3)/3), respectively.

FIG. 9, comprising FIG. 9A depicts an SEM image of the MP nanoparticles after immersion in PBS (pH=7.4) for 12 hours. FIG. 9B depicts an SEM image of the MP nanoparticles after immersion in PBS (pH=7.4) for 24 hours. The scale bars in SEM images 9A-B are 500 nm.

FIG. 11, comprising FIG. 11A depicts DLS analysis of EVs. FIG. 11B depicts DLS analysis of EVM.

FIG. 13, comprising FIGS. 13A-D depict TEM images, DLS, and zeta potential analyses of EMP nanoparticles assembled under different membrane-to-particle ratios: 10:1 (Figure A), 5:1 (Figure B), 2:1 (Figure C), and 1:1 (Figure D). The scale bars in TEM images 13A-D are 100 nm. The low membrane-to-particle ratio results in the serious aggregation of nanoparticles while the surface charge decreases. Well-defined nanoparticles were obtained at the membrane-to-particle ratio of 2:1. Further increase of the membrane-to-particle would result in an increase of the shell thickness of EMP nanoparticles and membrane residues.

FIG. 14, comprising FIG. 14A depicts an SEM image of an MP nanoparticle. FIG. 14B depicts an SEM image of an EMP nanoparticle. The scale bars for the SEM images 14A-B are 100 nm. In comparison to the MP nanoparticles, the surface morphology of the EMP nanoparticles is slightly different, due to the presence of biofunctional membrane.

FIG. 16, comprising FIGS. 4A-B depict the DLS size distribution (FIG. 4A) and TEM image (FIG. 4B) of EMP nanoparticles after storage for 1 day. FIGS. 4C-D depict the DLS size distribution (FIG. 4C) and TEM image (FIG. 4D) after storage for 3 days. The scale bars in TEM images 4B and 4D are 100 nm. After 24 hours storage at 4° C., the size, and morphology of the EMP nanoparticles have no noticeable changes, indicating the EMP nanoparticles are stable.

FIG. 17, comprising FIG. 17A depicts the fluorescence spectra of fluorescent IgG absorbed on MP biomimetic EMP and LMP nanoparticles. FIG. 17B depicts the quantification of fluorescent IgG (n=5) absorbed on MP, biomimetic EMP, and LMP nanoparticles. FIG. 17C depicts laser scanning fluorescence microscopy images of RAW264.7 cells incubated with MP, EMP, and LMP nanoparticles for 2 hours. The cell nuclei were stained with Hoechst (blue). Nanoparticles are green fluorescent from the encapsulated fluoBSA. Scale bar, 50 µm. FIG. 17D depicts the flow cytometry analysis of RAW264.7 cells incubated with MP, biomimetic EMP, and liposome-enveloped MP (LMP) nanoparticles for 2 hours. Negative control (NC) represents the RAW264.7 cells without any treatment. FIG. 17E depicts the quantification of the mean fluorescence intensity (MFI) of the RAW264.7 cell uptake. *** P<0.001.

FIG. 18, comprising FIG. 18A depicts laser scanning fluorescence microscopy images of MDA-MB-231, 293T, 3T3, CAD, MCF-7, and SY5Y cells incubated with EMP nanoparticles enveloped with EMV derived from MDA-MB-231 cells. The cell nuclei were stained with Hoechst (blue) and nanoparticles with encapsulated fluoBSA were green fluorescent. Scale bar: 50 µm. FIGS. 18B-C depict flow cytometry analysis of different cells incubated with EMP nanoparticles for 2 hours compared with cells without EMP nanoparticle treatment, respectively. * P<0.001. FIG. 18**D depicts flow cytometry analysis of MDA-MB-231 cells after protein transduction with bare protein, MP, EMP and LMP nanoparticles, respectively.

FIG. 19, comprising FIG. 19A depicts the flow cytometry analysis of MDA-MB-231 cells without any treatment. FIG. 19B depicts the laser scanning fluorescence microscopic analysis of MDA-MB-231 cells without any treatment. The scale bar in FIG. 19B is 50 µm.

FIG. 22, comprising FIG. 22A depicts the efficiency of EMP nanoparticles uptake by MDA-MB-231 cells in the presence of different endocytosis inhibitors. * P<0.001. FIG. 22B depicts laser scanning fluorescence analysis of time-dependent intracellular traffic of EMP nanoparticles in MDA-MB-231 cells. Scale bar: 10 µm. FIG. 22**C depicts mean vesicle pH in MDA-MB-231 cells at the different times. FIG. 22D depicts laser scanning microscopy analysis of MDA-MB-231 cells after incubation with EMP nanoparticles for the indicated periods of time. Intracellular pH was measured using a ratiometric sensor (LysoSensor Yellow/Blue DND-160). The yellow lines are plotted to indicate the cell borders. Scale bar: 20 μm.

FIG. 23, comprising FIG. 23A depicts an analysis of a control in MDA-MB0231 cells after 48 hours. Scale bar: 10 μm. FIG. 23B depicts an analysis the uptake of EMP nanoparticles in MDA-MB-231 cells after 48 hours.

FIG. 24, comprising FIG. 24A depicts an analysis of a negative control in MDA-MB-231 cells after 72 hours. Scale bar: 10 μm. FIGS. 24B-C depict the uptake of EMP nanoparticles by MDA-MB-231 cells after 72 hours.

FIG. 26, comprising FIG. 26A depicts laser scanning microscopy analysis of the intracellular evolution of zinc ions from the EMP nanoparticles at different time using the zinc ion selective sensor Zinpyr-1. Scale bar: 20 μm. FIG. 26B depicts the relative intracellular zinc ion concentrations at different times.

FIG. 28, comprising FIG. 28A depicts a viability assay of MDA-MB-231 cells in the presence of different concentrations of raw materials of MOF matrix without protein loading. FIG. 28B depicts a viability assay of MDA-MB-231 cells in the presence of MOF nanoparticles (MOF) and MOF nanoparticles enveloped with EV membrane (EMOF) without protein loading.

FIG. 29, comprising FIG. 29A depicts a live-dead assay revealing that EMP induces massive MDA-MB-231 tumor cell apoptosis upon incubation for a few hours. Scale bar: 50 μm. FIG. 29B depicts in vitro inhibition efficacy of gelonin, MP, and EMP nanoparticles on MDA-MB-231 tumor cells at different drug concentrations for 24 hours (n=3). * P<0.05,  P<0.01, * P<0.001. FIG. 29C depicts mouse xenograft MDA-MB-231 tumor growth curves after intratumoral injection of PBS, MOF, gelonin, and MP nanoparticles loaded with gelonin (n=5). Arrows represent the injection time points.  P<0.01,  P<0.01. FIG. 29D depicts the body weight variation of MDA-MB-231 tumor-bearing mice during various treatments (n=5).

FIG. 30, comprising FIGS. 30A-E, depicts that biomimetic EMP nanoparticles increase accumulation of therapeutic proteins in tumor through systemic administration. FIG. 30A depicts in vivo fluorescence imaging of the MDA-MB-231 tumor-bearing mice at different time after tail vein intravenous injection of ICG-labeled protein (gelonin) (I), EMP (II), and MP (III) nanoparticles. FIG. 30B depicts the time-dependent variation of fluorescence intensity at tumor sites from the mice (n=5).  P<0.01, * P<0.001. FIG. 30C depicts ex vivo fluorescence imaging of tumor and major organs collected from representative mice after euthanasia at day 3 post-injection. FIG. 30D depicts region of interest (ROI) analysis of the fluorescent signals from the tumors and major host organs (n=5). * P<0.05, *** P<0.001. FIG. 30E depicts laser scanning microscopy images of mouse tumor sections. Mice were euthanized at day 3 post-injection. The nuclei were stained with Hoechst (blue). Scale bar: 50 μm.

FIG. 31, comprising FIG. 31A depicts the MDA-MB-231 tumor growth curves after tail vein intravenous injection of PBS, gelonin, MP, and EMP nanoparticles (n=5). Arrows represent the injection time points. * P<0.05, ** P<0.01. FIG. 31B depicts the body weight variation of MDA-MB-231 tumor-bearing mice during treatment (n=5). FIG. 31C depicts representative images of MDA-MB-231 xenograft tumors of the mice after different treatments. FIG. 31D depicts the weight of the tumors collected from mice euthanized at day 22 with different treatments (n=5). FIG. 31E depicts representative images of histology analysis (H&E) of MDA-MB-231 xenograft tumors from the mice after different treatments. FIG. 31F depicts representative Terminal deoxynucleotidyl transferase dUTP nick end labeling (TUNEL) analysis of apoptosis in the tumor tissues after different treatments. The tumor sections were stained with fluorescein-dUTP (green) for apoptosis and Hoechst for the nucleus (blue). FIG. 31G depicts quantification results of the TUNEL assay (n=5). FIG. 31H depicts that histological (H&E) images of the major host organs collected on day 22 show no evident systemic toxicity of the biomimetic EMP nanoparticles. Scale bars in FIGS. 31E, 31F, and 31H are all 100 μm.

DETAILED DESCRIPTION

Figure 1:
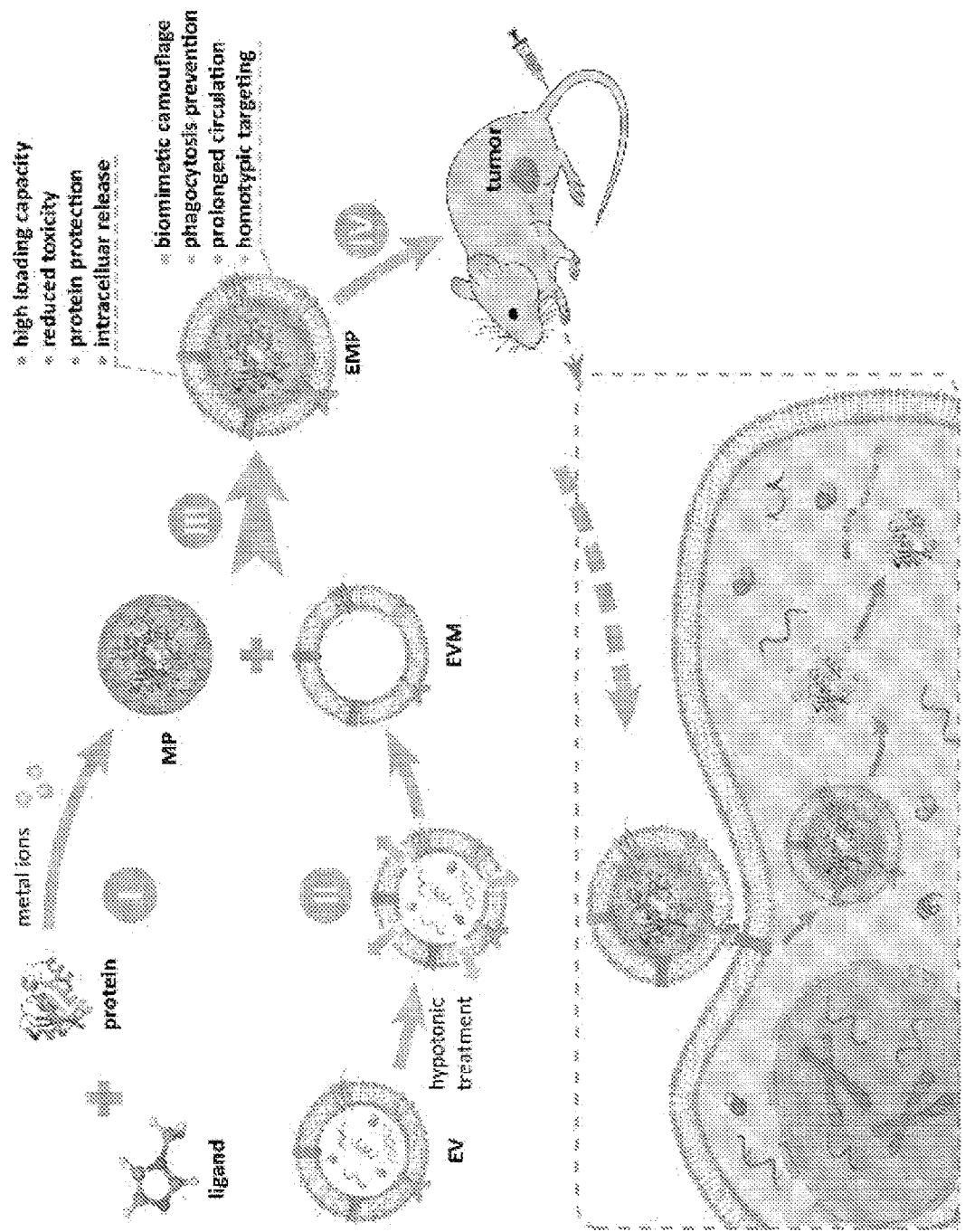
FIG. 1 depicts a schematic illustration of the procedure of preparing biomimetic EMP nanoparticles for homotypic targeting and intracellular delivery of guest proteins. I: caging protein cargo by self-assembly of blocks of inorganic nodes and organic ligands to synthesize MOF-protein (MP) nanoparticles. II: extraction of extracellular vesicle membrane (EVM) through a hypotonic treatment of extracellular vesicles (EV). III: self-assembly of EVM on MP nanoparticle surface by ultrasonication and extrusion to form EV-MOF-Protein (EMP) nanoparticles. IV: systemic and intracellular delivery of the guest proteins by EMP nanoparticles.

The present invention relates generally to compositions and methods for controlled delivery of a protein. In one embodiment, the invention provides a metal-organic framework nanoparticle encapsulating a protein. In one embodiment, the nanoparticle is uncoated. In one embodiment, the nanoparticle is coated. In one embodiment, the nanoparticle is coated with an extracellular vesicle membrane.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

The term "Metal Organic Framework", also termed MOF, refers to a crystalline compound comprising metal ions coordinated to rigid organic molecules to form one-, two-, or three-dimensional structures that are highly porous.

As used herein, the term "aperture size" of a MOF refers to the size of the connection windows between pores.

As used herein, the term "pore size" of a MOF refers to the diameter of the pore.

"Encoding" refers to the inherent property of specific sequences of nucleotides in a polynucleotide, such as a gene, a cDNA, or an mRNA, to serve as templates for synthesis of other polymers and macromolecules in biological processes having either a defined sequence of nucleotides (i.e., rRNA, tRNA and mRNA) or a defined sequence of amino acids and the biological properties resulting therefrom. Thus, a gene encodes a protein if transcription and translation of mRNA corresponding to that gene produces the protein in a cell or other biological system. Both the coding strand, the nucleotide sequence of which is identical to the mRNA sequence and is usually provided in sequence listings, and the non-coding strand, used as the template for transcription of a gene or cDNA, can be referred to as encoding the protein or other product of that gene or CDNA.

"Isolated" means altered or removed from the natural state. For example, a nucleic acid or a peptide naturally present in a living animal is not "isolated," but the same nucleic acid or peptide partially or completely separated from the coexisting materials of its natural state is "isolated." An isolated nucleic acid or protein can exist in substantially purified form, or can exist in a non-native environment such as, for example, a nanoparticle.

As used herein, the terms "peptide," "polypeptide," and "protein" are used interchangeably, and refer to a compound comprised of amino acid residues covalently linked by peptide bonds. A protein or peptide must contain at least two amino acids, and no limitation is placed on the maximum number of amino acids that can comprise a protein's or peptide's sequence. Polypeptides include any peptide or protein comprising two or more amino acids joined to each other by peptide bonds. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof.

As used herein, a "disease" is a state of health of an animal wherein the animal cannot maintain homeostasis, and wherein if the disease is not ameliorated then the animal's health continues to deteriorate.

As used herein, a "disorder" in an animal is a state of health in which the animal is able to maintain homeostasis, but in which the animal's state of health is less favorable than it would be in the absence of the disorder. Left untreated, a disorder does not necessarily cause a further decrease in the animal's state of health.

As used herein, the term "autologous" is meant to refer to any material derived from the same individual to which it is later to be re-introduced.

"Allogeneic" refers to a graft derived from a different animal of the same species.

As used herein with respect to the compositions of the invention, "biologically active" means that the compositions elicit a biological response in a mammal that can be monitored and characterized in comparison with an untreated mammal.

As used herein, the term "treating" means ameliorating the effects of, or delaying, halting or reversing the progress of a disease or disorder. The word encompasses reducing the severity of a symptom of a disease or disorder and/or the frequency of a symptom of a disease or disorder.

As used herein, the term "prevent" or "prevention" means no disorder or disease development if none had occurred, or no further disorder or disease development if there had already been development of the disorder or disease. Also considered is the ability of one to prevent some or all of the symptoms associated with the disorder or disease. Disease and disorder are used interchangeably herein.

As used herein, the term "medical intervention" means a set of one or more medical procedures or treatments that are required for ameliorating the effects of, delaying, halting or reversing a disease or disorder of a subject. A medical intervention may involve surgical procedures or not, depending on the disease or disorder in question. A medical intervention may be wholly or partially performed by a medical specialist, or may be wholly or partially performed by the subject himself or herself, if capable, under the supervision of a medical specialist or according to literature or protocols provided by the medical specialist.

As used herein, the terms "effective amount" or "therapeutically effective amount" or "pharmaceutically effective amount" of a composition are used interchangeably to refer to the amount of the composition that is sufficient to provide a beneficial effect to the subject to which the composition is administered. The term to "treat," as used herein, means reducing the frequency with which symptoms are experienced by a patient or subject or administering a composition to reduce the severity with which symptoms are experienced. An appropriate therapeutic amount in any individual case may be determined by one of ordinary skill in the art using routine experimentation.

By the term "specifically bind" or "specifically binds," as used herein, is meant that a first molecule (e.g., an antibody) preferentially binds to a second molecule (e.g., a particular antigenic epitope), but does not necessarily bind only to that second molecule. As used herein, a "prophylactic" or "preventive" treatment is a treatment administered to a subject who does not exhibit signs of a disease or disorder or exhibits only early signs of the disease or disorder for the purpose of decreasing the risk of developing pathology associated with the disease or disorder.

As used herein, a "therapeutic" treatment is a treatment administered to a subject who exhibits signs of pathology of a disease or disorder for the purpose of diminishing or eliminating those signs.

As used herein, the term "pharmaceutically acceptable" refers to a material, such as a carrier or diluent, which does not abrogate the biological activity or properties of the compound, and is relatively non-toxic, i.e., the material may be administered to an individual without causing undesirable biological effects or interacting in a deleterious manner with any of the components of the composition in which it is contained.

As used herein, a "pharmaceutically acceptable carrier" means a pharmaceutically acceptable material, composition or carrier, such as a liquid or solid filler, diluent, excipient, solvent or encapsulating material, involved in carrying or transporting a nanoparticle of the present invention within or to the subject such that it can perform its intended function. Typically, such nanoparticles are carried or transported from one organ, or portion of the body, to another organ, or portion of the body. Each carrier must be "acceptable" in the sense of being compatible with the other ingredients of the formulation, and not injurious to the patient. Some examples of materials that can serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and other non-toxic compatible substances employed in pharmaceutical formulations. As used herein "pharmaceutically acceptable carrier" also includes any and all coatings, antibacterial and antifungal agents, and absorption delaying agents, and the like that are compatible with the activity of the nanoparticle, and are physiologically acceptable to the subject. Supplementary active compounds can also be incorporated into the compositions.

As used herein, the term "subject" refers to a human or another mammal (e.g., primate, dog, cat, goat, horse, pig, mouse, rat, rabbit, and the like). In many embodiments of the present invention, the subject is a human being. In such embodiments, the subject is often referred to as an "individual" or a "patient." The terms "individual" and "patient" do not denote a particular age.

As used herein, the term "alkyl," by itself or as part of another substituent means, unless otherwise stated, a straight or branched chain hydrocarbon having the number of carbon atoms designated (i.e. $C_{1-6}$ means one to six carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Most preferred is $(C_1-C_6)$alkyl, particularly ethyl, methyl, isopropyl, isobutyl, n-pentyl, n-hexyl and cyclopropylmethyl.

As used herein, the term "substituted alkyl" means alkyl, as defined above, substituted by one, two or three substituents selected from the group consisting of halogen, —OH, alkoxy, —NH$_2$, —N(CH$_3$)$_2$, —C(═O)OH, trifluoromethyl, —C≡N, —C(═O)O(C$_1$-C$_4$)alkyl, —C(═O)NH$_2$, —SO$_2$NH$_2$, —C(═NH)NH$_2$, and —NO$_2$, preferably containing one or two substituents selected from halogen, —OH, alkoxy, —NH$_2$, trifluoromethyl, —N(CH$_3$) 2, and —C(═O)OH, more preferably selected from halogen, alkoxy and —OH. Examples of substituted alkyls include, but are not limited to, 2,2-difluoropropyl, 2-carboxycyclopentyl and 3-chloropropyl.

As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. Preferred are $(C_1-C_3)$ alkoxy, particularly ethoxy and methoxy.

As used herein, the term "halo" or "halogen" alone or as part of another substituent means, unless otherwise stated, a fluorine, chlorine, bromine, or iodine atom, preferably, fluorine, chlorine, or bromine, more preferably, fluorine or chlorine.

As used herein, the term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —O—CH$_2$—CH$_2$—CH$_3$, —CH$_2$—CH$_2$—CH$_2$—OH, —CH$_2$—CH$_2$—NH—CH$_3$, —CH$_2$—S—CH$_2$—CH$_3$, and —CH$_2$CH$_2$—S(═O)—CH$_3$. Up to two heteroatoms may be consecutive, such as, for example, —CH$_2$—NH—OCH$_3$, or —CH$_2$—CH$_2$—S—S—CH$_3$ As used herein, the term "aromatic" refers to a carbocycle or heterocycle with one or more polyunsaturated rings and having aromatic character, i.e. having (4n+2) delocalized π (pi) electrons, where n is an integer.

As used herein, the term "aryl," employed alone or in combination with other terms, means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl. Preferred are phenyl and naphthyl, most preferred is phenyl.

As used herein, the term "aryl-$(C_1-C_3)$alkyl" means a functional group wherein a one to three carbon alkylene chain is attached to an aryl group, e.g., —CH$_2$CH$_2$-phenyl. Preferred is aryl-CH$_2$— and aryl-CH(CH$_3$)—. The term "substituted aryl-$(C_1-C_3)$alkyl" means an aryl-$(C_1-C_3)$alkyl functional group in which the aryl group is substituted. Preferred is substituted aryl(CH$_2$)—. Similarly, the term "heteroaryl-$(C_1-C_3)$alkyl" means a functional group wherein a one to three carbon alkylene chain is attached to a heteroaryl group, e.g., —CH$_2$CH$_2$-pyridyl. Preferred is heteroaryl-(CH$_2$)—. The term "substituted heteroaryl-$(C_1-C_3)$ alkyl" means a heteroaryl-$(C_1-C_3)$alkyl functional group in which the heteroaryl group is substituted. Preferred is substituted heteroaryl-(CH$_2$)—.

As used herein, the term "heterocycle" or "heterocyclyl" or "heterocyclic" by itself or as part of another substituent means, unless otherwise stated, an unsubstituted or substituted, stable, mono- or multi-cyclic heterocyclic ring system that consists of carbon atoms and at least one heteroatom selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl. Examples of non-aromatic heterocycles include monocyclic groups such as aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin and hexamethyleneoxide.

Examples of heteroaryl groups include pyridyl, pyrazinyl, pyrimidinyl (particularly 2- and 4-pyrimidinyl), pyridazinyl, thienyl, furyl, pyrrolyl (particularly 2-pyrrolyl), imidazolyl, thiazolyl, oxazolyl, pyrazolyl (particularly 3- and 5-pyrazolyl), isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles include indolyl (particularly 3-, 4-, 5-, 6- and 7-indolyl), indolinyl, quinolyl, tetrahydroquinolyl, isoquinolyl (particularly 1- and 5-isoquinolyl), 1,2,3,4-tetrahydroisoquinolyl, cinnolinyl, quinoxalinyl (particularly 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (particularly 3-, 4-, 5-, 6- and 7-benzofuryl), 2,3-dihydrobenzofuryl, 1,2-benzisoxazolyl, benzothienyl (particularly 3-, 4-, 5-, 6-, and 7-benzothienyl), benzoxazolyl, benzothiazolyl (particularly 2-benzothiazolyl and 5-benzothiazolyl), purinyl, benzimidazolyl (particularly 2-benzimidazolyl), benztriazolyl, thioxanthinyl, carbazolyl, carbolinyl, acridinyl, pyrrolizidinyl, and quinolizidinyl.

The aforementioned listing of heterocyclyl and heteroaryl moieties is intended to be representative and not limiting.

As used herein, the term "substituted" means that an atom or group of atoms has replaced hydrogen as the substituent attached to another group.

For aryl, aryl-($C_1$-$C_3$)alkyl and heterocyclyl groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In another embodiment, the substituents vary in number between one and three. In yet another embodiment, the substituents vary in number between one and two. In yet another embodiment, the substituents are independently selected from the group consisting of $C_{1-6}$ alkyl, —OH, $C_{1-6}$ alkoxy, halo, amino, acetamido and nitro. In yet another embodiment, the substituents are independently selected from the group consisting of $C_{1-6}$ alkyl, $C_{1-6}$ alkoxy, halo, acetamido, and nitro. As used herein, where a substituent is an alkyl or alkoxy group, the carbon chain may be branched, straight or cyclic, with straight being preferred.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Metal-Organic Framework Nanoparticles

In one embodiment, the invention provides a nanoparticle encapsulating a therapeutic agent. In one embodiment, the therapeutic agent is a biologic therapeutic. In one embodiment the therapeutic agent is a protein, a peptide, a peptidomimetic, an antibody, a small molecule chemical compound, a protein nucleic acid complex (e.g. CRISPR/Cas9), a nucleic acid, or a vector. In one embodiment, the nanoparticle is a metal-organic framework nanoparticle. In one embodiment, the nanoparticle is uncoated. In one embodiment, the nanoparticle is coated. In one embodiment, the nanoparticle is partially coated.

A metal-organic framework comprises two components: a metal ion and an organic molecule linker. The organic linkers are typically mono-, di-, tri-, or tetravalent ligands.

In certain embodiments, the metal-organic framework has an aperture size smaller than the therapeutic agent. In one embodiment, the therapeutic agent has a diameter larger that the pore size of the MOF.

The invention contemplates any metal ion in the periodic table that can be used for the preparation of a MOF. Non-limiting metal ions are recited in the following groups: alkali metals (Li, Na, K, Rb, Cs, Fr), alkaline earth metals (Be, Mg, Ca, Sr, Ba, Ra), transition metals (Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg) and post-transition metals (Al, Ga, In, Tl, Sn, Pb, Bi), as well as metalloids (B, Si, Ge, As, Sb, Te, Po), lanthanides (La, Ce, Pr, Nd, Pm, Sm, Eu, Gd, Tb, Dy, Ho, Er, Tm, Yb, Lu) and actinides (Ac, Th, Pa, U, Np, Pu, Am, Cm, Bk, Cf, Es, Fm, Md, No, Lr). Metals not mentioned herein, or newly discovered metals, may also be used in the methods of the invention. In one embodiment, the metal ion is at least one selected from the group consisting of Zn, Cu, Ni, Al, Co, Fe, Mn, Cr, Cd, Mg, Ca, Zr, Gd, Eu, Tb, and mixtures thereof. In other embodiments, the metal ion is at least one selected from the group consisting of Zn, Cu, Fe, Gd, Al, Mg, and mixtures thereof. In one embodiment, the metal ion is Zn.

The metal ion or ions coordinate with one or more organic molecule linkers that act like ligand for the metal ion(s). The organic ligands according to the invention can be bidentate, tridentate, tetradentate or pluridentate, in that they may coordinate two, three, four or multiple metal ions through dative bonds. The ability to coordinate metal ions is conferred by certain functional groups of the organic linker. Non-limiting functional groups that can be contained by the organic linker to form a MOF are —COOH, —CSSH, —NO$_2$, —B(OH)$_2$, —SO$_3$H, —Ge(OH)$_3$, —Sn(OH)$_3$, —Si(SH)$_4$, —Ge(SH)$_4$, —Sn(SH)$_3$, —PO$_3$H, —AsO$_3$H, —AsO$_4$H, —P(SH)$_3$, As(SH)$_3$, C$_4$H$_2$O$_4$, —RSH, —RNH$_2$, —RNR—, —ROH, —RCN, —PO(OR)$_2$, —RN$_3$, wherein R is hydrogen, $C_{1-10}$ alkyl, alkylene, heterocycle, heteroaryl, or aryl group.

In one embodiment, the organic linker contains functional groups selected from the group consisting of a carboxylate, a phosphonate, an amine, an azide, a cyanide, a squaryl, an imidazole, and mixtures thereof.

In one embodiment, the linker is a methylimidazole. In one embodiment, the linker is a 2-methylimidazole.

In one embodiment, the metal-organic framework is ZIF-8, MIL-100 (Fe), chromium (III) terephthalate (MIL-101), MIL-53 comprising Al, Cr or Fe; MIL-47 comprising V; MIL-100 comprising Cr; and MIL-101 comprising Cr; UiO-66 comprising $Zr_6O_4(OH)_4$. Further examples of suitable metal-organic frameworks include zeolitic imidazolate frameworks (ZIF). Twelve ZIFs (termed ZIF-1 to -12) have been synthesized as crystals by copolymerization of either Zn(II) (ZIF-1 to -4, -6 to -8, and -10 to -11) or Co(II) (ZIF-9 and -12) with imidazolate-type links. The ZIF crystal structures are based on the nets of seven distinct aluminosilicate zeolites: tetrahedral Si(Al) and the bridging O are replaced with transition metal ion and imidazolate link, respectively. In addition, examples of mixed-coordination imidazolates based on garnet nets include Zn(II) and In(III) (ZIF-5).

In one embodiment, the metal-organic framework comprises zinc and 2-methylimidazole. In one embodiment, the metal-organic framework comprises zinc and imidazolate-2-carboxaldehyde. the metal-organic framework is a ZIF. In one embodiment, the metal-organic framework is selected from the group consisting of ZIF-8, ZIF-90, UIO-66, MIL-101, MIL-100, HKUST-1, Eu/Tb-BDC, and MIL-88A. In one embodiment, the metal-organic framework is selected from the group consisting of ZIF-8, and ZIF-90.

In one embodiment, the nanoparticle provided herein is a nanoparticle having any suitable size. In one embodiment, the nanoparticle provided herein has an average diameter of about 5 nm to about 1000 nm. In one embodiment, the nanoparticle has an average diameter of about 5 nm to about 500 nm. In one embodiment, the nanoparticle has an average diameter of about 10 nm to about 200 nm. In one embodiment, the nanoparticle has an average diameter of about 20 nm to about 200 nm. In one embodiment, the nanoparticle has an average diameter of about 10 nm to about 100 nm. In one embodiment, the nanoparticle has an average diameter of about 20 nm to about 100 nm.

In one embodiment, the nanoparticles have a high loading efficiency of the therapeutic agent. For example, in one embodiment, the nanoparticle has a 50%-100% loading efficiency of the therapeutic agent. In one embodiment, the nanoparticle has about 60% to about 100% loading efficiency of the therapeutic agent. In one embodiment, the nanoparticle has about 70% to about 100% loading efficiency of the therapeutic agent. In one embodiment, the nanoparticle has about 75% to about 100% loading efficiency of the therapeutic agent. In one embodiment, the nanoparticle has about 80% to about 100% loading efficiency of the therapeutic agent. In one embodiment, the nanoparticle has about 85% to about 100% loading efficiency of the therapeutic agent. In one embodiment, the nanoparticle has about 90% to about 100% loading efficiency of the therapeutic agent. In one embodiment, the nanoparticle has about 91% to about 100% loading efficiency of the therapeutic agent. In one embodiment, the nanoparticle has about 92% to about 100% loading efficiency of the therapeutic agent. In one embodiment, the nanoparticle has about 93% to about 100% loading efficiency of the therapeutic agent. In one embodiment, the nanoparticle has about 94% to about 100% loading efficiency of the therapeutic agent. In one embodiment, the nanoparticle has about 95% to about 100% loading efficiency of the therapeutic agent. In one embodiment, the nanoparticle has about 96% to about 100% loading efficiency of the therapeutic agent. In one embodiment, the nanoparticle has about 97% to about 100% loading efficiency of the therapeutic agent.

Method of Making Metal-Organic Framework Nanoparticles

In one aspect, the invention provides a method for making a metal-organic framework nanoparticle. In one embodiment, the metal-organic framework nanoparticles are made by self-assembly in an aqueous phase. In one embodiment, the method comprises mixing a first aqueous solution comprising a metal ion is mixed with a second aqueous solution comprising an organic ligand.

For example, in one embodiment, the method comprises mixing a first aqueous solution comprising 2-methylimidazole with a second aqueous solution comprising zinc nitrate. In one embodiment, the ration of zinc to 2-methylimidazole is about 0.2 to about 2. For example, in one embodiment, the method comprises mixing an aqueous solution comprising zinc nitrate at a concentration of about 0.5M with an aqueous solution comprising 2-methylimidazole at about 2.5M.

In one embodiment, the method further comprises agitating the mixture. In one embodiment, the mixture is agitated by stirring. In one embodiment, the mixture is agitated for about 5 minutes to about 1 hour. In one embodiment, the mixture is agitated for about 5 minutes, for about 10 minutes, for about 15 minutes, for about 20 minutes, for about 25 minutes, for about 30 minutes, for about 35 minutes, for about 40 minutes, or for about 45 minutes.

In one embodiment, the method further comprises collecting the metal-organic framework nanoparticle. In one embodiment, collecting the metal-organic framework nanoparticle comprises centrifuging the mixture.

In one aspect, the invention provides a method for making a metal-organic framework nanoparticle encapsulating a therapeutic agent. In one embodiment, the metal-organic framework nanoparticles encapsulating a therapeutic agent are made by self-assembly in an aqueous phase. In one embodiment, the method comprises creating a first aqueous solution comprising the therapeutic agent and an organic ligand with a second aqueous solution comprising a metal ion. In one embodiment, the therapeutic agent is a protein.

For example, in one embodiment, the method comprises mixing a first aqueous solution comprising 2-methylimidazole and the therapeutic agent with a second aqueous solution comprising zinc nitrate. In one embodiment, the ratio of zinc to 2-methylimidazole is about 0.02 to about 2. For example, in one embodiment, the method comprises mixing an aqueous solution comprising zinc nitrate at a concentration of about 0.5M with an aqueous solution comprising 2-methylimidazole at about 2.5M.

In one embodiment, the method further comprises agitating the mixture. In one embodiment, the mixture is agitated by stirring. In one embodiment, the mixture is agitated for about 5 minutes to about 1 hour. In one embodiment, the mixture is agitated for about 5 minutes, for about 10 minutes, for about 15 minutes, for about 20 minutes, for about 25 minutes, for about 30 minutes, for about 35 minutes, for about 40 minutes, or for about 45 minutes.

In one embodiment, the method provides for a high-efficiency loading of the therapeutic agent. For example, in one embodiment, the nanoparticle has a 50%-100% loading efficiency of the therapeutic agent. In one embodiment, the nanoparticle has about 60% to about 100% loading efficiency of the therapeutic agent. In one embodiment, the nanoparticle has about 70% to about 100% loading efficiency of the therapeutic agent. In one embodiment, the nanoparticle has about 75% to about 100% loading efficiency of the therapeutic agent. In one embodiment, the nanoparticle has about 80% to about 100% loading efficiency of the therapeutic agent. In one embodiment, the nanoparticle has about 85% to about 100% loading efficiency of the therapeutic agent. In one embodiment, the nanoparticle has about 90% to about 100% loading efficiency of the therapeutic agent. In one embodiment, the nanoparticle has about 91% to about 100% loading efficiency of the therapeutic agent. In one embodiment, the nanoparticle has about 92% to about 100% loading efficiency of the therapeutic agent. In one embodiment, the nanoparticle has about 93% to about 100% loading efficiency of the therapeutic agent. In one embodiment, the nanoparticle has about 94% to about 100% loading efficiency of the therapeutic agent. In one embodiment, the nanoparticle has about 95% to about 100% loading efficiency of the therapeutic agent. In one embodiment, the nanoparticle has about 96% to about 100% loading efficiency of the therapeutic agent. In one embodiment, the nanoparticle has about 97% to about 100% loading efficiency of the therapeutic agent.

Extracellular Vesicle Membrane Coated Metal-Organic Framework Nanoparticles

In one aspect the invention provides a nanoparticle comprising an inner core comprising a non-cellular material and an outer surface comprising a cellular membrane derived from a cell or a membrane derived from a virus. In one embodiment, the invention provides a nanoparticle comprising an inner core comprising a non-cellular material and an outer surface comprising an extracellular vesicle membrane (EVM). In one embodiment, the EVM increases the half life of the nanoparticle.

In general, the EVs are released by cells into the extracellular environment. In vivo, EVs are isolated from a variety of biological fluids, including but not limited to, blood, plasma, serum, urine, stool, semen, cerebrospinal fluid, prostate fluid, lymphatic drainage, bile fluid, and pancreatic secretions. The EVs are then separated using routine methods known in the art. In one embodiment, EVs are isolated from the supernatants of cultured cells. In one embodiment, the EVs are isolated from the supernatants of cultured cells which express a marker.

In one embodiment, the EVs are isolated from a biological fluid. In one embodiment, the EVs are isolated from the patient's biological fluid. In one embodiment, the EVs are isolated from a biological fluid autologous to the patient. In one embodiment, the EVs are isolated from a biological sample. In one embodiment, the EVs are isolated from the patient's biological sample. In one embodiment, the EVs are isolated from a biological sample autologous to the patient. In one embodiment, the EVs are isolated from a tumor. In one embodiment, the EVs are isolated from a tumor excised from the patient. In one embodiment, the EVs are isolated from a tumor autologous to the patient.

In one embodiment, the EVs isolated from a sample autologous the patient are isolated from a sample having the same biological markers as the patient. For example, in one embodiment the EVs are isolated from a tumor expressing EGFR autologous to the patient, wherein the patient has an EGFR positive tumor.

EVs may be derived from any type of cell. Exemplary cell types from which EVs may be derived include, but are not limited to, immune cells (e.g., macrophage, monocyte, B-cell, or T-cell), a tumor or cancer cell, epithelial cell, an endothelial cell, a neural cell, a stem cell, including a hematopoietic stem cell, a bone marrow stem cell, a mesenchymal stem cell, a cardiac stem cell, a neural stem cell, induced pluripotent stem cells (iPS), adipose tissue-derived stem cells, embryonic stem cells, umbilical cord blood derived stem cells, dendritic cells, and glial cells.

In one embodiment, the nanoparticle comprising an inner core comprising a non-cellular material and an outer surface comprising a cellular membrane substantially lacks constituents of the cell or EV from which the EVM is derived or constituents of the virus from which the viral membrane is derived. In one embodiment, the EVM substantially lacks constituents of the cell or EV from which the EVM is derived. For example, the present nanoparticle or EVM can lack, in terms of types and/or quantities, at least 10%, 20%, 30%, 40%, 50%, 60%, 70%, 80%, 90%, 95%, 96%, 97%, 98%, 99% or 100% of the constituents of the cell from which the cellular membrane is derived or constituents of the virus from which the viral membrane is derived.

In one embodiment, the nanoparticle of the present invention substantially maintains natural structural integrity and/or activity of the EVM. The structural integrity of the EVM includes primary, secondary, tertiary or quaternary structure of the cellular membrane, and the activity of the cellular membrane includes, but is not limited to, binding activity, receptor activity, signaling pathway activity, and any other activities a normal naturally occurring EVM would have. In certain embodiments, the nanoparticle of the present invention is biocompatible and/or biodegradable. For example, the present nanoparticle can maintain, in terms of types and/or quantities, at least 10%, 20%, 30%, 40%, 50%, 60%, 70%, 80%, 90%, 95%, 96%, 97%, 98%, 99% or 100% of the natural structural integrity or activity of the EVM.

In certain embodiments, the invention nanoparticle substantially lacks immunogenicity to a species or subject from which the EVM is derived. For example, the present nanoparticle can lack, in terms of types and/or quantities, at least 10%, 20%, 30%, 40%, 50%, 60%, 70%, 80%, 90%, 95%, 96%, 97%, 98%, 99% or 100% of the immunogenicity to a species or subject from which the EVM is derived.

In one embodiment, the EVM provided herein is an EVM having any suitable size. In one embodiment, the EVM provided herein has an average diameter of about 5 nm to about 1000 nm. In one embodiment, the EVM has an average diameter of about 5 nm to about 500 nm. In one embodiment, the EVM has an average diameter of about 10 nm to about 200 nm. In one embodiment, the EVM has an average diameter of about 20 nm to about 200 nm. In one embodiment, the EVM has an average diameter of about 10 nm to about 100 nm. In one embodiment, the EVM has an average diameter of about 20 nm to about 100 nm.

In one embodiment, the nanoparticles are coated with the EVM at a high efficiency. For example, in one embodiment, the nanoparticle is coated with the EVM at an efficiency of about 60% to about 100%. In one embodiment, the nanoparticle is coated with the EVM at an efficiency of about 70% to about 100%. In one embodiment, the nanoparticle is coated with the EVM at an efficiency of about 75% to about 100%. In one embodiment, the nanoparticle is coated with the EVM at an efficiency of about 80% to about 100%. In one embodiment, the nanoparticle is coated with the EVM at an efficiency of about 85% to about 100%. In one embodiment, the nanoparticle is coated with the EVM at an efficiency of about 90% to about 100%. In one embodiment, the nanoparticle is coated with the EVM at an efficiency of about 91% to about 100%. In one embodiment, the nanoparticle is coated with the EVM at an efficiency of about 92% to about 100%. In one embodiment, the nanoparticle is coated with the EVM at an efficiency of about 93% to about 100%. In one embodiment, the nanoparticle is coated with the EVM at an efficiency of about 94% to about 100%. In one embodiment the nanoparticle is coated with the EVM at an efficiency of about 95% to about 100%. In one embodiment, the nanoparticle is coated with the EVM at an efficiency of about 96% to about 100%. In one embodiment, the nanoparticle is coated with the EVM at an efficiency of about 97% to about 100%.

Method of Making Extracellular Vesicle Membrane Coated Metal-Organic Framework Nanoparticles In one aspect, the invention provides a method for coating a metal-organic framework nanoparticle with an EVM. In one embodiment, the invention provides a method for coating a nanoparticle with an EVM. In one embodiment, the method comprises extracting the membrane from an extracellular vesicle, forming a solution comprising a metal-organic framework nanoparticle and the membrane, and inducing self-assembly of the membrane on the metal-organic framework nanoparticle.

In one embodiment, the method comprises isolating an extracellular vesicle, extracting the membrane from the extracellular vesicle, forming a solution comprising a metal-organic framework nanoparticle and the membrane, and inducing self-assembly of the membrane on the metal-organic framework nanoparticle.

In one embodiment, extracting the membrane from the extracellular vesicle comprises incubating the extracellular vesicle in a hypotonic solution. In one embodiment, the extracellular vesicle is incubated in a hypotonic solution for about 1 hour to about 72 hours. In one embodiment, the extracellular vesicle is incubated in a hypotonic solution for about 1 hour, about 2 hours, about 3 hours, about 4 hours, about 5 hours, about 6 hours, about 7 hours, about 8 hours, about 12 hours, about 18 hours, about 24 hours, about 36 hours, about 48 hours, or about 72 hours. In one embodiment, the extracellular vesicle is incubated in a hypotonic solution at about 1° C. to about 25° C. In one embodiment, the extracellular vesicle is incubated in a hypotonic solution at about 1° C. to about 7° C. In one embodiment, the extracellular vesicle is incubated in a hypotonic solution at about 1° C., about 2° C., about 3° C., about 4° C., about 5° C., or about 6° C.

In one embodiment, extracting the membrane from the extracellular vesicle substantially removes constituents of extracellular vesicle from. For example, extracting the membrane from an extracellular vesicle isolated from a tumor cell substantially removes the tumorigenic contents of the EV. In one embodiment, extracting the membrane from an extracellular vesicle isolated from a tumor cell substantially removes EV proteins, EV nucleic acids or both. In one embodiment, EVM can lack, in terms of types and/or quantities, at least 10%, 20%, 30%, 40%, 50%, 60%, 70%, 80%, 90%, 95%, 96%, 97%, 98%, 99% or 100% of the constituents of the EV from which the EVM membrane is derived.

In one embodiment, forming a solution comprising a metal-organic framework nanoparticle and the membrane comprises forming a solution comprising a metal-organic framework nanoparticle and the membrane at a membrane to nanoparticle ratio of about 10:1 to about 1:1. In one embodiment, the membrane to nanoparticle ratio is about 5:1, about 4.5:1, about 4:1, about 3.5:1, about 3:1, about 2.5:1, about 2:1, or about 1.5:1. In one embodiment, the membrane to nanoparticle ratio is about 2:1. In one embodiment the membrane concentration was determined using concentration of protein in the membrane.

In one embodiment, inducing self-assembly of the membrane on the metal-organic framework nanoparticle comprises ultrasonication and extrusion. In one embodiment, inducing self-assembly of the membrane on the metal-organic framework nanoparticle comprises incubating the solution for about 1 second to about 72 hours.

In general, the EVs are released by cells into the extracellular environment. In vivo, EVs may be isolated from a variety of biological fluids, including but not limited to, blood, plasma, serum, urine, stool, semen, cerebrospinal fluid, prostate fluid, lymphatic drainage, bile fluid, and pancreatic secretions. The EVs can be isolated using routine methods known in the art. In one embodiment, EVs are isolated from the supernatants of cultured cells using differential ultracentrifugation. In another embodiment, EVs are separated from nonmembranous particles, using their relatively low buoyant density (Raposo et al., 1996; Escola et al., 1998; van Niel et al., 2003; Wubbolts et al., 2003). Kits for such isolation are commercially available, for example, from Qiagen, In Vitrogen and SBI.

EVs may be derived from any type of cell. Exemplary cell types from which EVs may be derived include, but are not limited to, immune cells (e.g., macrophage, monocyte, B-cell, or T-cell), a tumor or cancer cell, epithelial cell, an endothelial cell, or a neural cell, a stem cell, including a hematopoietic stem cell, a bone marrow stem cell, a mesenchymal stem cell, a cardiac stem cell, a neural stem cell.

Biological samples can also be obtained from other sources known in the art, including whole blood, serum, plasma, urine, interstitial fluid, peritoneal fluid, cervical swab, tears, saliva, buccal swab, skin, cerebrospinal fluid, or other tissues including, for example, brain tissues. Samples can be enriched for EVs through positive selection, negative selection, or a combination of positive and negative selection. In some embodiments, EVs are directly captured. In other embodiments, blood cells are captured and EVs are collected from the remaining biological samples. In some embodiments, the EVs enriched in the biological samples are exosomes, microparticles, microvesicles, nanosomes, or ectosomes.

Samples can also be enriched for EVs based on differences in the biochemical properties of EVs. For example, samples can be enriched for EVs based on antigen, nucleic acid, metabolic, gene expression, or epigenetic differences. In some of the embodiments based on antigen differences, antibody-conjugated magnetic or paramagnetic beads in magnetic field gradients or fluorescently labeled antibodies with flow cytometry are used. In some of the embodiments based on nucleic acid differences, flow cytometry is used. In some of the embodiments based on metabolic differences, dye uptake/exclusion measured by flow cytometry or another sorting technology is used. In some of the embodiments based on gene expression, cell culture with cytokines is used. Samples can also be enriched for EVs based on other biochemical properties known in the art. For example, samples can be enriched for EVs based on pH or motility. Further, in some embodiments, more than one method is used to enrich for EVs. In other embodiments, samples are enriched for EVs using antibodies, ligands, or soluble receptors.

In one embodiment, the method provides for a high-efficiency coating of the nanoparticle with the EVM. For example, in one embodiment, the nanoparticle is coated with the EVM at an efficiency of 50%-100%. In one embodiment, the nanoparticle is coated with the EVM at an efficiency of about 60% to about 100%. In one embodiment, the nanoparticle is coated with the EVM at an efficiency of about 70% to about 100%. In one embodiment, the nanoparticle is coated with the EVM at an efficiency of about 75% to about 100%. In one embodiment, the nanoparticle is coated with the EVM at an efficiency of about 80% to about 100%. In one embodiment, the nanoparticle is coated with the EVM at an efficiency of about 85% to about 100%. In one embodiment, the nanoparticle is coated with the EVM at an efficiency of about 90% to about 100%. In one embodiment, the nanoparticle is coated with the EVM at an efficiency of about 91% to about 100%. In one embodiment, the nanoparticle is coated with the EVM at an efficiency of about 92% to about 100%. In one embodiment, the nanoparticle is coated with the EVM at an efficiency of about 93% to about 100%. In one embodiment, the nanoparticle is coated with the EVM at an efficiency of about 94% to about 100%. In one embodiment the nanoparticle is coated with the EVM at an efficiency of about 95% to about 100%. In one embodiment, the nanoparticle is coated with the EVM at an efficiency of about 96% to about 100%. In one embodiment, the nanoparticle is coated with the EVM at an efficiency of about 97% to about 100%.

Proteins and Peptides

In one embodiment, the present invention provides a nanoparticle encapsulating a protein or peptide. The peptide of the present invention may be made using chemical methods. For example, peptides can be synthesized by solid phase techniques (Roberge J Y et al (1995) Science 269: 202-204), cleaved from the resin, and purified by preparative high performance liquid chromatography. Automated synthesis may be achieved, for example, using the ABI 431 A Peptide Synthesizer (Perkin Elmer) in accordance with the instructions provided by the manufacturer.

The peptide may alternatively be made by recombinant means or by cleavage from a longer polypeptide. The composition of a peptide may be confirmed by amino acid analysis or sequencing.

The peptides can be post-translationally modified. For example, post-translational modifications that fall within the scope of the present invention include signal peptide cleavage, glycosylation, acetylation, isoprenylation, proteolysis, myristoylation, protein folding and proteolytic processing, etc. Some modifications or processing events require introduction of additional biological machinery. For example, processing events, such as signal peptide cleavage and core glycosylation, are examined by adding canine microsomal membranes or *Xenopus* egg extracts (U.S. Pat. No. 6,103,489) to a standard translation reaction.

The peptides may include unnatural amino acids formed by post-translational modification or by introducing unnatural amino acids during translation. A variety of approaches are available for introducing unnatural amino acids during protein translation. A peptide or protein of the invention may be phosphorylated using conventional methods such as the method described in Reedijk et al. (The EMBO Journal 11 (4): 1365, 1992).

The nanoparticle may also encapsulate cyclic peptides. Cyclization of peptide may allow the peptide to assume a more favorable conformation for association with other molecules. Cyclization may be achieved using techniques known in the art. For example, disulfide bonds may be formed between two appropriately spaced components having free sulfhydryl groups, or an amide bond may be formed between an amino group of one component and a carboxyl group of another component. Cyclization may also be achieved using an azobenzene-containing amino acid as described by Ulysse, L., et al., J. Am. Chem. Soc. 1995, 117, 8466-8467. The components that form the bonds may be side chains of amino acids, non-amino acid components or a combination of the two. In an embodiment of the invention, cyclic peptides may comprise a beta-turn in the right position. Beta-turns may be introduced into the peptides of the invention by adding the amino acids Pro-Gly at the right position.

It may be desirable to produce a cyclic peptide which is more flexible than the cyclic peptides containing peptide bond linkages as described above. A more flexible peptide may be prepared by introducing cysteines at the right and left position of the peptide and forming a disulfide bridge between the two cysteines. The two cysteines are arranged so as not to deform the beta-sheet and turn. The peptide is more flexible as a result of the length of the disulfide linkage and the smaller number of hydrogen bonds in the beta-sheet portion. The relative flexibility of a cyclic peptide can be determined by molecular dynamics simulations.

The peptide may be synthesized by conventional techniques. For example, the peptides or chimeric proteins may be synthesized by chemical synthesis using solid phase peptide synthesis. These methods employ either solid or solution phase synthesis methods (see for example, J. M. Stewart, and J. D. Young, Solid Phase Peptide Synthesis, 2nd Ed., Pierce Chemical Co., Rockford Ill. (1984) and G. Barany and R. B. Merrifield, The Peptides: Analysis Synthesis, Biology editors E. Gross and J. Meienhofer Vol. 2 Academic Press, New York, 1980, pp. 3-254 for solid phase synthesis techniques; and M Bodansky, Principles of Peptide Synthesis, Springer-Verlag, Berlin 1984, and E. Gross and J. Meienhofer, Eds., The Peptides: Analysis, Synthesis, Biology, suprs, Vol 1, for classical solution synthesis). By way of example, a peptide may be synthesized using 9-fluorenyl methoxycarbonyl (Fmoc) solid phase chemistry with direct incorporation of phosphothreonine as the N-fluorenylmethoxy-carbonyl-O-benzyl-L-phosphothreonine derivative.

N-terminal or C-terminal fusion proteins comprising a peptide or chimeric protein of the invention conjugated with other molecules may be prepared by fusing, through recombinant techniques, the N-terminal or C-terminal of the peptide or chimeric protein, and the sequence of a selected protein or selectable marker with a desired biological function. The resultant fusion proteins contain a peptide fused to the selected protein or marker protein as described herein. Examples of proteins which may be used to prepare fusion proteins include immunoglobulins, glutathione-S-transferase (GST), hemagglutinin (HA), and truncated myc.

Peptides may be developed using a biological expression system. The use of these systems allows the production of large libraries of random peptide sequences and the screening of these libraries for peptide sequences that bind to particular proteins. Libraries may be produced by cloning synthetic DNA that encodes random peptide sequences into appropriate expression vectors (see Christian et al 1992, J. Mol. Biol. 227:711; Devlin et al, 1990 Science 249:404; Cwirla et al 1990, Proc. Natl. Acad, Sci. USA, 87:6378). Libraries may also be constructed by concurrent synthesis of overlapping peptides (see U.S. Pat. No. 4,708,871).

Peptides and proteins may be converted into pharmaceutical salts by reacting with inorganic acids such as hydrochloric acid, sulfuric acid, hydrobromic acid, phosphoric acid, etc., or organic acids such as formic acid, acetic acid, propionic acid, glycolic acid, lactic acid, pyruvic acid, oxalic acid, succinic acid, malic acid, tartaric acid, citric acid, benzoic acid, salicylic acid, benezenesulfonic acid, and toluenesulfonic acids.

In one aspect, the nanoparticle encapsulates an antibody, or antibody fragment, specific for a target. That is, the antibody can inhibit a target to provide a beneficial effect.

The antibodies may be intact monoclonal or polyclonal antibodies, and immunologically active fragments (e.g., a Fab or (Fab) 2 fragment), an antibody heavy chain, an antibody light chain, humanized antibodies, a genetically engineered single chain FV molecule (Ladner et al, U.S. Pat. No. 4,946,778), or a chimeric antibody, for example, an antibody which contains the binding specificity of a murine antibody, but in which the remaining portions are of human origin. Antibodies including monoclonal and polyclonal antibodies, fragments and chimeras, may be prepared using methods known to those skilled in the art.

Antibodies can be prepared using intact polypeptides or fragments containing an immunizing antigen of interest. The polypeptide or oligopeptide used to immunize an animal may be obtained from the translation of RNA or synthesized chemically and can be conjugated to a carrier protein, if desired. Suitable carriers that may be chemically coupled to peptides include bovine serum albumin and thyroglobulin, keyhole limpet hemocyanin. The coupled polypeptide may then be used to immunize the animal (e.g., a mouse, a rat, or a rabbit).

Small Molecule Therapeutic Agents

In various embodiments, the therapeutic agent is a small molecule. When the therapeutic agent is a small molecule, a small molecule may be obtained using standard methods known to the skilled artisan. Such methods include chemical organic synthesis or biological means. Biological means include purification from a biological source, recombinant synthesis and in vitro translation systems, using methods well known in the art. In one embodiment, a small molecule therapeutic agent comprises an organic molecule, inorganic molecule, biomolecule, synthetic molecule, and the like.

Combinatorial libraries of molecularly diverse chemical compounds potentially useful in treating a variety of diseases and conditions are well known in the art as are method of making the libraries. The method may use a variety of techniques well-known to the skilled artisan including solid phase synthesis, solution methods, parallel synthesis of single compounds, synthesis of chemical mixtures, rigid core structures, flexible linear sequences, deconvolution strategies, tagging techniques, and generating unbiased molecular landscapes for lead discovery vs. biased structures for lead development.

In a general method for small library synthesis, an activated core molecule is condensed with a number of building blocks, resulting in a combinatorial library of covalently linked, core-building block ensembles. The shape and rigidity of the core determine the orientation of the building blocks in shape space. The libraries can be biased by changing the core, linkage, or building blocks to target a characterized biological structure ("focused libraries") or synthesized with less structural bias using flexible cores.

The small molecule and small molecule compounds described herein may be present as salts even if salts are not depicted and it is understood that the invention embraces all salts and solvates of the inhibitors depicted here, as well as the non-salt and non-solvate form of the inhibitors, as is well understood by the skilled artisan. In some embodiments, the salts of the inhibitors of the invention are pharmaceutically acceptable salts.

Where tautomeric forms may be present for any of the inhibitors described herein, each and every tautomeric form is intended to be included in the present invention, even though only one or some of the tautomeric forms may be explicitly depicted. For example, when a 2-hydroxypyridyl moiety is depicted, the corresponding 2-pyridone tautomer is also intended.

The invention also includes any or all of the stereochemical forms, including any enantiomeric or diastereomeric forms of the inhibitors described. The recitation of the structure or name herein is intended to embrace all possible stereoisomers of inhibitors depicted. All forms of the inhibitors are also embraced by the invention, such as crystalline or non-crystalline forms of the inhibitors. Compositions comprising an inhibitor of the invention are also intended, such as a composition of substantially pure inhibitor, including a specific stereochemical form thereof, or a composition comprising mixtures of inhibitors of the invention in any ratio, including two or more stereochemical forms, such as in a racemic or non-racemic mixture.

In one embodiment, the small molecule therapeutic agent of comprised within the nanoparticle comprises an analog or derivative of a therapeutic agent described herein.

In one embodiment, the small molecules described herein are candidates for derivatization. As such, in certain instances, the analogs of the small molecules described herein that have modulated potency, selectivity, and solubility are included herein and provide useful leads for drug discovery and drug development. Thus, in certain instances, during optimization new analogs are designed considering issues of drug delivery, metabolism, novelty, and safety.

In some instances, small molecule therapeutic agents described herein are derivatized/analoged as is well known in the art of combinatorial and medicinal chemistry. The analogs or derivatives can be prepared by adding and/or substituting functional groups at various locations. As such, the small molecules described herein can be converted into derivatives/analogs using well known chemical synthesis procedures. For example, all of the hydrogen atoms or substituents can be selectively modified to generate new analogs. Also, the linking atoms or groups can be modified into longer or shorter linkers with carbon backbones or hetero atoms. Also, the ring groups can be changed so as to have a different number of atoms in the ring and/or to include hetero atoms. Moreover, aromatics can be converted to cyclic rings, and vice versa. For example, the rings may be from 5-7 atoms, and may be homocycles or heterocycles.

As used herein, the term "analog," "analogue," or "derivative" is meant to refer to a chemical compound or molecule made from a parent compound or molecule by one or more chemical reactions. As such, an analog can be a structure having a structure similar to that of the small molecule therapeutic agents described herein or can be based on a scaffold of a small molecule therapeutic agent described herein, but differing from it in respect to certain components or structural makeup, which may have a similar or opposite action metabolically. An analog or derivative of any of a small molecule inhibitor in accordance with the present invention can be used to treat a disease or disorder.

In one embodiment, the small molecule therapeutic agents described herein can independently be derivatized/analoged by modifying hydrogen groups independently from each other into other substituents. That is, each atom on each molecule can be independently modified with respect to the other atoms on the same molecule. Any traditional modification for producing a derivative/analog can be used. For example, the atoms and substituents can be independently comprised of hydrogen, an alkyl, aliphatic, straight chain aliphatic, aliphatic having a chain hetero atom, branched aliphatic, substituted aliphatic, cyclic aliphatic, heterocyclic aliphatic having one or more hetero atoms, aromatic, heteroaromatic, polyaromatic, polyamino acids, peptides, polypeptides, combinations thereof, halogens, halo-substituted aliphatics, and the like. Additionally, any ring group on a compound can be derivatized to increase and/or decrease ring size as well as change the backbone atoms to carbon atoms or hetero atoms.

Nucleic Acid Therapeutic Agents

In other related aspects, the therapeutic agent is an isolated nucleic acid. In certain embodiments, the isolated nucleic acid molecule is one of a DNA molecule or an RNA molecule. In certain embodiments, the isolated nucleic acid molecule is a cDNA, mRNA, or miRNA molecule. In one embodiment, the isolated nucleic acid molecule encodes a therapeutic peptide. In some instances, the therapeutic agent is an siRNA, miRNA, or antisense molecule, which inhibits a targeted nucleic acid. In one embodiment, the nucleic acid comprises a promoter/regulatory sequence such that the nucleic acid is preferably capable of directing expression of the nucleic acid. Thus, the invention encompasses expression vectors and methods for the introduction of exogenous DNA into cells with concomitant expression of the exogenous DNA in the cells such as those described, for example, in Sambrook et al. (2012, Molecular Cloning: A Laboratory Manual, Cold Spring Harbor Laboratory, New York), and in Ausubel et al. (1997, Current Protocols in Molecular Biology, John Wiley & Sons, New York) and as described elsewhere herein.

In another aspect of the invention, a targeted gene or protein, can be inhibited by way of inactivating and/or sequestering the targeted gene or protein. As such, inhibiting the activity of the targeted gene or protein can be accomplished by using a nucleic acid molecule encoding a transdominant negative mutant.

In one embodiment, siRNA is used to decrease the level of a targeted protein. RNA interference (RNAi) is a phenomenon in which the introduction of double-stranded RNA (dsRNA) into a diverse range of organisms and cell types causes degradation of the complementary mRNA. In the cell, long dsRNAs are cleaved into short 21-25 nucleotide small interfering RNAs, or siRNAs, by a ribonuclease known as Dicer. The siRNAs subsequently assemble with protein components into an RNA-induced silencing complex (RISC), unwinding in the process. Activated RISC then binds to complementary transcript by base pairing interactions between the siRNA antisense strand and the mRNA. The bound mRNA is cleaved and sequence specific degradation of mRNA results in gene silencing. See, for example, U.S. Pat. No. 6,506,559; Fire et al., 1998, Nature 391(19): 306-311; Timmons et al., 1998, Nature 395:854; Montgomery et al., 1998, TIG 14 (7): 255-258; David R. Engelke, Ed., RNA Interference (RNAi) Nuts & Bolts of RNAi Technology, DNA Press, Eagleville, PA (2003); and Gregory J. Hannon, Ed., RNAi A Guide to Gene Silencing, Cold Spring Harbor Laboratory Press, Cold Spring Harbor, NY (2003). Soutschek et al. (2004, Nature 432:173-178) describe a chemical modification to siRNAs that aids in intravenous systemic delivery. Optimizing siRNAs involves consideration of overall G/C content, C/T content at the termini, Tm and the nucleotide content of the 3' overhang. See, for instance, Schwartz et al., 2003, Cell, 115:199-208 and Khvorova et al., 2003, Cell 115:209-216. Therefore, the present invention also includes methods of decreasing levels of PTPN22 using RNAi technology.

In another aspect, the invention includes a vector comprising an siRNA or antisense polynucleotide. Preferably, the siRNA or antisense polynucleotide is capable of inhibiting the expression of a target polypeptide. The incorporation of a desired polynucleotide into a vector and the choice of vectors is well-known in the art as described in, for example, Sambrook et al. (2012), and in Ausubel et al. (1997), and elsewhere herein.

In certain embodiments, the expression vectors described herein encode a short hairpin RNA (shRNA) therapeutic agents. shRNA molecules are well known in the art and are directed against the mRNA of a target, thereby decreasing the expression of the target. In certain embodiments, the encoded shRNA is expressed by a cell, and is then processed into siRNA. For example, in certain instances, the cell possesses native enzymes (e.g., dicer) that cleaves the shRNA to form siRNA.

In order to assess the expression of the siRNA, shRNA, or antisense polynucleotide, the expression vector to be introduced into a cell can also contain either a selectable marker gene or a reporter gene or both to facilitate identification of expressing cells from the population of cells sought to be transfected or infected using a nanoparticle of the invention. In other embodiments, the selectable marker may be carried on a separate piece of DNA and also be contained within the nanoparticle. Both selectable markers and reporter genes may be flanked with appropriate regulatory sequences to enable expression in the host cells. Useful selectable markers are known in the art and include, for example, antibiotic-resistance genes, such as neomycin resistance and the like.

Therefore, in another aspect, the nanoparticle may contain a vector, comprising the nucleotide sequence or the construct to be delivered. The choice of the vector will depend on the host cell in which it is to be subsequently introduced. In a particular embodiment, the vector of the invention is an expression vector. Suitable host cells include a wide variety of prokaryotic and eukaryotic host cells. In specific embodiments, the expression vector is selected from the group consisting of a viral vector, a bacterial vector and a mammalian cell vector. Prokaryote- and/or eukaryote-vector based systems can be employed for use with the present invention to produce polynucleotides, or their cognate polypeptides. Many such systems are commercially and widely available.

By way of illustration, the vector in which the nucleic acid sequence is introduced can be a plasmid, which is or is not integrated in the genome of a host cell when it is introduced in the cell. Illustrative, non-limiting examples of vectors in which the nucleotide sequence of the invention or the gene construct of the invention can be inserted include a tet-on inducible vector for expression in eukaryote cells.

The vector may be obtained by conventional methods known by persons skilled in the art (Sambrook et al., 2012). In a particular embodiment, the vector is a vector useful for transforming animal cells.

In one embodiment, the recombinant expression vectors may also contain nucleic acid molecules, which encode a peptide or peptidomimetic.

A promoter may be one naturally associated with a gene or polynucleotide sequence, as may be obtained by isolating the 5' non-coding sequences located upstream of the coding segment and/or exon. Such a promoter can be referred to as "endogenous." Similarly, an enhancer may be one naturally associated with a polynucleotide sequence, located either downstream or upstream of that sequence. Alternatively, certain advantages will be gained by positioning the coding polynucleotide segment under the control of a recombinant or heterologous promoter, which refers to a promoter that is not normally associated with a polynucleotide sequence in its natural environment. A recombinant or heterologous enhancer refers also to an enhancer not normally associated with a polynucleotide sequence in its natural environment. Such promoters or enhancers may include promoters or enhancers of other genes, and promoters or enhancers isolated from any other prokaryotic, viral, or eukaryotic cell, and promoters or enhancers not "naturally occurring," i.e., containing different elements of different transcriptional regulatory regions, and/or mutations that alter expression. In addition to producing nucleic acid sequences of promoters and enhancers synthetically, sequences may be produced using recombinant cloning and/or nucleic acid amplification technology, including PCR™, in connection with the compositions disclosed herein (U.S. Pat. Nos. 4,683,202, 5,928, 906). Furthermore, it is contemplated the control sequences that direct transcription and/or expression of sequences within non-nuclear organelles such as mitochondria, chloroplasts, and the like, can be employed as well.

Naturally, it will be important to employ a promoter and/or enhancer that effectively directs the expression of the DNA segment in the cell type, organelle, and organism chosen for expression. Those of skill in the art of molecular biology generally know how to use promoters, enhancers, and cell type combinations for protein expression, for example, see Sambrook et al. (2012). The promoters employed may be constitutive, tissue-specific, inducible, and/or useful under the appropriate conditions to direct high level expression of the introduced DNA segment, such as is advantageous in the large-scale production of recombinant proteins and/or peptides. The promoter may be heterologous or endogenous.

The recombinant expression vectors may also contain a selectable marker gene, which facilitates the selection of host cells. Suitable selectable marker genes are genes encoding proteins such as G418 and hygromycin, which confer resistance to certain drugs, β-galactosidase, chloramphenicol acetyltransferase, firefly luciferase, or an immunoglobulin or portion thereof such as the Fc portion of an immunoglobulin preferably IgG. The selectable markers may be introduced on a separate vector from the nucleic acid of interest.

Following the generation of the siRNA polynucleotide, a skilled artisan will understand that the siRNA polynucleotide will have certain characteristics that can be modified to improve the siRNA as a therapeutic compound. Therefore, the siRNA polynucleotide may be further designed to resist degradation by modifying it to include phosphorothioate, or other linkages, methylphosphonate, sulfone, sulfate, ketyl, phosphorodithioate, phosphoramidate, phosphate esters, and the like (see, e.g., Agrwal et al., 1987, Tetrahedron Lett. 28:3539-3542; Stec et al., 1985 Tetrahedron Lett. 26:2191-2194; Moody et al., 1989 Nucleic Acids Res. 12:4769-4782; Eckstein, 1989 Trends Biol. Sci. 14:97-100; Stein, In: Oligodeoxynucleotides. Antisense Inhibitors of Gene Expression, Cohen, ed., Macmillan Press, London, pp. 97-117 (1989)).

Any polynucleotide may be further modified to increase its stability in vivo. Possible modifications include, but are not limited to, the addition of flanking sequences at the 5' and/or 3' ends; the use of phosphorothioate or 2' O-methyl rather than phosphodiester linkages in the backbone; and/or the inclusion of nontraditional bases such as inosine, queosine, and wybutosine and the like, as well as acetyl-methyl-, thio- and other modified forms of adenine, cytidine, guanine, thymine, and uridine.

In one embodiment of the invention, an antisense nucleic acid sequence, which is expressed by a plasmid vector is used as a therapeutic agent to inhibit the expression of a target protein. The antisense expressing vector is used to transfect a mammalian cell or the mammal itself, thereby causing reduced endogenous expression of the target protein.

Antisense molecules and their use for inhibiting gene expression are well known in the art (see, e.g., Cohen, 1989, In: Oligodeoxyribonucleotides, Antisense Inhibitors of Gene Expression, CRC Press). Antisense nucleic acids are DNA or RNA molecules that are complementary, as that term is defined elsewhere herein, to at least a portion of a specific mRNA molecule (Weintraub, 1990, Scientific American 262:40). In the cell, antisense nucleic acids hybridize to the corresponding mRNA, forming a double-stranded molecule thereby inhibiting the translation of genes.

The use of antisense methods to inhibit the translation of genes is known in the art, and is described, for example, in Marcus-Sakura (1988, Anal. Biochem. 172:289). Such antisense molecules may be provided to the cell via genetic expression using DNA encoding the antisense molecule as taught by Inoue, 1993, U.S. Pat. No. 5,190,931.

Alternatively, antisense molecules of the invention may be made synthetically and then provided to the cell. Antisense oligomers of between about 10 to about 30, and more preferably about 15 nucleotides, are preferred, since they are easily synthesized and introduced into a target cell. Synthetic antisense molecules contemplated by the invention include oligonucleotide derivatives known in the art which have improved biological activity compared to unmodified oligonucleotides (see U.S. Pat. No. 5,023,243).

In one embodiment of the invention, a ribozyme is used as a therapeutic agent to inhibit expression of a target protein. Ribozymes useful for inhibiting the expression of a target molecule may be designed by incorporating target sequences into the basic ribozyme structure, which are complementary, for example, to the mRNA sequence encoding the target molecule. Ribozymes targeting the target molecule, may be synthesized using commercially available reagents (Applied Biosystems, Inc., Foster City, CA) or they may be genetically expressed from DNA encoding them.

In one embodiment, the therapeutic agent may comprise one or more components of a CRISPR-Cas system, where a guide RNA (gRNA) targeted to a gene encoding a target molecule, and a CRISPR-associated (Cas) peptide form a complex to induce mutations within the targeted gene. In one embodiment, the therapeutic agent comprises a gRNA or a nucleic acid molecule encoding a gRNA. In one embodiment, the therapeutic agents comprises a Cas peptide or a nucleic acid molecule encoding a Cas peptide.

Antibody Therapeutic Agents

The invention also contemplates a nanoparticle comprising an antibody, or antibody fragment, specific for a target. That is, the antibody can inhibit a target to provide a beneficial effect.

The antibodies may be intact monoclonal or polyclonal antibodies, and immunologically active fragments (e.g., a Fab or (Fab) 2 fragment), an antibody heavy chain, an antibody light chain, humanized antibodies, a genetically engineered single chain FV molecule (Ladner et al, U.S. Pat. No. 4,946,778), or a chimeric antibody, for example, an antibody which contains the binding specificity of a murine antibody, but in which the remaining portions are of human origin. Antibodies including monoclonal and polyclonal antibodies, fragments and chimeras, may be prepared using methods known to those skilled in the art.

Antibodies can be prepared using intact polypeptides or fragments containing an immunizing antigen of interest. The polypeptide or oligopeptide used to immunize an animal may be obtained from the translation of RNA or synthesized chemically and can be conjugated to a carrier protein, if desired. Suitable carriers that may be chemically coupled to peptides include bovine serum albumin and thyroglobulin, keyhole limpet hemocyanin. The coupled polypeptide may then be used to immunize the animal (e.g., a mouse, a rat, or a rabbit).

Methods

The invention relates to methods of using the metal-organic framework nanoparticles and EVM-coated metal-organic framework nanoparticles, and pharmaceutical compositions of the present invention. In one embodiment, the methods relate to delivery of a therapeutic agent. In one embodiment, the methods relate to delivery of a therapeutic protein or peptide.

Metal-organic framework nanoparticles are stable at physiologic pH and degrade under acidic conditions. Therefore, in one embodiment, the method comprises administering a metal-organic framework nanoparticle of the invention encapsulating a protein, wherein the nanoparticle releases the protein under acidic conditions.

Extracellular vesicle membranes (EVMs) retain surface receptors and membrane proteins of the EVM. Further, homotypic self-seeding has been proposed as an important mechanism for tumor growth, wherein EVs can preferentially target certain distant cells and tissues. Thus, in one embodiment, the invention provides for targeted delivery of an EVM-coated metal-organic framework nanoparticles. In one embodiment, the method comprises administering to a subject an EVM-coated metal-organic framework nanoparticle encapsulating a protein, wherein the protein is delivered to the tumor or cell type from which the EVM was isolated. In one embodiment, the method comprises administering to a subject an EVM-coated metal-organic framework nanoparticle encapsulating a protein, wherein the protein is delivered to a cell comprising a surface protein for which the EVM has a receptor.

The present invention also provides a method of treating or preventing a disease or disorder in a subject. In one embodiment, the method comprises administering an effective amount of a composition comprising a nanoparticle described herein to a subject. In one embodiment, the nanoparticle encompasses therapeutic protein which targets the patient's disease or disorder.

The composition of the invention may be administered to a patient or subject in need in a wide variety of ways. Modes of administration include orally, intraoperatively intravenous, intravascular, intramuscular, subcutaneous, intracerebral, intraperitoneal, soft tissue injection, surgical placement, arthroscopic placement, and percutaneous insertion, e.g., direct injection, cannulation or catheterization. Any administration may be a single application of a composition of invention or multiple applications. Administrations may be to single site or to more than one site in the individual to be treated. Multiple administrations may occur essentially at the same time or separated in time.

In certain embodiments, the composition of the invention is administered during surgical resection or debulking of a tumor or diseased tissue. For example, in subjects undergoing surgical treatment of diseased tissue or tumor, the composition may be administered to the site in order to further treat the tumor.

Subjects to which administration of the pharmaceutical compositions of the invention is contemplated include, but are not limited to, humans and other primates, mammals including commercially relevant mammals such as non-human primates, cattle, pigs, horses, sheep, cats, and dogs.

Pharmaceutical compositions of the present invention may be administered in a manner appropriate to the disease to be treated (or prevented). The quantity and frequency of administration will be determined by such factors as the condition of the subject, and the type and severity of the subject's disease, although appropriate dosages may be determined by clinical trials.

When "therapeutic amount" is indicated, the precise amount of the compositions of the present invention to be administered can be determined by a physician with consideration of individual differences in age, weight, disease type, extent of disease, and condition of the patient (subject).

The administration of the subject compositions may be carried out in any convenient manner, including by aerosol inhalation, injection, ingestion, transfusion, implantation or transplantation. The compositions described herein may be administered to a patient subcutaneously, intradermally, intratumorally, intranodally, intramedullary, intramuscularly, by intravenous (i.v.) injection, or intraperitoneally. In one embodiment, the compositions of the present invention are administered to a patient by intradermal or subcutaneous injection. In another embodiment, the compositions of the present invention are preferably administered by i.v. injection.

The nanoparticle composition described herein can be incorporated into any formulation known in the art. For example, the nanoparticle may be incorporated into formulations suitable for oral, parenteral, intravenous, subcutaneous, percutaneous, topical, buccal, or another route of administration. Suitable compositions include, but are not limited to, tablets, capsules, caplets, pills, gel caps, troches, dispersions, suspensions, solutions, syrups, granules, beads, transdermal patches, gels, powders, pellets, magmas, lozenges, creams, pastes, plasters, lotions, discs, suppositories, liquid sprays for nasal or oral administration, dry powder or aerosolized formulations for inhalation, compositions and formulations for intravesical administration and the like. It should be understood that the formulations and compositions that would be useful in the present invention are not limited to the particular formulations and compositions that are described herein.

Although the description of pharmaceutical compositions provided herein are principally directed to pharmaceutical compositions which are suitable for ethical administration to humans, it will be understood by the skilled artisan that such compositions are generally suitable for administration to animals of all sorts. Modification of pharmaceutical compositions suitable for administration to humans in order to render the compositions suitable for administration to various animals is well understood, and the ordinarily skilled veterinary pharmacologist can design and perform such modification with merely ordinary, if any, experimentation. Subjects to which administration of the pharmaceutical compositions of the invention is contemplated include, but are not limited to, humans and other primates, mammals including commercially relevant mammals such as non-human primates, cattle, pigs, horses, sheep, cats, and dogs.

In the method of treatment, the administration of the composition of the invention may be for either "prophylactic" or "therapeutic" purpose. When provided prophylactically, the composition of the present invention is provided in advance of any symptom, although in particular embodiments the invention is provided following the onset of one or more symptoms to prevent further symptoms from developing or to prevent present symptoms from becoming worse. The prophylactic administration of composition serves to prevent or ameliorate any subsequent symptom. When provided therapeutically, the pharmaceutical composition is provided at or after the onset of a symptom. Thus, the present invention may be provided either prior to the anticipated exposure to a disorder-causing agent or disorder state or after the initiation of the disorder.

Pharmaceutical Compositions

The present invention provides pharmaceutical compositions comprising one or more nanoparticle compositions of the present invention. The relative amounts of the nanoparticle, the pharmaceutically acceptable carrier, and any additional ingredients in a pharmaceutical composition of the invention will vary, depending upon the identity, size, and condition of the subject treated and further depending upon the route by which the composition is to be administered.

The formulations of the pharmaceutical compositions described herein may be prepared by any method known or hereafter developed in the art of pharmacology. In general, such preparatory methods include the step of bringing the active ingredient into association with a carrier or one or more other accessory ingredients. Said compositions may comprise additional medicinal agents, pharmaceutical agents, carriers, buffers, adjuvants, dispersing agents, diluents, and the like depending on the intended use and application.

Examples of suitable pharmaceutical carriers, excipients and/or diluents are well known in the art and include, but are not limited to, a gum, a starch (e.g. corn starch, pregeletanized starch), a sugar (e.g., lactose, mannitol, sucrose, dextrose), a cellulosic material (e.g. microcrystalline cellulose), an acrylate (e.g. polymethylacrylate), calcium carbonate, magnesium oxide, talc, or mixtures thereof.

Pharmaceutically acceptable carriers for liquid formulations are aqueous or non-aqueous solutions, suspensions, emulsions or oils, Examples of non-aqueous solvents are propylene glycol, polyethylene glycol, and injectable organic esters such as ethyl oleate. Examples of oils are those of animal, vegetable, or synthetic origin, for example, peanut oil, soybean oil, olive oil, sunflower oil, turmeric oil, fish-liver oil, another marine oil, or a lipid from milk or eggs.

Aqueous carriers include water, alcoholic/aqueous solutions, emulsions or suspensions, including saline and buffered media such as phosphate buffered saline solutions, water, emulsions, such as oil/water emulsions, various types of wetting agents, sterile solutions etc. Compositions comprising such carriers can be formulated by well-known conventional methods. Suitable carriers may comprise any material which, when combined with the biologically active compound of the invention, retains the biological activity. Preparations for parenteral administration may include sterile aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles may include sodium chloride solution, Ringer's dextrose, dextrose and sodium chloride, lactated Ringer's, or fixed oils. Intravenous vehicles may include fluid and nutrient replenishes, electrolyte replenishers (such as those based on Ringer's dextrose), and the like. Preservatives and other additives may also be present including, for example, antimicrobials, anti-oxidants, chelating agents, and inert gases and the like, in addition, the pharmaceutical composition of the present invention might comprise proteinaceous carriers, e.g., serum albumin or immunoglobulin, preferably of human origin.

A nanoparticle composition may be administered alone, or in combination with other drugs and/or agents as pharmaceutical compositions. The composition may contain one or more added materials such as carriers and/or excipients. As used herein, "carriers" and "excipients" generally refer to substantially inert, non-toxic materials that do not deleteriously interact with other components of the composition. These materials may be used to increase the amount of solids in particulate pharmaceutical compositions, such as to form a powder of drug particles. Examples of suitable carriers include water, silicone, gelatin, waxes, and the like.

Examples of normally employed "excipients," include pharmaceutical grades of mannitol, sorbitol, inositol, dextrose, sucrose, lactose, trehalose, dextran, starch, cellulose, sodium or calcium phosphates, calcium sulfate, citric acid, tartaric acid, glycine, high molecular weight polyethylene glycols (PEG), and the like and combinations thereof. In one embodiment, the excipient may also include a charged lipid and/or detergent in the pharmaceutical compositions. Suitable charged lipids include, without limitation, phosphatidylcholines (lecithin), and the like. Detergents will typically be a nonionic, anionic, cationic or amphoteric surfactant. Examples of suitable surfactants include, for example, Tergitol® and Triton® surfactants (Union Carbide Chemicals and Plastics, Danbury, Conn.), polyoxyethylenesorbitans, for example, TWEEN surfactants (Atlas Chemical Industries, Wilmington, Del.), polyoxyethylene ethers, for example, Brij®, pharmaceutically acceptable fatty acid esters, for example, lauryl sulfate and salts thereof (SDS), and the like. Such materials may be used as stabilizers and/or anti-oxidants. Additionally, they may be used to reduce local irritation at the site of administration.

In at least one embodiment, the composition is formulated in a lyophilized form. In certain embodiments, the lyophilized formulation of the composition allows for maintaining nanoparticle structure and achieving remarkably superior long-term stability conditions which might occur during storage or transportation of the nanoparticle.

Kits of the Invention

The invention also includes a kit comprising compounds useful within the methods of the invention and an instructional material that describes, for instance, the method of administering the nanoparticles and compositions as described elsewhere herein. The kit may comprise formulations of a pharmaceutical composition comprising the active ingredient combined with a pharmaceutically acceptable carrier, such as sterile water or sterile isotonic saline. The kit may comprise injectable formulations that may be prepared, packaged, or sold in unit dosage form, such as in ampules or in multi dose containers containing a preservative. The kit may comprise formulations including, but not limited to, suspensions, solutions, emulsions in oily or aqueous vehicles, pastes, and implantable sustained-release or biodegradable formulations. Such formulations may further comprise one or more additional ingredients including, but not limited to, suspending, stabilizing, or dispersing agents. In one embodiment of a kit, the active ingredient is provided in dry (i.e., powder or granular) form for reconstitution with a suitable vehicle (e.g., sterile pyrogen free water) prior to administration of the reconstituted composition.

The kit may comprise pharmaceutical compositions prepared, packaged, or sold in the form of a sterile aqueous or oily suspension or solution. This suspension or solution may be formulated according to the known art, and may comprise, in addition to the active ingredient, additional ingredients such as the dispersing agents, wetting agents, or suspending agents described herein. Such sterile injectable formulations may be prepared using a non-toxic diluent or solvent, such as water or 1,3 butane diol, for example. Other acceptable diluents and solvents include, but are not limited to, Ringer's solution, isotonic sodium chloride solution, and fixed oils such as synthetic mono or di-glycerides. Other formulations which are useful include those which comprise the active ingredient in microcrystalline form, in a liposomal preparation, or as a component of a biodegradable polymer system.

In certain embodiments, the kit comprises instructional material. Instructional material may include a publication, a recording, a diagram, or any other medium of expression which can be used to communicate the usefulness of the device or implant kit described herein. The instructional material of the kit of the invention may, for example, be affixed to a package which contains one or more instruments which may be necessary for the desired procedure. Alternatively, the instructional material may be shipped separately from the package, or may be accessible electronically via a communications network, such as the Internet.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

Example 1: Self-assembly of Extracellular Vesicle-like Metal-Organic Frame-work Nanoparticles for Protein Protection and Intracellular Delivery of Biofunctional Proteins The data presented herein demonstrates the development of a biomimetic nanoparticle platform for systemic and intracellular delivery of proteins. Through a biocompatible strategy, guest proteins are caged in the matrix of metal-organic frameworks (MOF) with high efficiency (up to ~94%) and high loading content up to ~50 times of those achieved by surface conjunction, and the nanoparticles were further decorated with the extracellular vesicle (EV) membrane on with efficiency high to ~97%. In vitro and in vivo study manifests that the EV-like nanoparticles can not only protect proteins against protease digestion and evade the immune system clearance but also selectively target homotypic tumor sites, promote tumor cell uptake and autonomous release of the guest protein after internalization. Assisted by biomimetic nanoparticles, intracellular delivery of bioactive therapeutic protein gelonin significantly inhibits the tumor growth in vivo and increased 14 folds in therapeutic efficacy. Together, these data not only proposed a new concept to construct biomimetic nanoplatform but also provides a new solution for systemic and intracellular delivery of protein.

Materials and Methods

Materials. Zinc nitrate hexahydrate ($Zn(NO_3)_2 \cdot 6H_2O$), 2-methylimidazole (HMIM), ethanol (EtOH), hydrochloric acid (HCl), chloroform, methyl-β-cyclodextrin (MBC), nystatin (NYS) were obtained from Alfa Aesar. Sodium acrylate (SA), 2,5-dihydroxybenzoic acid (2, 5-DHB), chlorpromazine (CHL), amiloride (AMI), bovine serum albumin (BSA), cytochrome c (Cyt c), fluorescein isothiocyanate tagged BSA (fluoBSA) and trypsin (from bovine pancreas, TPCK treated) were purchased from Sigma-Aldrich (St. Louis, MO, USA). L-α-phosphatidylcholine and cholesterol were purchased from Avanti Polar Lipids, Inc. (Alabaster, AL, USA). Gelonin was purchased from Enzo Life Sciences. Bradford Protein Assay Kit was purchased from Bio-Rad. Dynasore (DYN) was purchased from EMD Millipore. All the chemical agents were used without further purification.

Preparation of nanoparticles. MOF and MP nanoparticles were prepared in a pure aqueous system. Briefly, 0.5 M zinc nitrate solution was slowly added to 2.5 M HMIM solution with the volume ratio of 1:10 under vigorous agitation. After agitation for 30 minutes, the white products were collected by centrifugation, followed by washing 3 times with DI water to remove unreacted residuals. For the construction of MP nanoparticles with loaded proteins, proteins were first dissolved in 2.5 M HMIM solution with defined concentration and the mixture was stirring for 30 minutes. Afterward, 0.5 M zinc nitrate solution was slowly added to above mixture under mechanical agitation for 20 minutes. The MP nanoparticles were collected by centrifugation and washed 3 times with DI water.

To generate the EVs, MDA-MB-231 cells were grown in T225 flasks (Falcon) for 2 or 3 days until a confluence of 80% was reached. Then, the regular culture medium was replaced by serum-free medium for another 48 hours. The medium was collected and centrifuged at 400 g for 5 minutes to remove the cells and followed by centrifugation again at 16,500 g for 20 minutes to discard cell debris. After continuous ultracentrifugation at 100,000 g and 4° C. for 2 hours, the EV pellets were collected. EVM was extracted via a hypotonic treatment. Briefly, the collected EVs were resuspended in a hypotonic buffer (2 mM Tris, 1 mM $MgCl_2$ and 1 mM KCl) with EDTA free protease inhibitor cocktail and kept in 4° C. overnight. The suspension was further ultracentrifuged at 100,000 g and 4° C. for 4 hours. Collected EVM was redispersed in PBS followed by ultrasonication and extrusion through Millipore membrane (pore size 200 nm) to form a homogeneous suspension.

To prepare biomimetic EMP nanoparticles, a MOF or MP nanoparticle solution was intensely vortexed, and the EVM suspension with the defined nanoparticles to membrane mass ratios was slowly added and the mixture was continuously vortexed for 10 minutes. Note: the amount of EVM was calculated using concentration of protein measured by BCA assay. After ultrasonication for 1 minute and continuous extrusion for 11 times using Mini-extruder (Avanti), EVM enveloped EMP nanoparticles were generated. Preparation of LMP nanoparticles is similar except that the EVM was replaced by the liposome. Liposomes were prepared by extrusion according to manual from Avanti. Briefly, 8 mg of L-α-phosphatidylcholine and 2 mg of cholesterol were dissolved in chloroform, and the organic solvent was removed by rotary evaporation under reduced pressure to form a homogeneous film. The lipid film was hydrated with 2 mL of PBS, and the suspension was treated by ultrasonication for 2 minutes before continuous extrusion for 20 times.

Nanoparticle characterization. Surface morphology and particle size of the prepared nanoparticles were examined on a scanning electron microscope (Zeiss SIGMA VP-FESEM) for Scanning electron microscopy (SEM) images and a Tecnai G2-20-XTWIN microscope for transmission electron microscopy (TEM) images. In brief, the nanoparticle samples were dropped onto silica wafer (for SEM) or copper 300-mesh grids with the carbon film (for TEM), and excess samples were drained with a filter paper. For EVs, EVM and EMP nanoparticles, the copper grids with samples were then negatively stained with filtered aqueous 1% uranyl acetate for 1 minute. Excess solution was drained with a filter paper, and after dry at room temperature, the samples were examined by TEM. Before imaging by TEM, sputter coating of iridium (Ir) on samples was conducted to enhance the signal-to-noise ratio. The size distribution and surface charge (zeta potential) of the different nanoparticles were analyzed using a Zetasizer Nano series Nano-ZS (Malvern Instruments). To analyze the formation of protein incorporated MP nanoparticles, Fourier transform infrared (FTIR) spectra were recorded on a Bruker Vertex V70 over a KBr pellet and then scanned from 400-4,000 $cm^{-1}$ at a resolution of 6 $cm^{-1}$. The crystal structure of nanoparticles was examined on an Empyrean X-ray powder diffractometer to record the wide-angle X-ray diffraction (XRD) patterns. The porous structure of MOF and MP nanoparticles was studied by Nitrogen adsorption isotherms on a Micromerites ASAP 2020 apparatus at liquid nitrogen temperature (77 K), and t-plot method was used to evaluate the total pore volume while the adsorption branch of the isotherms was chosen in for calculation of the pore size distribution. To check the integrity of proteins in MP nanoparticles, samples were analyzed on a MALDI-TOF/TOF mass spectrometer (AB SCIEX 5800) in positive ion mode. Microscopy images were obtained on an Olympus FV1000 laser scanning confocal microscope.

To determine the content of protein in the nanoparticles, the nanoparticles were dissolved in hydrochloric acid to release the proteins, and the proteins were recovered and purified by Amicon ultra centrifugal filters (molecular weight cut-off: 3K, Millipore-Sigma). The protein concentration was determined by Bradford method or BCA assay. The following formulas were used to calculate the Loading efficiency and loading capacity of proteins:

$$\text{Loading Efficiency} = \frac{\text{Weight of loaded protein}}{\text{Weight of initially added protein}} \times 100\%$$

$$\text{Loading Capacity} = \frac{\text{Weight of loaded protein in the nanoparticle}}{\text{Weight of the nanoparticle}} \times 100\%$$

To investigate the pH-triggered release profile of protein from MP nanoparticles, 2.0 mg of fluoBSA-loaded MP was dispersed in 5 mL of pH-modified phosphate-buffered saline at pH=7.4 or pH=5.0 at 37° C. under magnetic agitation. The supernatant of MP dispersion was collected by centrifugation at different time intervals, and the fluorescence intensity of the released fluoBSA proteins in the supernatant was monitored using a fluorescence spectrophotometer. The cumulative protein release was calculated as a function of time.

Evaluation of protein protection by MP. Pure protein (Cyt c) and Cyt c-loaded MP (Cyt c) nanoparticles (were dispersed in 100 µL of PBS (pH=7.4) solution, respectively. The concentration of Cyt c in the solution of pure protein or MP (Cyt c) is 0.1 µg $µL^{-1}$. 4 µL of 0.1 µg $µL^{-1}$ trypsin was added to above protein solution or MP (Cyt c) dispersion, and the mixture was incubated for 6 hours. After centrifugation, the supernatant was collected and analyzed by mass spectrometry. For the MP (Cyt c) dispersion, the collected precipitate of crystals was dissolved in 0.1 M HCl solution. The solution was analyzed by mass spectrometry after desalination.

Measurement of protein adsorption on nanoparticles. MP, EMP and LMP nanoparticles of defined amount were incubated with 5 mg $mL^{-1}$ fluorescent IgG solution under continuous mixing on a shaker for 2 hours. Nanoparticles were collected by centrifugation and washed 3 times with PBS, and then redispersed in 0.5 mL PBS. The fluorescence spectra and intensity of the nanoparticles suspension were recorded on a fluoromax-4 spectrofluorometer (Horiba) with the excitation wavelength of 541 nm and the emission wavelength of 580 nm.

Cell culture. MDA-MB-231 cells were cultured in high glucose, no phenol red, Dulbecco's modified eagle medium (DMEM) containing 10% Fetal Bovine Serum (FBS), 1% MEM Non-essential amino acid solution (NAA) and 1% penicillin-streptomycin (PS). Raw 264.7 and 293T cells were cultured in DMEM containing 10% FBS, 1% PS and 1% NAA. 3T3 and SH-SY5Y were cultured in DMEM containing 10% FBS and 1% PS. CAD cells were cultured in DMEM: HAMS F12 (1:1) containing 8% FBS, 1% PS 8% FBS and 2 mM glutamine. Cell cultures were maintained in a water-jacket humidified incubator under 37° C. and 5% $CO_2$ condition. Cells were passed around 80% confluence.

In vitro evaluation of phagocytosis. Phagocytosis was evaluated by analyzing the nanoparticles uptake by the murine macrophage cell line RAW 264.7. Raw 264.7 cells were seeded in culture dishes with glass bottom or 12 well plate at a density 25,000 cells per square centimeter. After the cells grew to 50% confluence, the cells were washed and incubated in fresh serum-free medium for 2 hours, and then MP, and EMP and LMP nanoparticles encapsulated with fluoBSA were added at a protein concentration of 1 µg $mL^{-1}$, respectively. After the indicated incubation time, the culture medium was removed, and the cells were washed with PBS 3 times. Cell nuclei were stained with Hochest 33342 (Thermo Fisher Scientific) followed by washing with PBS. Then, cell imaging was performed on an Olympus FV1000 Laser scanning confocal microscope. For flow cytometry analysis, adherent cells were detached from the culture plate with 0.05% Trypsin-EDTA Solution (Caisson Labs) and redispersed in PBS. The cell suspension was analyzed by flow cytometry on a BD LSR Fortessa™ cell analyzer.

In vitro evaluation of tumor targeting and intracellular protein transduction by nanoparticles. Six types of cells were used for testing the specific targeting of EMP nanoparticles. MDA-MB-231, 3T3, MCF7, CAD, SY5Y and 293T cells were seeded in culture dishes with glass bottom or 12 well plate at a density 50,000 cells per square centimeter. After overnight culture at 37° C. and 5% of $CO_2$, EMP nanoparticles encapsulated with fluoBSA were added at the protein concentration of 1 µg $mL^{-1}$. Cells were washed 3 times with PBS after 2 hours of incubation and stained with Hoechst 33342 (Thermo Fisher Scientific). Cell imaging was performed on the Olympus FV1000 Laser scanning confocal microscope. For quantitative analysis of the uptake of the EMP nanoparticles, cells without staining were detached for flow cytometry analysis. Different strategies of using pure protein, MP, EMP and LMP nanoparticles for intracellular protein transduction were evaluated. MDA-MB-231 tumor cells were seeded in culture dishes with glass bottom or 12 well plate at a density 50,000 cells per square centimeter. After overnight culture, protein (fluoBSA) solution, MP, EMP and LMP nanoparticles with encapsulated fluoBSA were added at the protein concentration of 1 μg mL$^{-1}$. After culturing for 2 hours, fluorescence microscopy and flow cytometry analysis of the cells were performed.

Internalization and intracellular cargo release mechanism of EMP nanoparticles. To determine the endocytosis pathways, MDA-MB-231 cells were incubated with EMP nanoparticles and several inhibitors for 2 hours. More specifically, chlorpromazine (CHL, inhibitor of clathrin-mediated endocytosis), amiloride (AMI, inhibitor of Na$^+$/H$^+$ pump related macropinocytosis), dynasore (DYN, inhibitor of dynamin), methyl-beta-cyclodextrin (MBC, inhibitor of cholesterol-dependent endocytosis), and nystatin (NYS, inhibitor of lipid raft-caveolae endocytosis) were used. After incubation, cells were washed, detached, and analyzed by the flow cytometry for quantification. For intracellular trafficking of internalization of EMP nanoparticle by MDA-MB-231 tumor cells, EMP nanoparticles with encapsulated fluoBSA (protein concentration of 1 μg mL$^{-1}$) and endosome marker FM4-64 (Thermo Fisher Scientific, 10 μg mL$^{-1}$) were added to cultured MDA-MB-231 tumor cells. Cells were incubated at 37° C. and 5% of $CO_2$ for 0, 0.5, 2 and 4 hours, respectively. At the end of each incubation, the medium was removed, and the cells were washed 3 times with PBS. The cell nucleus was stained with Hoechst 33342. The samples were analyzed by a Laser scanning confocal microscope.

The intravesicular pH was evaluated using a ratiometric sensor LysoSensor Yellow/Blue DND-160 (Thermo Fisher Scientific) following the manufacturer protocol. Briefly, after incubation with the EMP nanoparticles for 2 hours, MDA-MB-231 cells were washed twice with HEPES solution and incubated with 5 μM LysoSensor Yellow/Blue DND-160 in the cell culture medium. Then, the cells were observed on the FV-1000 laser scanning microscope. Microscopy images were collected sequentially using the 405-laser line for excitation, and emissions were gated between 420-490 nm (channel 1) and 500-600 nm (channel 2). Probe calibration was also performed at different pH from 3 to 8 (Jean et al., 2015, EMBO Reports, 16:297-311; Wozniak et al., 2010, PLOS Pathogens, 6: e1001087). Laser power and gain settings were kept constant for both calibration and experimental images. The ratio of fluorescence intensities of two channels was measured, and intravesicular pH was calculated based on the calibration curve.

In vitro cytotoxicity and therapeutic study. The in vitro cytotoxicity of nanoparticles was tested using the Cell Counting Kit-8 (CCK-8), following the manufacturer's protocol. Briefly, around 5,000 MDA-MB-231 cells were cultured in 100 μL of high glucose DMEM media inside a 96-well plate under 37° C., 5% $CO_2$ environment overnight. Culture media were removed and replaced with the dispersion of nanoparticles or raw materials in high glucose DMEM media. After incubation for 24 hours, the medium was removed, and the cells were washed 3 times with fresh medium. Then, 100 μL of fresh medium containing 10% CCK-8 was added to each well. After further incubation for 2 hours, the absorbance at 450 nm was measured using a microplate reader (TECAN, infinite M200 PRO). For evaluation of the therapeutic effect of protein transduction using various strategies, pure gelonin, MP and EMP nanoparticles encapsulated with gelonin were added to cultured MDA-MB-231 cells at different protein concentrations. After incubation for 24 hours, cell proliferation was determined by the CCK-8 assay. Cell apoptosis at different time-points was tested by live-dead cell staining using LIVE/DEAD™ Viability/Cytotoxicity Kit (Thermal Fisher Scientific) and detected by fluorescence imaging.

To study the intracellular evolution of zinc ions, the intracellular zinc ions were analyzed by laser scanning microscopy using a selective sensor Zinpyr-1. More specifically, after incubation with EMP nanoparticles, MDA-MB-231 cells were washed twice with HEPES solution at different time points and incubated with 5 μM Zinpyr-1 and 0.5 μg mL$^{-1}$ Hochest 33342 in the medium for 30 minutes. Then cells were washed with warm PBS and analyzed by the laser scanning microscopy. To track the intracellular fate of the EVM from EMP nanoparticles, EVM was labeled using PKH67 (Sigma-Alrich) before construction of the EMP nanoparticles (Lässer et al., 2011, Journal of Translational Medicine, 9:9). To clearly locate the EMV, the plasma membrane was labeled by a lipophilic dye DiD (Thermo Fisher Scientific), while the nucleus was stained by the Hochest 33342. After incubation for the predetermined time, the MDA-MB-231 cells were washed with PBS and observed by the laser scanning microscopy.

In vivo protein delivery and antitumor efficacy. All experiments with animals were performed following the NIH guidelines for the care and use of experimental animals and were approved by Institutional Animal Care and Use Committee (IACUC #47003) at the Pennsylvania State University. To set up the tumor xenograft model, detached MDA-MB-231 human breast tumor cells in PBS were mixed with matrigel. Female nude mice (6 weeks, J: NU, Charles River) were subcutaneously inoculated in the mammary fat pads with 100 μL of the matrigel mixture with 106 MDA-MB-231 tumor cells. The tumor size was monitored by a Vernier caliper and the tumor volume (V) was calculated as $V=\pi LW^2/6$, where L and W were the length and width of the tumor, respectively. When the tumor volume reached to 100 mm$^3$, the tumor-bearing mice were weighed and sorted into different groups (5 mice for each group) randomly. Evaluation of in situ and intracellular transduction of therapeutic proteins for tumor growth imbibition was performed by intratumoral injection of PBS, MOP, gelonin, and MP nanoparticles. 50 μL of MP solution (equivalent to 27 μg kg$^{-1}$ body weight of gelonin), gelonin, MOF, and PBS were intratumorally injected into the respective groups of mice every 3 days with a total of three injections per mouse. Both the body weight and tumor size of mice were monitored.

Evaluation of systemic targeting and intracellular transduction of proteins was performed by intravenous injection of gelonin, MP and EMP nanoparticles via the tail vein. For tumor targeting and biodistribution analysis, 100 μL of indocyanine green (ICG)-labeled protein or nanoparticles (with equivalent ICG of 25 μg) were administered to nude mice bearing MDA-MB-231 tumors via tail vein injection. At different time points post-administration, the mice were imaged using an in vivo PerkinElmer IVIS optical imaging system. In the end, mice were euthanized, and the tumors and major organs were excised and imaged. To study the distribution of intracellular uptake in tumor cells after intravenous injection, tumors were collected and frozen with the Tissue-Tek (Sakura Finetek) O.C.T. Compound and Cryomold. The tumors were then sectioned into slices with the thickness of 10 μm by a cryo-microtome (CM1950 Cryostat, Leica) and transferred onto charged microscope slides. The slides were fixed in cold 95% ethanol for 2 minutes and then soaked in Tris buffer for 10 minutes. The slides were further soaked in Hoechst 33342 (1 µg mL$^{-1}$) for 10 minutes in the dark for nucleus staining. Then, the slides were examined by the laser-scanning microscope.

Systemic targeting and intracellular transduction of therapeutic proteins for tumor growth inhibition were performed by tail-vein intravenous injection of PBS, gelonin, MP and EMP nanoparticles via the tail vein. 50 µL of EMP solution (equivalent to 80 µg kg$^{-1}$ body weight of gelonin), MP, gelonin, and PBS were intravenously injected into the respective groups of mice every 2 days and three injections per mouse were performed. Both the body weight and tumor size of mice were monitored for 22 days. At day 22, the mice were euthanized, and then tumors and the main organs were collected, washed and frozen for tissue section and histology analysis. For the hematoxylin and eosin (H&E) staining, the slides of tumors and organs were observed by an optical microscope under bright field. For the TUNEL apoptosis assay, the fixed tumor sections were stained by the In Situ Cell Death Detection Kit (Roche Applied Science) according to the manufacturer's protocol and observed by fluorescence microscope.

Statistics. All the results are presented as the means±s.d. Biological replicates were used in all experiments unless otherwise stated. Data were analyzed using Student's t-test when two groups are compared, and one-way analysis of variance (ANOVA) and Tukey post-hoc tests were used when more than two groups were compared (multiple comparisons). Differences between groups were considered statistically significant when two-sided P<0.05. All statistical analyses were performed using the Prism software package (PRISM 7.0; GraphPad Software, USA).

Results and Discussion

An ideal delivery system should encapsulate cargo proteins with high efficiency and capacity in a compatible way, protect the proteins from protease attack and mononuclear phagocyte system clearance in the physiological environment, selectively deliver the protein cargo to targeted tissues and release proteins after internalization. To develop such a biocompatible nanosystem, herein, a biomimetic nanosystem was designed that assembles cargo proteins in pH-responsive metal-organic framework (MOF) nanoparticles and camouflages the nanoparticles with extracellular vesicle membrane (EVM) (FIG. 1). Proteins are caged in the MOF (ZIF-8) (Huang et al., 2006, Angew. Chem. Int. Ed., 45:1557-1559; Banerjee et al., 2008, Science, 319:939-943) matrix by self-assembly of blocks of metal nods (Zn$^{2+}$) and organic ligands (2-methylimidazole) to form the MOF-protein (MP) nanoparticles. The MP nanoparticles possess a large internal surface area and noncovalent affinity (Furukawa et al., 2013, Science, 341:1230444), enabling the remarkably high protein loading efficiency (~94%) and loading capacity (~41%). After internalization by cells, the pH-sensitive metal-ligand bonds enable a release of proteins in acidic endosomes and lysosomes (Sorkin et al., 2002, Nat. Rev. Mol. Cell Bio., 3:600-614). Previous studies have documented that extracellular vesicles (EVs) could contain integrin-associated transmembrane protein CD47 that mediates a "don't eat me" signal to evade from phagocytosis and membrane-anchored proteins to enhance specific endocytosis by homotypic cells (Kamerkar et al., 2017, Nature, 546:498-503; Wan et al., 2017, Nat. Biomed. Eng., 1:0058; Jaiswal et al., 2009, Cell, 138:271-285; El Andaloussi et al., 2013, Nat. Rev. Drug Discov., 12:347-357). Thus, it is promising that camouflage of the nanoparticles with EVM to mimic the EVs would assist the nanoparticles to escape from the phagocytosis, target specific tissue and penetrate the membrane barriers to achieve systemic and intracellular protein delivery. To demonstrate the overall approach, gelonin, a rRNA disruption N-glycosidase, was caged as the cancer therapeutic protein to form MP nanoparticles of ~80 nm in diameter, and enveloped the MP nanoparticles with EVM derived from MDA-MB-231 tumor cells. In vitro and in vivo experiments demonstrate that EMP nanoparticles can protect the cargo protein, reduce uptake by the mononuclear phagocyte system, enhance blood circulating time, preferentially be delivered to the homotypic tumor from which the EVs derived, and achieve significant therapeutic efficacy in cancer treatment.

Figures 2A, 2B, 2C, 2D, 2E:
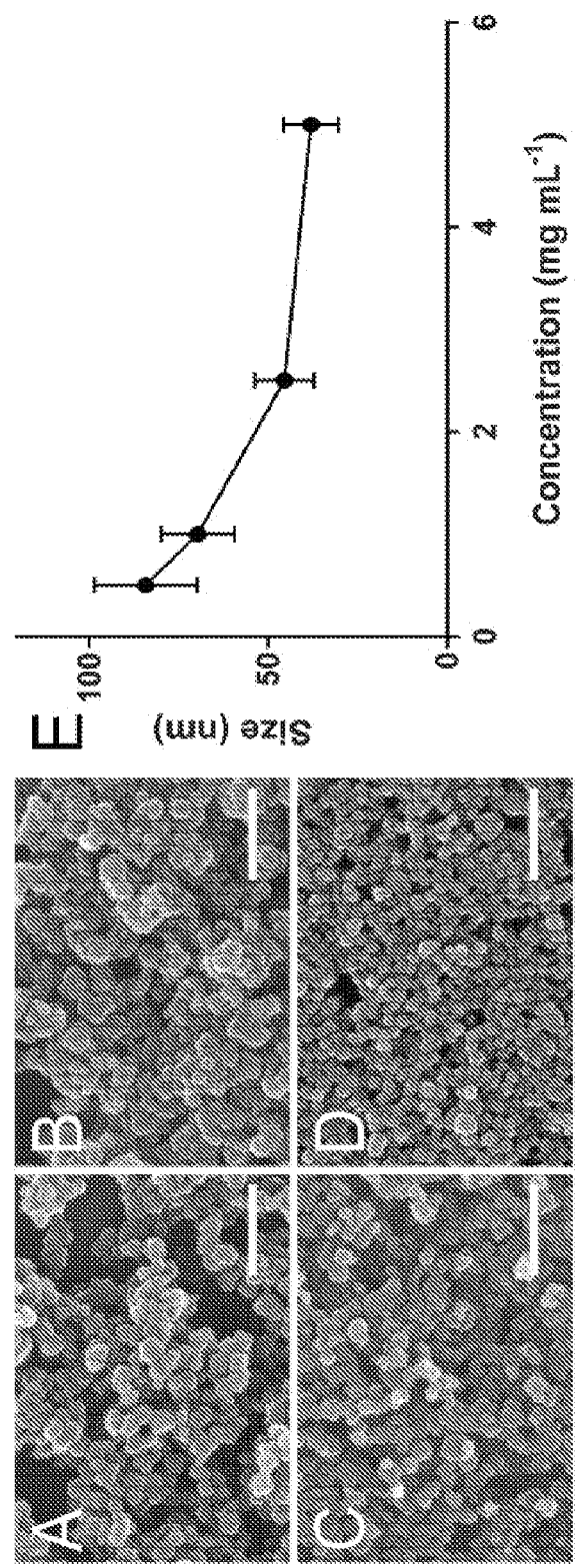
FIGS. 2A-E, depicts that the morphology and size of MOF nanoparticles can be tuned by the concentration of organic ligands.
Figures 3A, 3B, 3C, 3D, 3E:
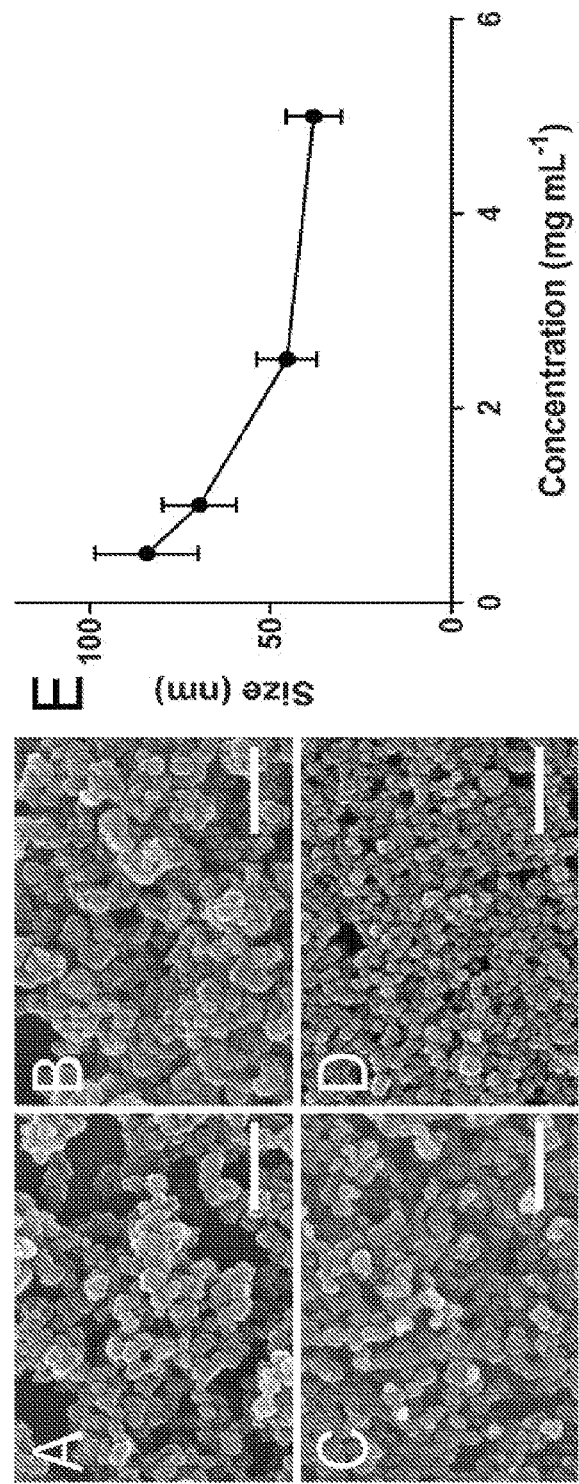
FIGS. 3A-E, depicts that the morphology and size of MP nanoparticles can be tuned by the concentration of the proteins.
Figures 4A, 4B, 4C, 4D, 4E, 4F, 4G:
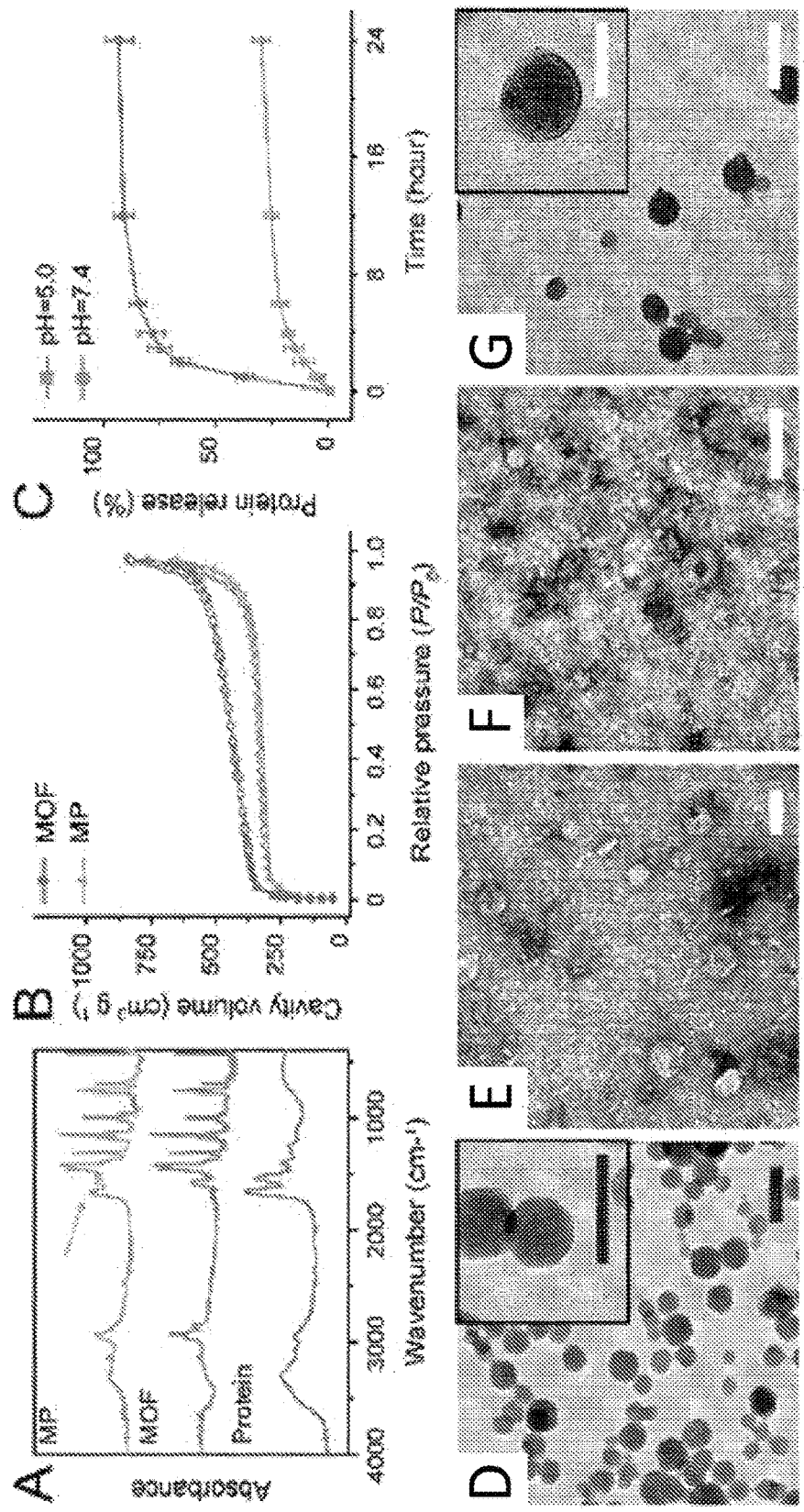
Figures 5A, 5B, 5C, 5D, 5E, 5F:
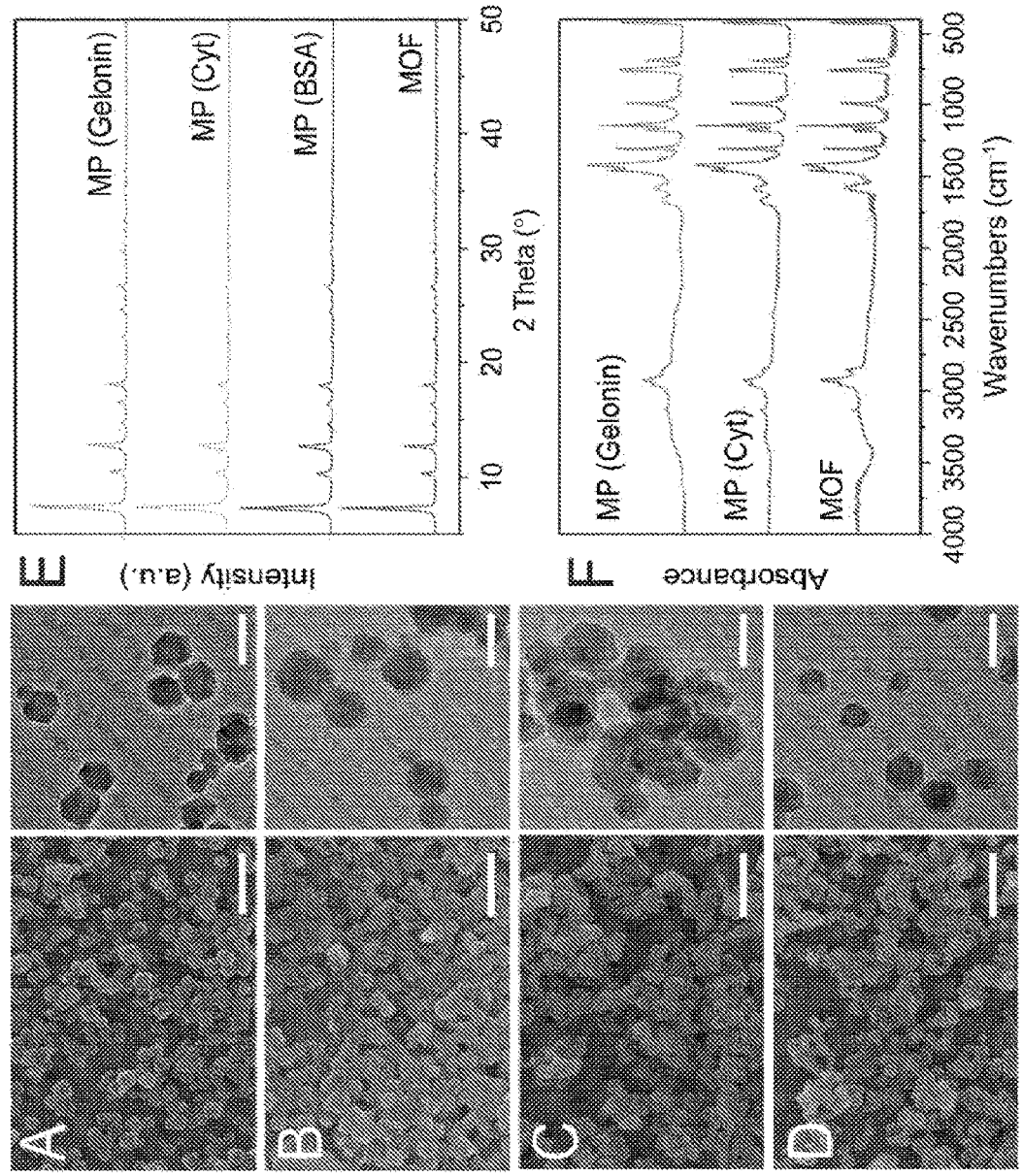
FIGS. 5A-F, depicts characterization of the self-assembly of MP nanoparticles.
Figures 7A, 7B:
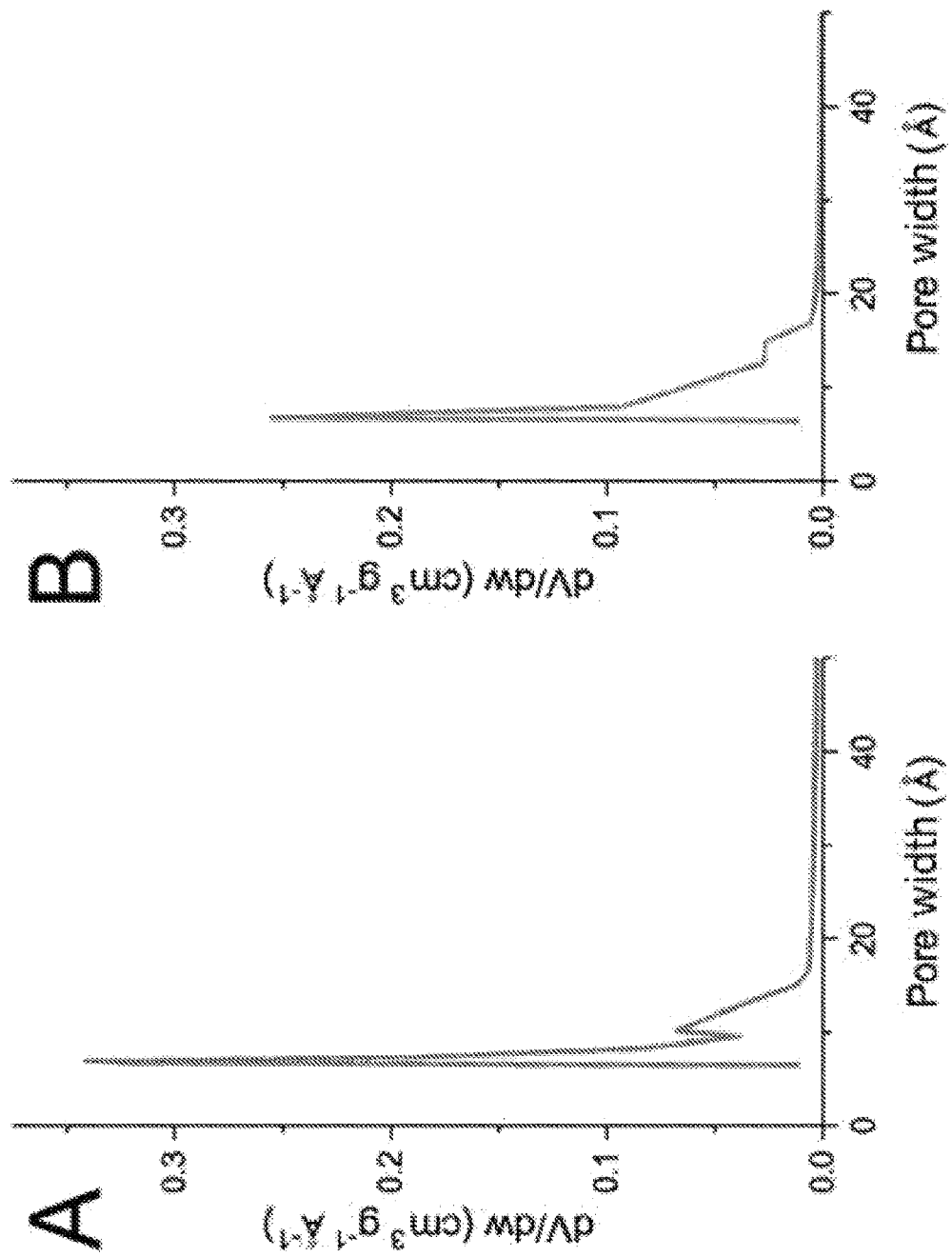
FIGS. 7A-B, depicts that the incorporation of protein cargos does not greatly impair the pore structure of MOFs.
Figures 8A, 8B, 8C, 8D, 8E:
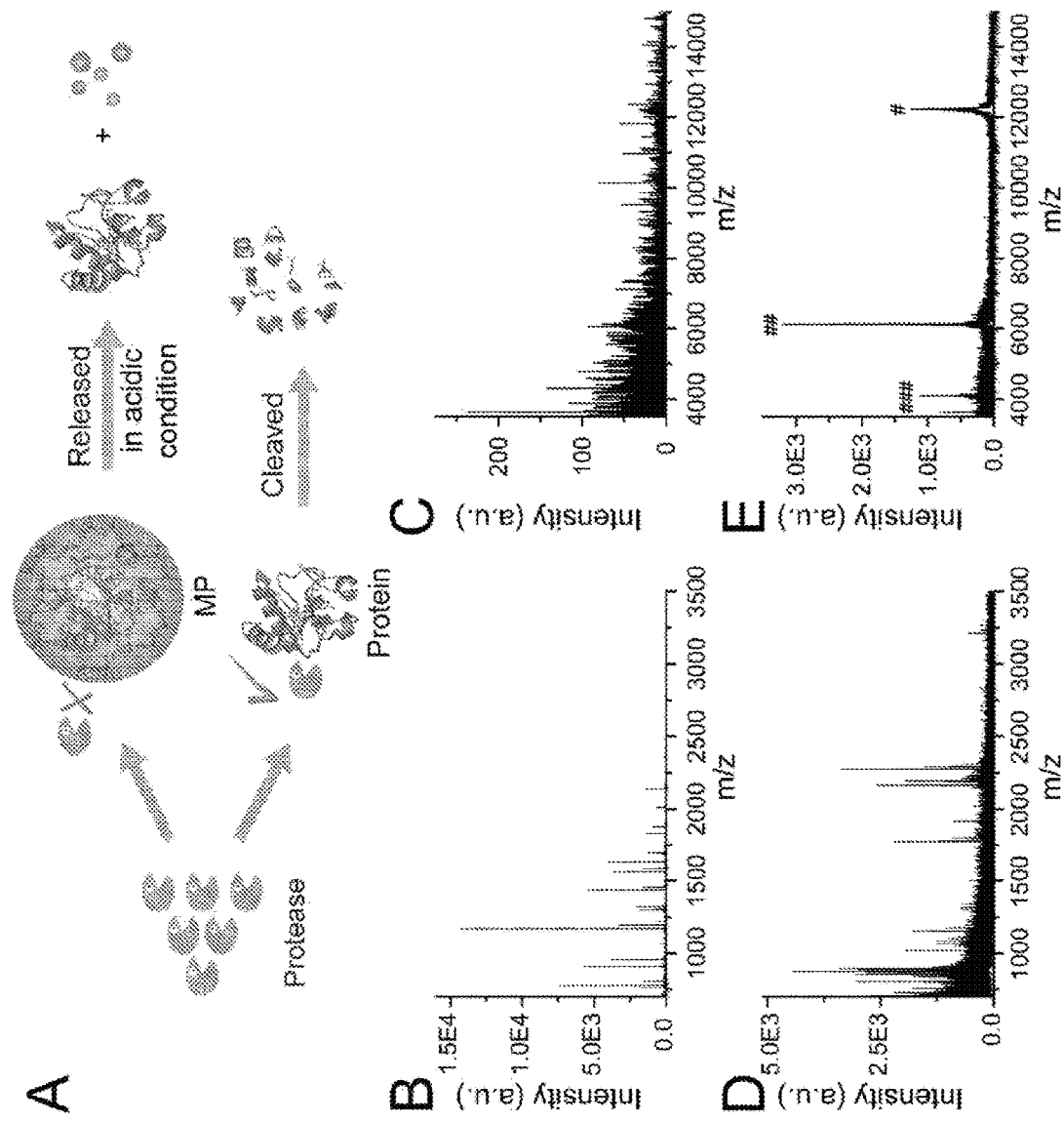
FIGS. 8A-E, depicts that MP nanoparticles protect caged proteins from degradation by protease trypsin.
Figures 9A, 9B:
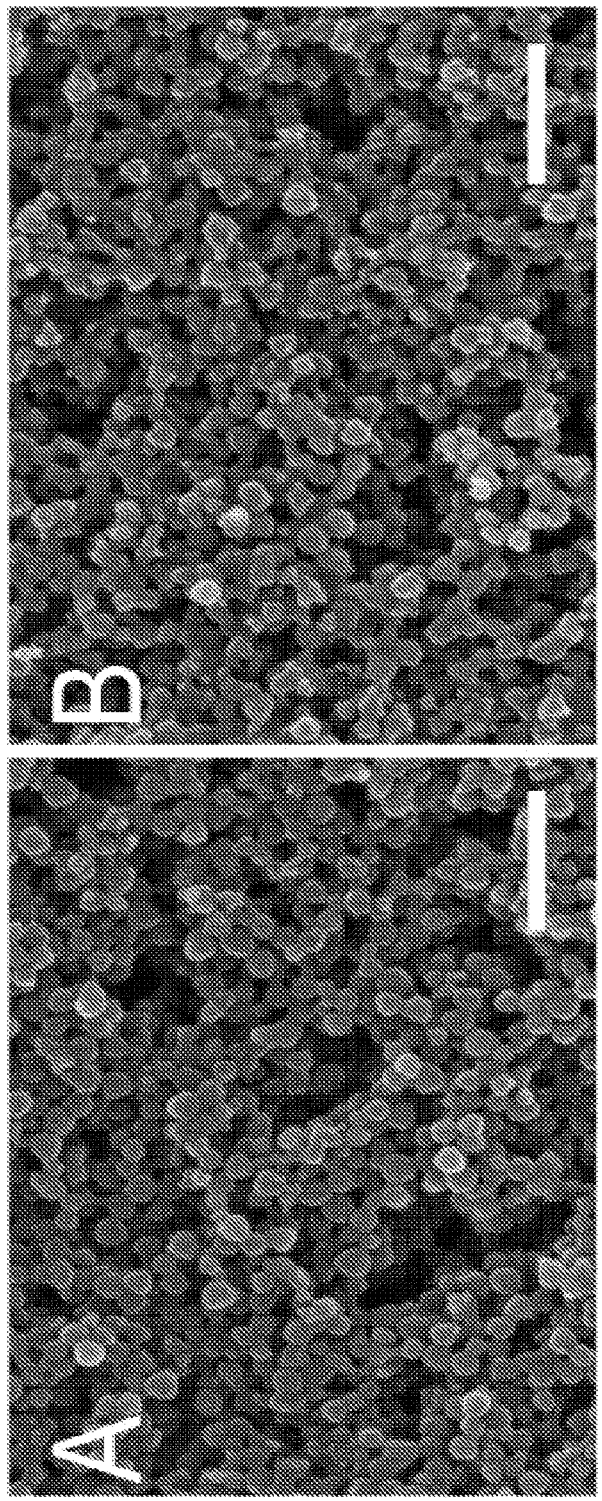
FIGS. 9A-B, depicts that MP nanoparticles are stable at physiological pH.
Figure 10:
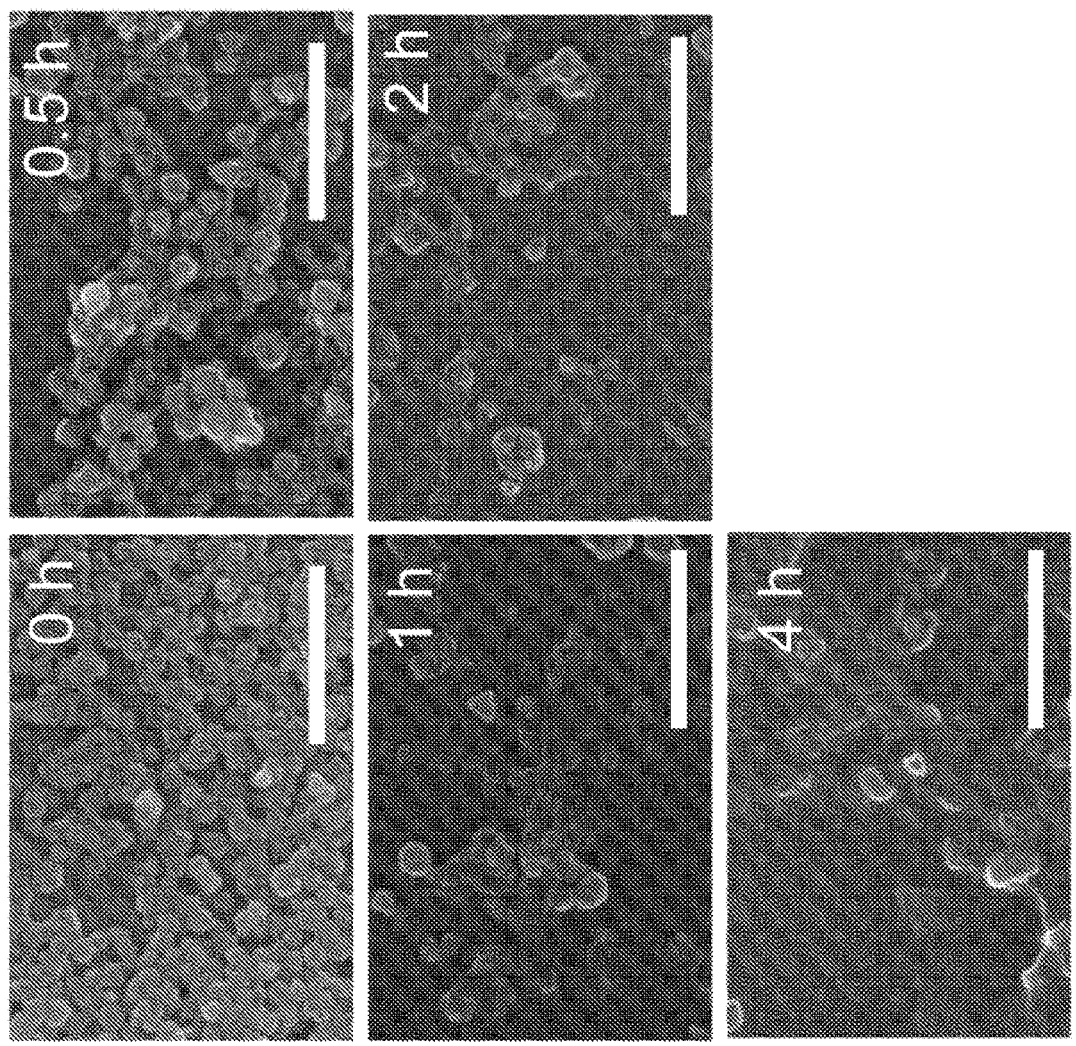
FIG. 10 depicts SEM images of the MP nanoparticles after incubation with acidic buffer (pH=5.0) with different time intervals, demonstrating that the MP nanoparticles are pH-responsive. Scale bars: 500 nm.

Assembly, Optimization, and Characterization of MP and EMP nanoparticles. Protein cargos are encapsulated in MOF (ZIF-8) nanoparticles by self-assembly in an aqueous phase. By taking advantage of the flexible design of metal-organic nanoparticles, the morphology and diameter of MP nanoparticles were tuned to the optimal size range for delivery (Wilhelm et al., 2016, Nat. Rev. Mater., 1:16014), which was realized by adjusting the concentration of the organic ligands (FIG. 2) and proteins (FIG. 3). Various proteins with different isoelectric points or molecular weight, including bovine serum albumin (BSA), cytochrome c (Cyt c), and gelonin, are encapsulated in MP nanoparticles without altering the morphology or crystal structure of the MOF matrix (FIG. 4A-D, FIG. 5, Table 1). Successful incorporation of protein cargos in MP nanoparticles is evidenced by the presence of characteristic protein absorption peaks around 1667 cm$^{-1}$ (C=O) (Barth, 2007, BBA-Bioenergetics, 1767:1073-1101) in Fourier transform infrared (FTIR) spectroscopy (FIG. 4A, FIG. 5F). Importantly, the protein loading efficiency (percentage of MP encapsulated proteins over total proteins) is as high as ~94% at low initial protein concentration. Over ~41% protein loading capacity (weight percentage of proteins in MP nanoparticles) can be achieved at high initial protein concentration (FIG. 6A-D). It is 3-50 times of those achieved by surface conjunction or adsorption (Zhou et al., 2013, Adv. Mater., 26:2424-2430; Xiang et al., 2015, ACS Nano, 9:6401-6411), which would greatly reduce the therapeutic dosage. Importantly, MOFs have characteristic small pore aperture size of ~1 nm (FIG. 7A-B), and MP nanoparticles also inherit the unique porous structure (FIG. 4B). Thus, the MP nanoparticles could exclude the proteases (size: 2-10 nm) (Smith et al., 2013, Nat. Rev. Immunol., 13:592-605), a major threat for proteins in the biological environment, from accessing the caged proteins, thereby protecting the caged proteins against digestion by protease (FIG. 8A-E). Moreover, the MP nanoparticles are pH-responsive for stimulus-release of guest cargos (FIG. 4C). Although the MP nanoparticles are stable at physiological pH (FIG. 9A-B), they degraded in a few hours under acidic conditions (FIG. 10), as metal-ligand bonds in MOFs are easily hydrolyzed to yield the protonated ligand under acidic condition (Howarth et al, 2016, Nat. Rev. Mater., 1:15018).

TABLE 1

Loading efficiency and loading capacity of MP nanoparticles for various proteins incorporated at the protein concentration of 2.5 mg mL$^{-1}$.

| Nanoparticles | Protein | Protein molecular weight | Protein isoelectric point | Loading efficiency (%) | Loading capacity (%) |
|---|---|---|---|---|---|
| MP (BSA) | BSA | 66k Da | ~5.4 | 88.0 | 22.91 |
| MP (Cyt c) | Cytochrome c | 12k Da | ~9.4 | 34.6 | 7.8 |
| MP (gelonin) | Gelonin | 30k Da | ~8.15 | 70.2 | 17.3 |

Figures 11A, 11B:
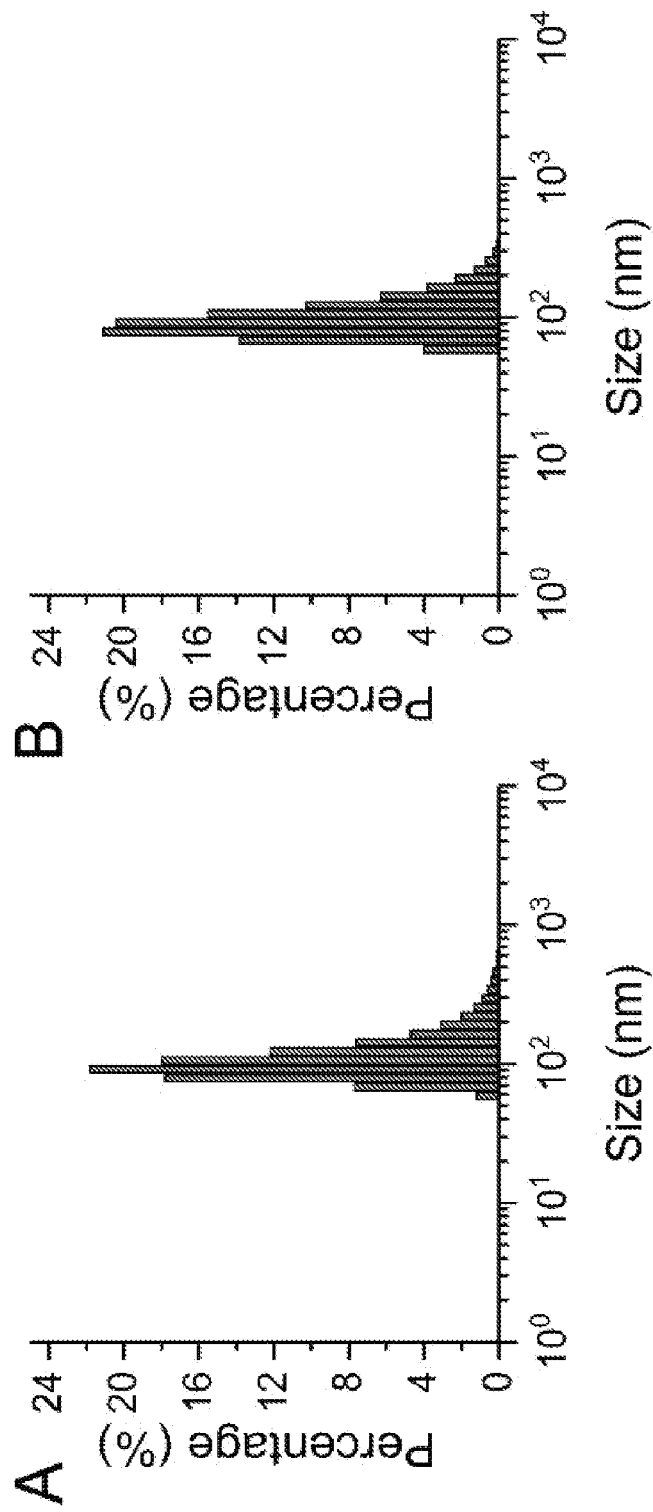
FIGS. 11A-B, depicts analysis of the DLS results.
Figure 12:
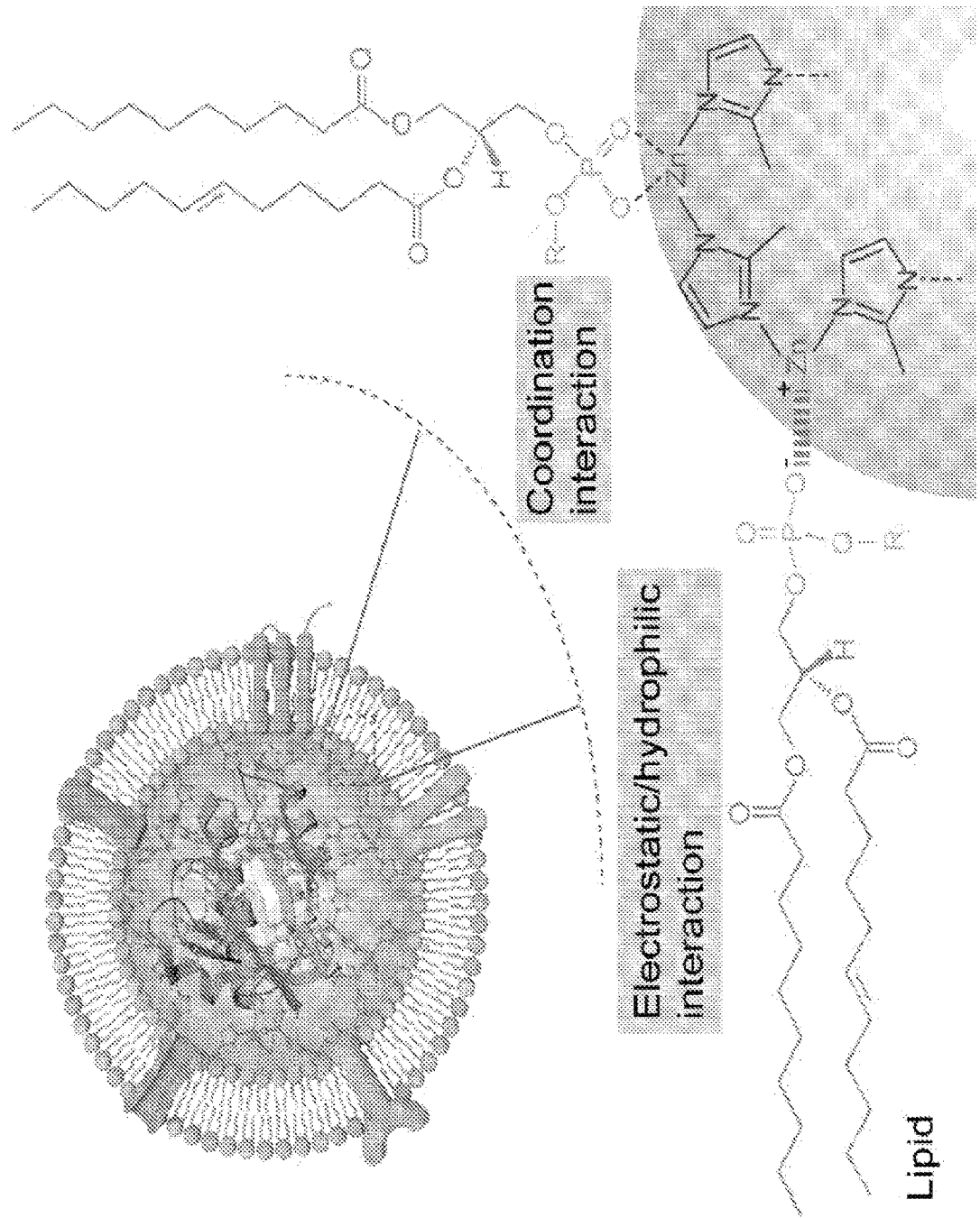
FIG. 12 depicts an illustration of the interactions between the MOF matrix and decoration by EVM. Self-assembly of the EMP nanoparticles could be driven by electrostatic and hydrophilic interactions between the negatively charged EVM and the positively charged MOF matrix surface. Moreover, the unsaturated zinc ions on the surface of MOF matrix could also serve as the anchorages to strongly complex with the P—O bonds in phospholipids molecules from the EVM.
Figures 13A, 13B:
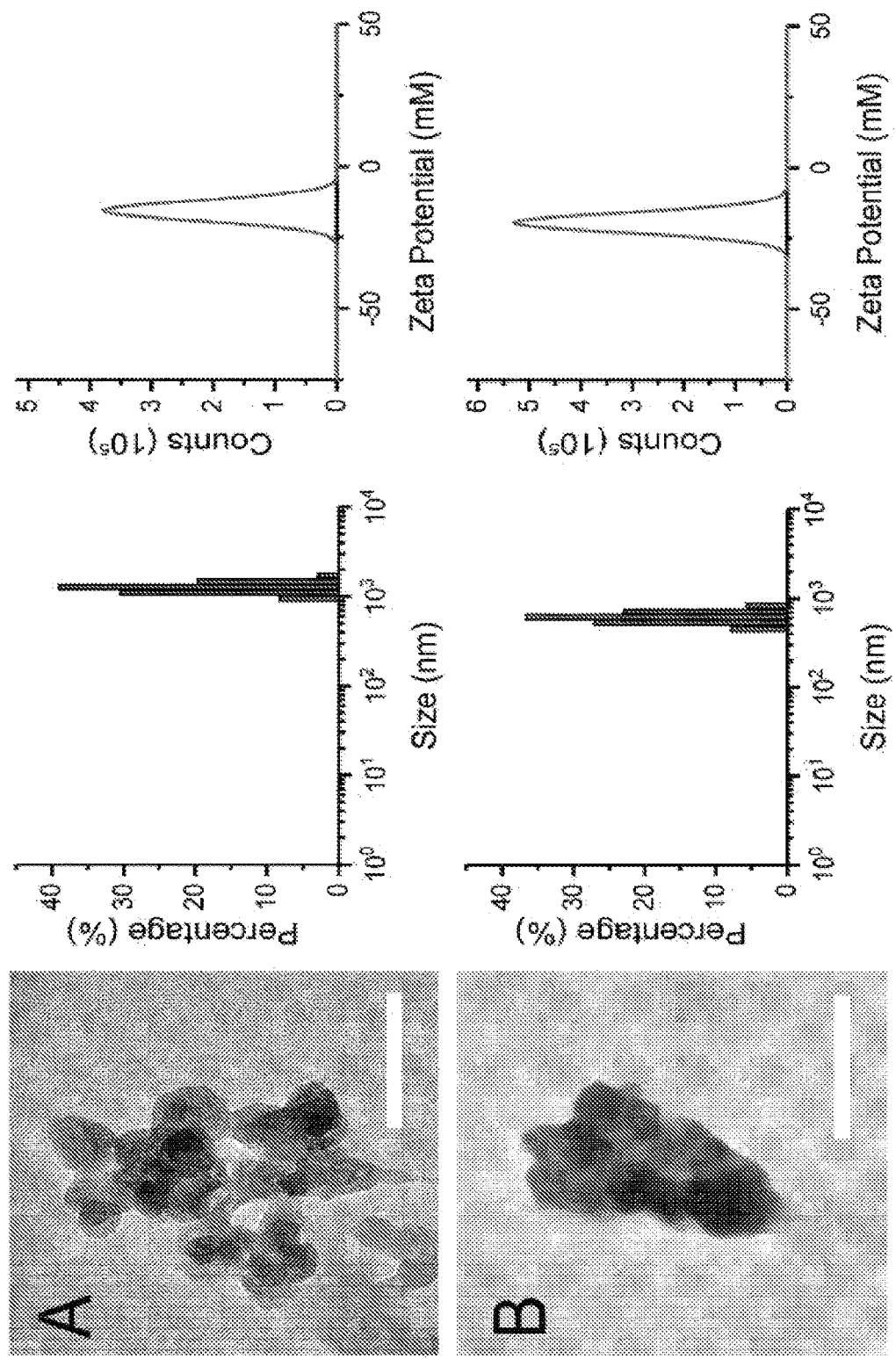
FIGS. 13A-D, depicts the optimization of self-assembly of EVM to envelope MP nanoparticles for construction of EMP nanoparticles.
Figures 13C, 13D:
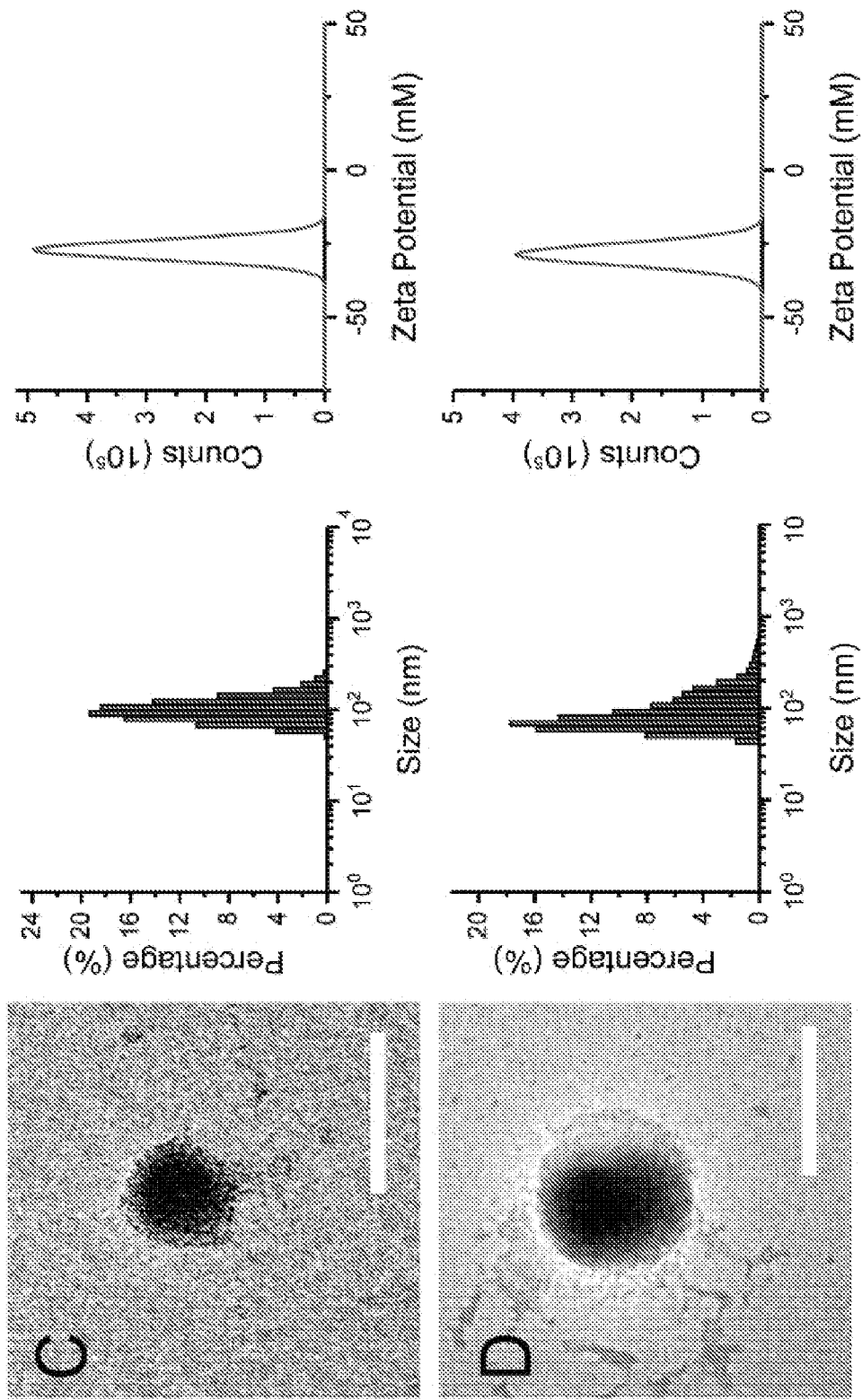
Figures 14A, 14B:
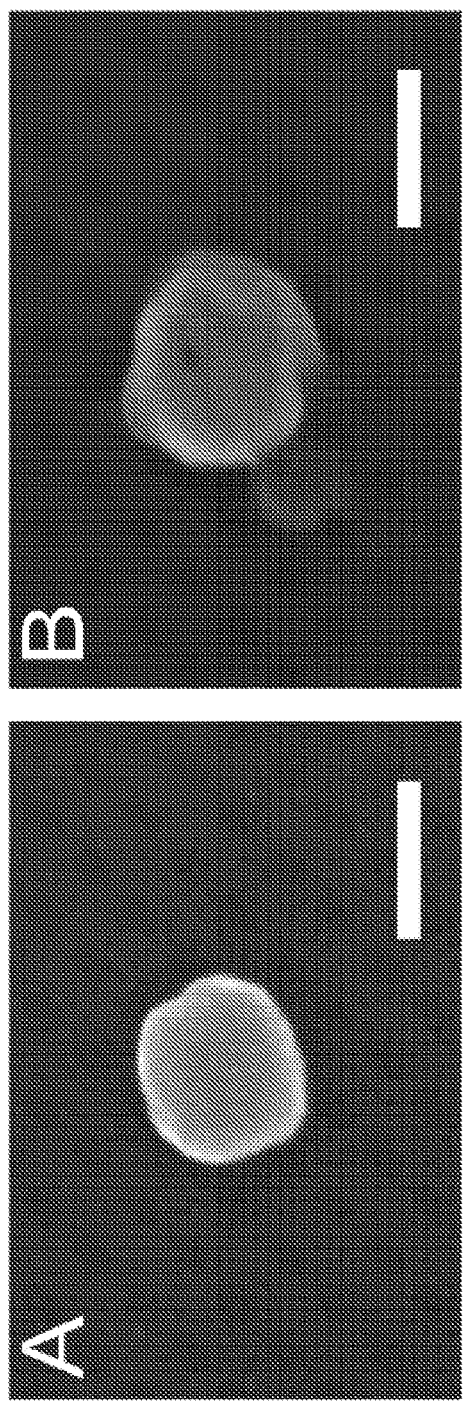
FIGS. 14A-B, depicts nanoparticle SEM images.
Figure 15:
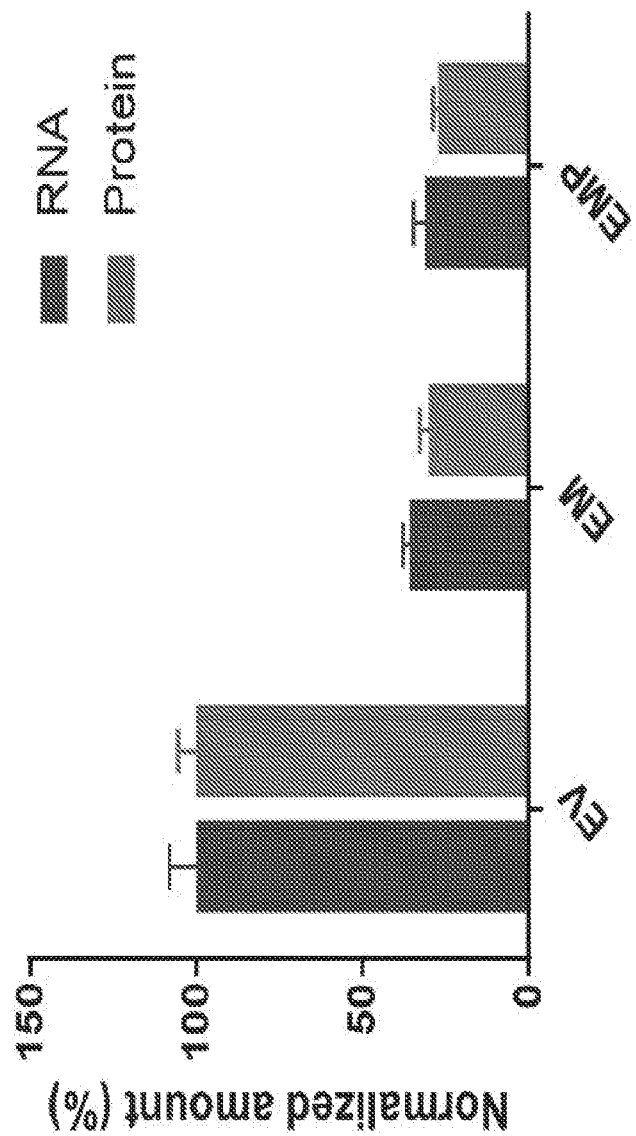
FIG. 15 depicts that hypotonic treatment depletes the majority of RNA and proteins from EVs and reconstitutes the EV membrane. The chart shows total protein and RNA analyses of EVs, reconstructed EV membrane (EM), and EMP nanoparticles (n=3).
Figures 16A, 16B, 16C, 16D:
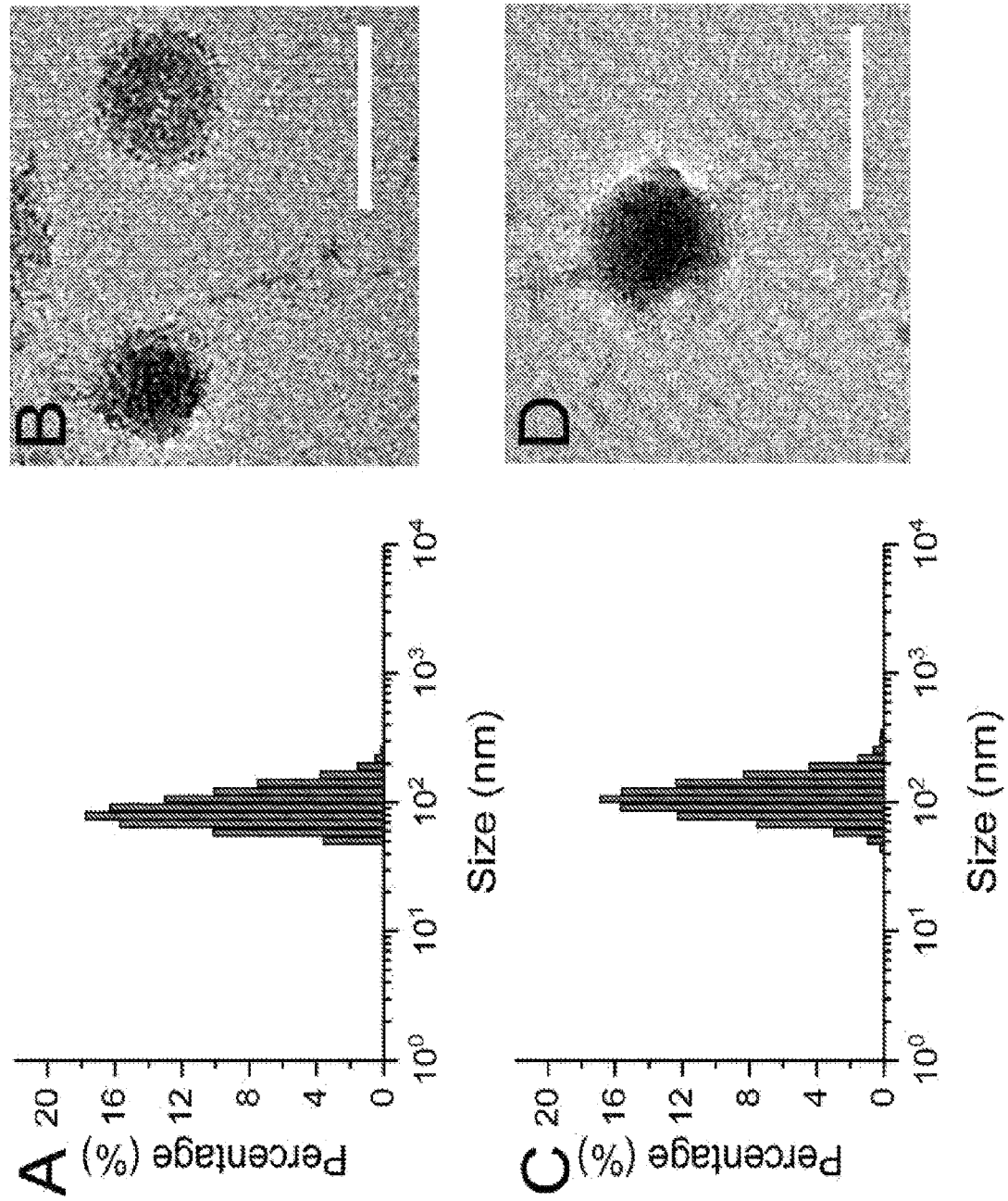
FIGS. 16A-D, depicts that EMP nanoparticles are stable without significant change of size or loss of camouflaged EVM.

EVs were collected by ultracentrifugation from the culture medium of human breast adenocarcinoma MDA-MB- 231 cells (FIG. 2E) (Wan et al., 2017, Nat. Biomed. Eng. 1:0058). EVM (FIG. 4F) was extracted through a hypotonic treatment and followed by ultracentrifugation to reconstitute the proteolipid patches (FIG. 11A-B). Self-assembly of the EVM on MP nanoparticle surface was driven by ultrasonication and repeated extrusion. Notably, some specific interactions (e.g. electrostatic, hydrophilic and coordination) (Ojida et al., 2006, J. Am. Chem. Soc., 128:2052-2058; Parodi et al., 2013, Nat. Nanotechnol., 8:61-68; Yang et al., 2017, Chem. Mater., 29:4580-4589) between the EV membrane and MOF matrix particles could contribute to the successful preparation of the EMP nanoparticles (FIG. 12). The ratio of EVM to MP nanoparticles was optimized to modulate the uniformity, membrane thickness and surface stability of the coating (FIG. 13A-D). As a result, EVM patches and vesicles leads to complete coverage of the MP nanoparticle was completed covered by the EVM patches and vesicles and formed a distinctive corona structure of the EMP nanoparticles (FIG. 4G), and the surface morphology is slightly changed due to the presence of biofunctional membrane on nanoparticles (FIG. 14A-B). This strategy could deplete most of the tumorigenic contents (~75% EV proteins and ~70% EV RNA) inside the EVs (FIG. 15), reducing the potential risk of tumor metastasis and growth resulted by EVs in the downstream application. Over 97% of the MP nanoparticles are successfully decorated with the EVM (FIG. 4H). Biomimetic nanoparticles without loading cargo proteins have the similar protein molecular weight distribution pattern as the EVM (FIG. 4I) while different from that of EVs, implying they inherit surface receptors and membrane proteins of the EVM. Physicochemical characterizations show that the final EMP nanoparticles have slightly larger size than the bare MP nanoparticles (FIG. 4J, 4K, and Table 2) and possess the nearly equivalent surface charge to that of EV and EVM (FIG. 4L). The stability of the EMP nanoparticles was tested over time through dynamic light scattering (DLS) and transmission electron microscopy (TEM) analyses (FIG. 16A-D). Even after 3 days, the size and morphology of the EMP nanoparticles have no significant change in comparison to the freshly prepared ones, which can be attributed to the stabilizing effect by the biological membrane's hydrophilic surface glycans (Hu et al., 2015, Nature, 526:118-121).

TABLE 2

Physicochemical characterization of nanoparticles.

| Nanoparticles | Size (nm) | Polydispersity (PDI) | Zeta potential (mV) |
| --- | --- | --- | --- |
| MP | 76.2 ± 32.7 | 0.18 | −2.06 ± 2.69 |
| EV | 115.0 ± 55.7 | 0.234 | −28.9 − 3.6 |
| EVM | 101.5 ± 36.8 | 0.13 | −30.8 ± 4.0 |
| EMP | 94.6 ± 32.5 | 0.12 | −26.4 ± 3.6 |

Reduced particle opsonization and phagocytosis. Nanoparticles adsorb proteins from physiological fluids, which affects their biological identity, results in the recognition and clearance by phagocytes, and ultimately determines the biological fate of nanoparticles (Monopoli et al., 2012, Nat. Nanotechnol., 7:779-786; Tenzer et al., 2013, Nat. Nanotechnol., 8:772-781; Schöttler et al., 2016, Nat. Nanotechnol., 11:372-377). To study if the biomimetic EMP nanoparticles can reduce the adsorption of highly abundant serum proteins, EMP nanoparticles were incubated with fluorescent IgG. Indeed, EMP nanoparticles reduced approximately 6-fold than bare MP nanoparticles. In comparison to liposome-enveloped MP nanoparticles (LMP), the EMP nanoparticles also reduced 4-fold of protein adsorption (FIG. 17A, B), indicating the critical role of the EVM for reducing opsonization.

Figures 17A, 17B:
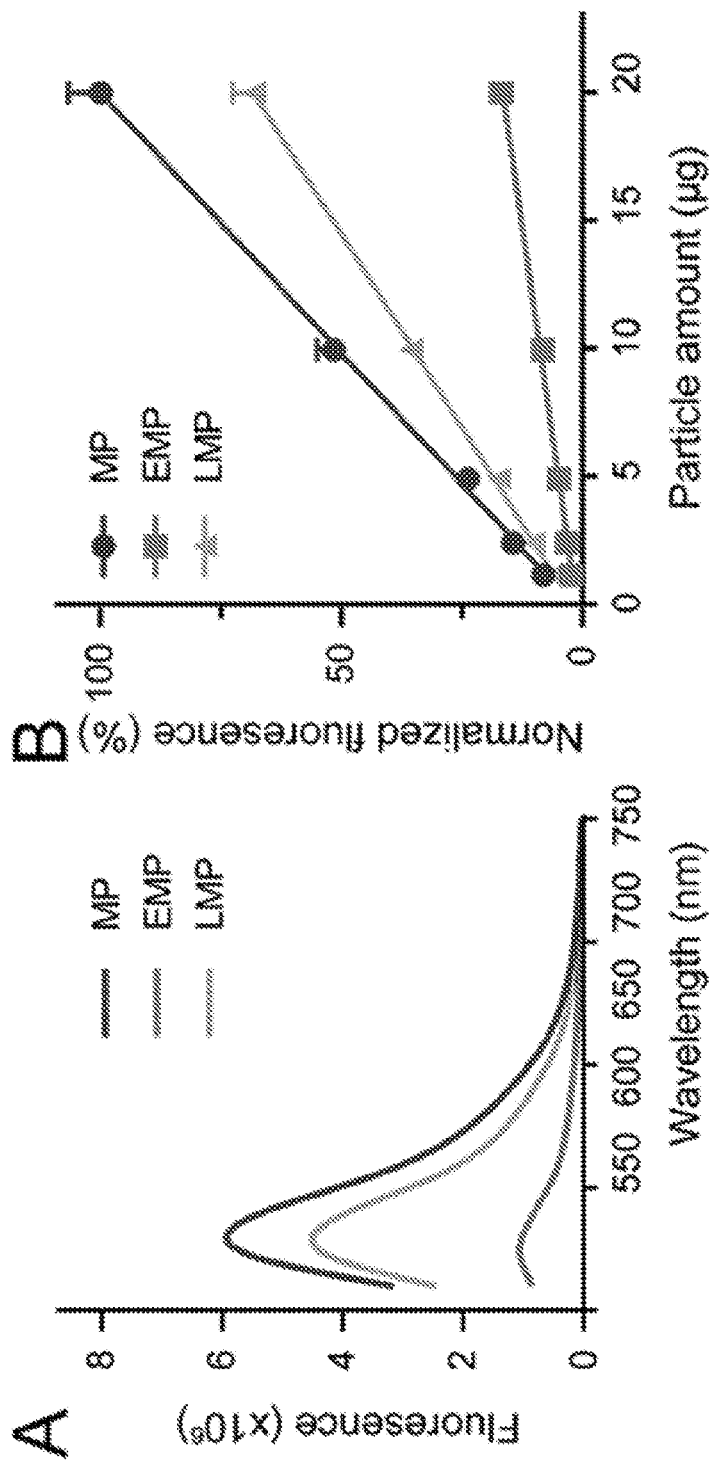
FIGS. 17A-E, depicts that biomimetic EMP nanoparticles reduce surface opsonization and prevent phagocytosis.
Figure 17C:
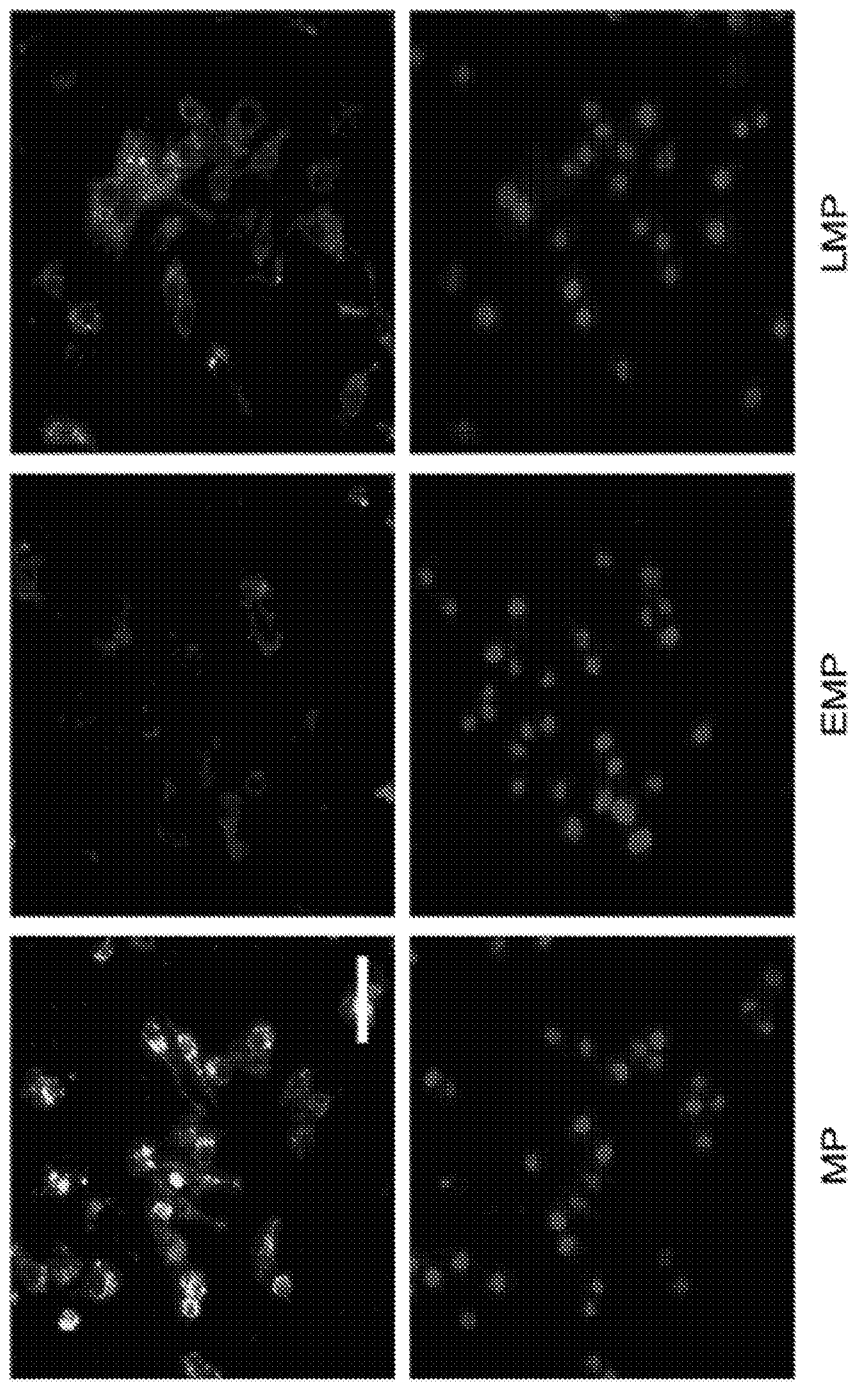
Figures 17D, 17E:
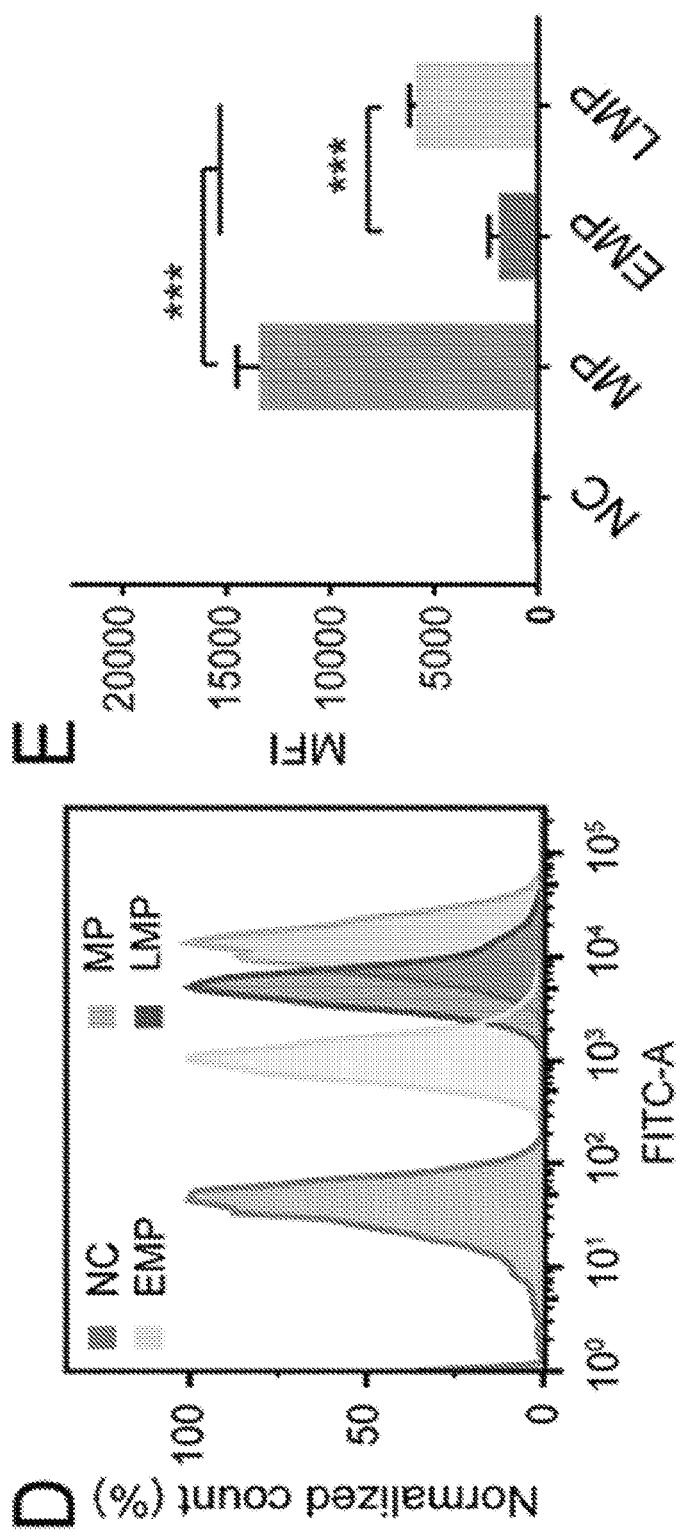

Macrophages are major components of the immune defense system and play a critical role in clearing foreign objects from the circulation. Therefore, the ability of the biomimetic EMP nanoparticles to inhibit the internalization by macrophages was studied using a murine macrophage-like cell line RAW264.7. MP, EMP and LMP nanoparticles encapsulated with equivalent fluorescence proteins were incubated with the RAW264.7 cell for 2 hours. Laser scanning microscopy (FIG. 17C) clearly shows the apparent decrease of internalization of nanoparticles by the camouflage of the EV membrane. Flow cytometry analysis further confirms that uptake of the EMP nanoparticles is only ~30% of that of the original MP nanoparticles (FIG. 17D, E). More intriguingly, the stealth effect of EVM cannot be simply replaced by the lipid membrane (FIG. 17E), although the envelope of lipid membrane also reduced the absorption of serum proteins (FIG. 17A, B). Notably, different from the pure LMP, EMP also contain certain membrane proteins. Previous studies have also demonstrated the presence of CD47 antigen on MDA-MB-231 cells derived EVs (Wan et al., 2017, Nat. Biomed. Eng., 1:0058; Kowal et al., 2016, Proc. Natl. Acad. Sci., 113:E968-E977), which could mediate signal to resist the phagocyte-dependent clearance (Jaiswal et al., 2009, Cell, 138:271-285; Liu et al., 2015, Nat. Med., 21:1209-1215).

Figure 18A:
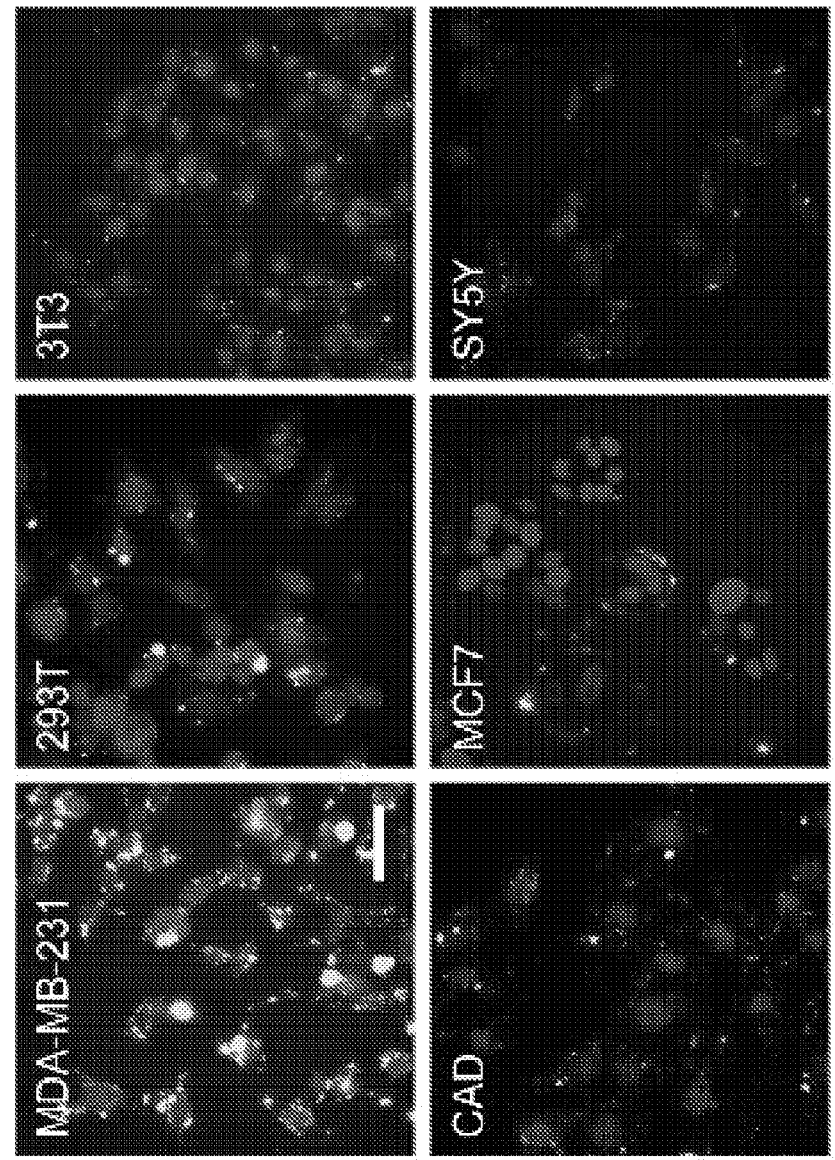
FIGS. 18A-D, depicts that EMP nanoparticles assist tumor cell targeting and promote the intracellular transduction of protein cargos.
Figure 18B:
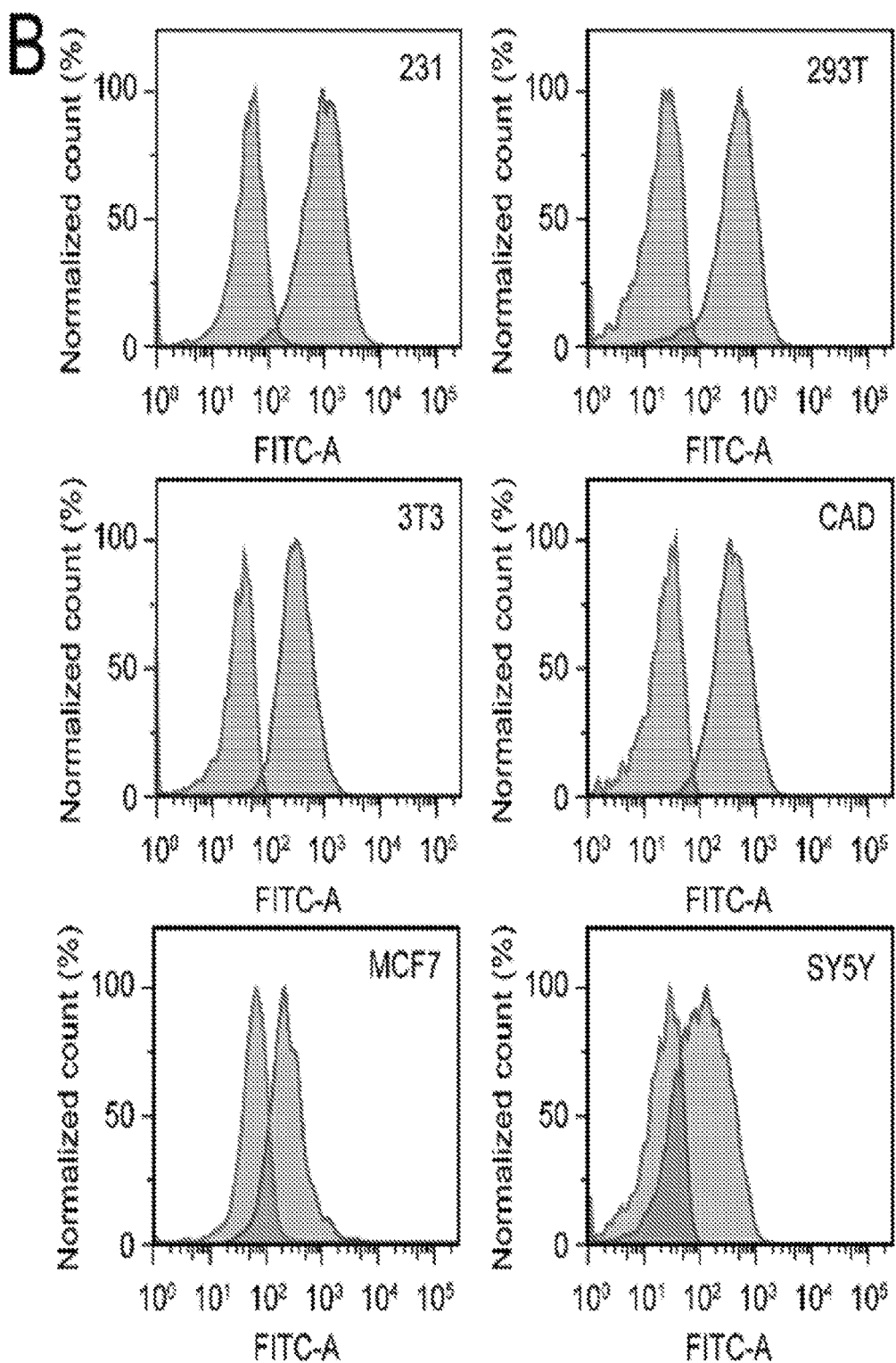
Figures 18C, 18D:
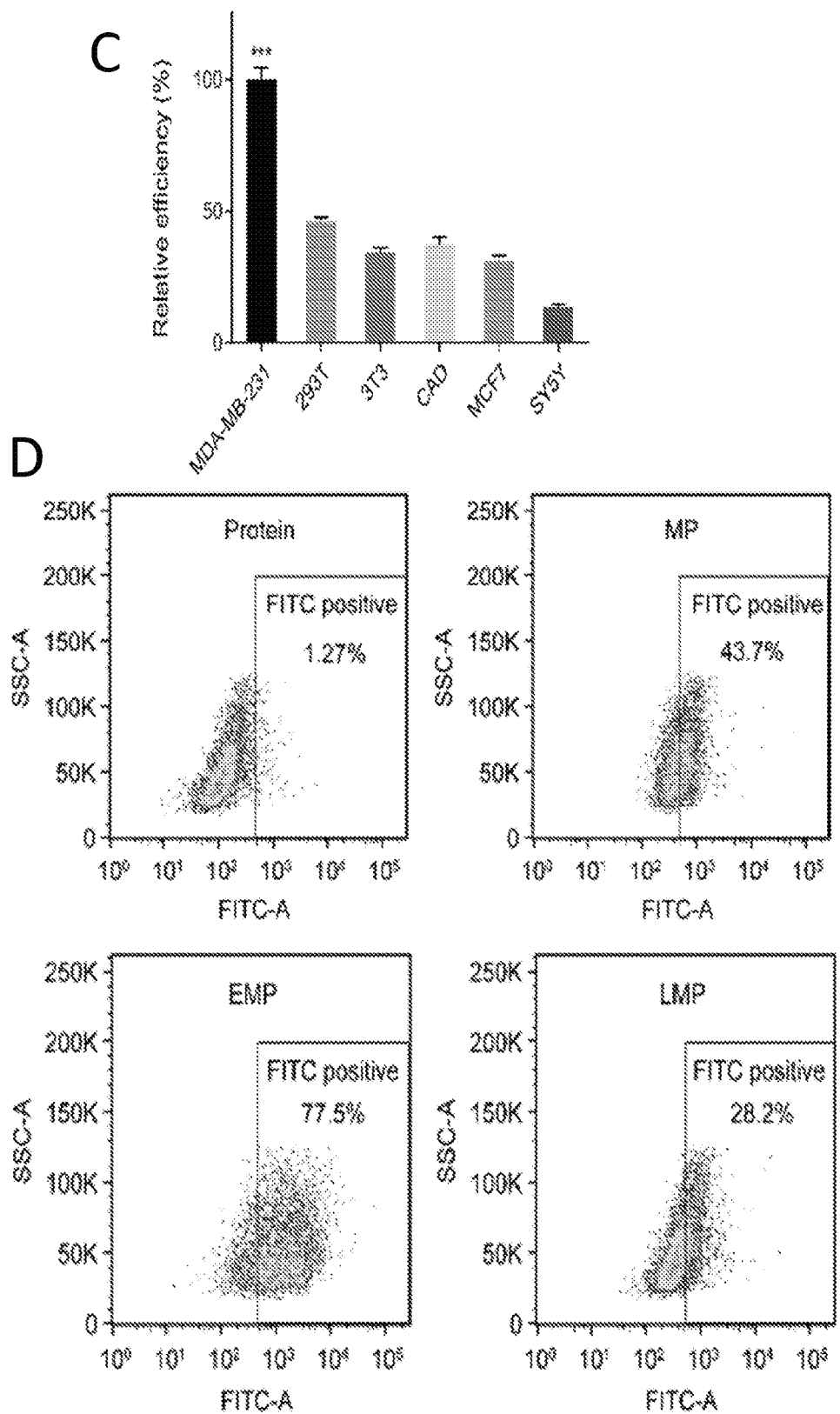
Figures 19A, 19B:
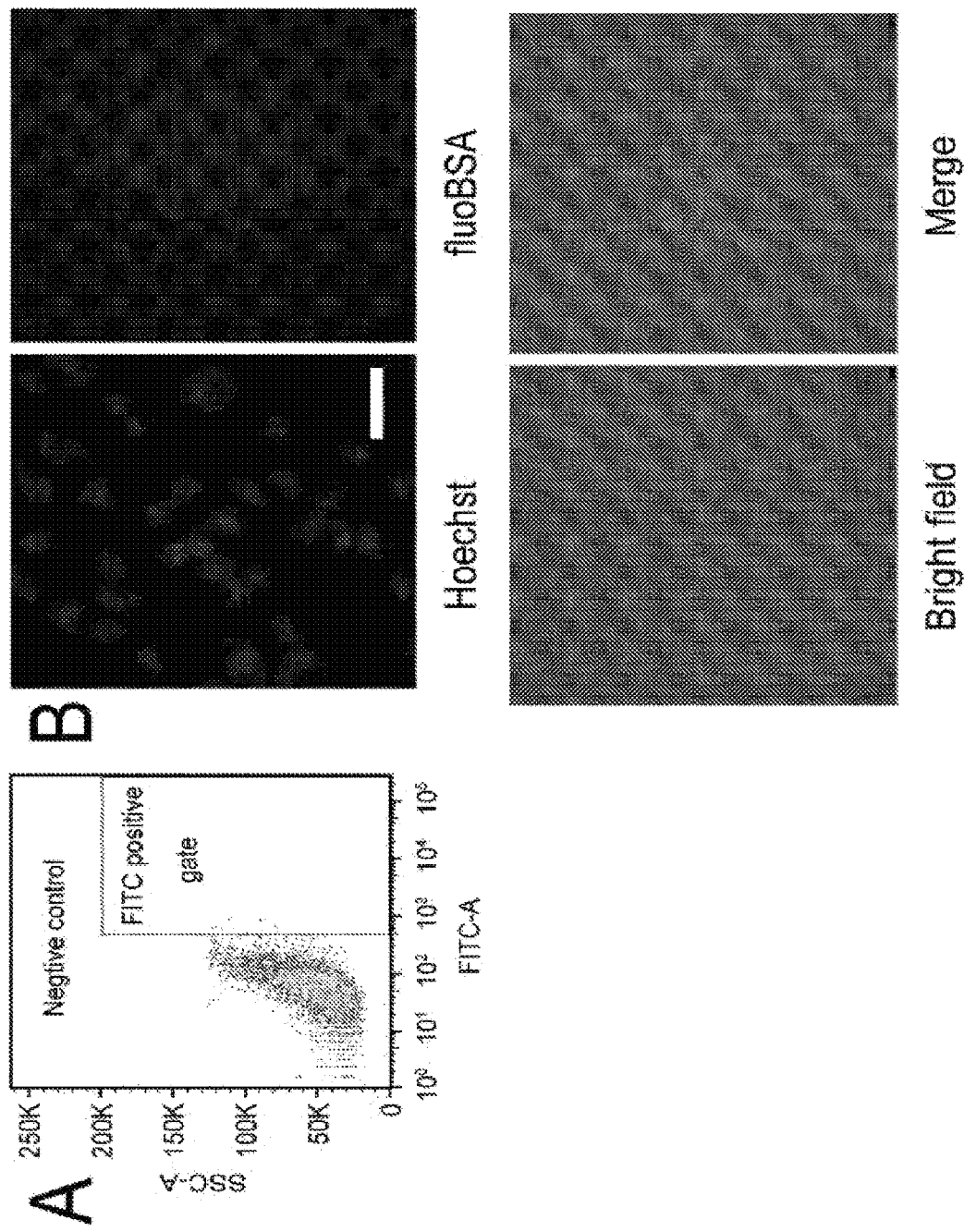
FIGS. 19A-B, depicts the negative control of MDA-MB-231 cells for protein transduction.
Figure 20:
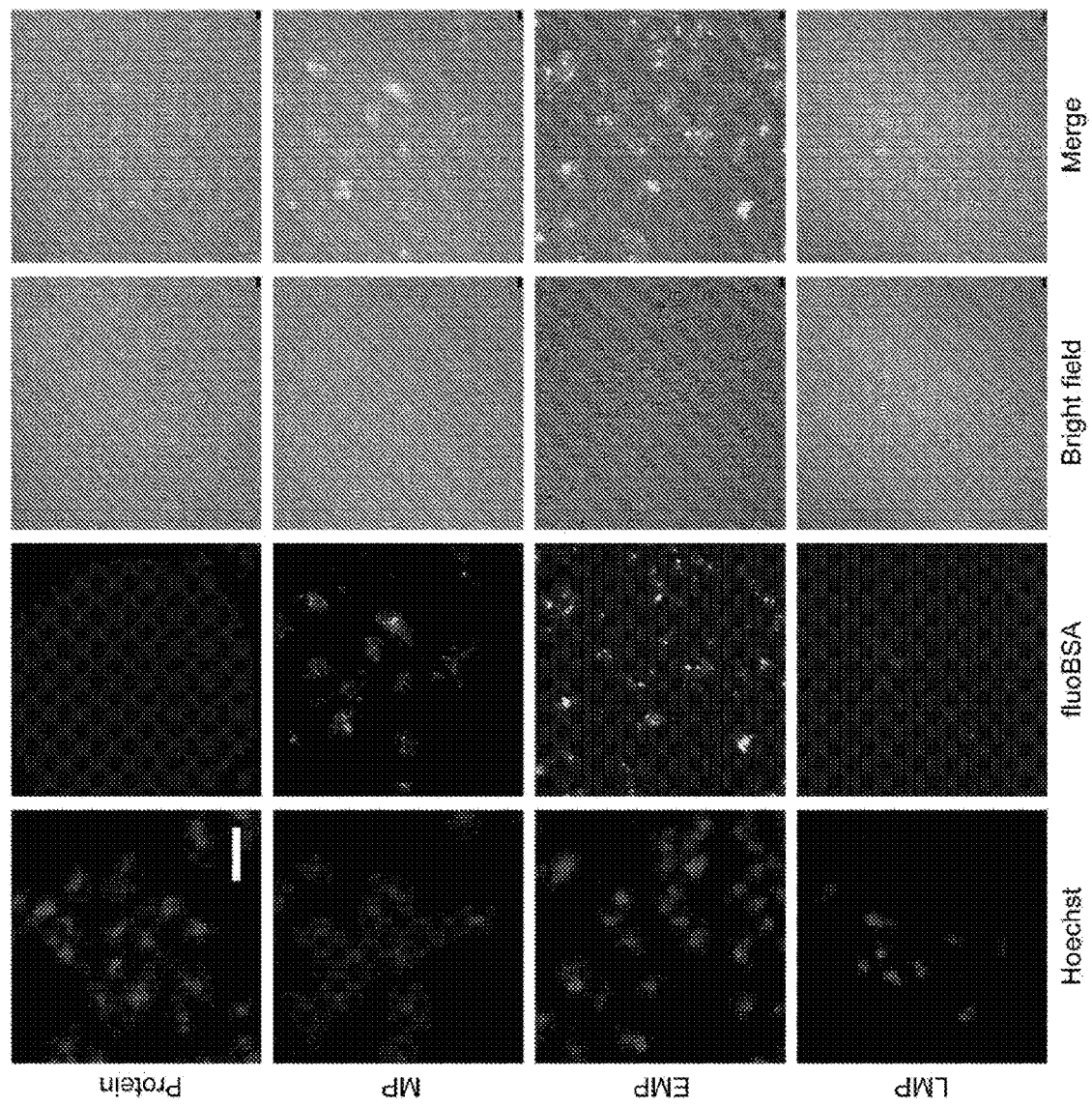
FIG. 20 depicts laser scanning microscopy images of MDA-MB-231 after protein transduction with pure protein, MP, EMP, and LMP nanoparticles. Scale bar: 50 µm. The data show that biomimic EMP nanoparticles enable the specific targeting of the homotypic cells and enhance the protein transduction. No apparent protein transduction was observed in cells incubated with pure proteins. In comparison to MP nanoparticles, the biomimetic camouflage of EV membrane could increase the protein transduction while coating the lipid layer reduced the uptake of MP nanoparticles.

Homotypic targeting of MDA-MB-231 tumor cells and assisted intracellular protein delivery using EMP nanoparticles. EVs can recognize specific cell types through their surface receptors, and tumor cell-derived EVs can preferentially target certain distant cells and tissues (Gay et al., 2011, Nat. Rev. Cancer, 11:123-134). Homotypic self-seeding has been proposed as an important mechanism for tumor growth (Kim et al., 2009, Cell, 139:1315-1326). Therefore, it was hypothesized that EMP nanoparticles enveloped with specific tumor-cell derived EVM could target tumors from which the EVs are derived. To confirm the homotypic targeting ability of EMP nanoparticles, the biomimetic nanoparticles with EVM derived from MDA-MB-231 tumor cells were incubated with different cells, including MDA-MB-231, mouse embryo fibroblasts 3T3, human breast adenocarcinoma cells MCF7, mouse central nervous system-derived cells CAD, human neuroblastoma cells SH-SY5Y, and human embryonic kidney cells 293T. As revealed by flow cytometry and laser scanning microscopy (FIG. 18A, B), MDA-MB-231 cells exhibit highest uptake efficiency of the EMP nanoparticles, about 2-8 folds higher than other cells in the group (FIG. 18C). These results reveal highly homotypic-targeting interaction can be achieved between the EMP nanoparticles and the source tumor cells.

Figure 21:
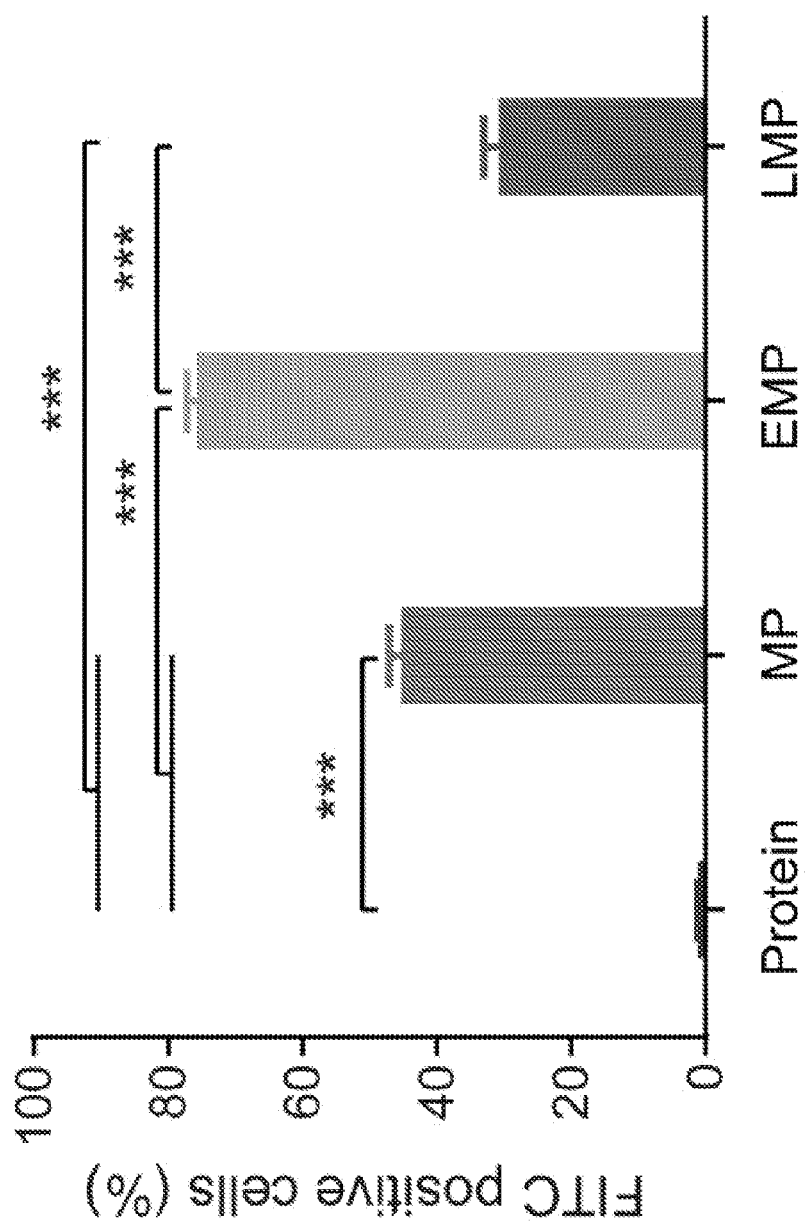
FIG. 21 depicts protein transduction efficiencies of bare protein, MP, EMP, and LMP nanoparticles. *** P<0.001. EMP nanoparticles assist tumor cell targeting and promote the intracellular transduction of protein cargos.

Furthermore, the influence of nanoparticles and EVM camouflage on the intracellular transduction of the protein cargo into MDA-MB-231 tumor cells was studied (FIG. 18D, FIG. 19A-B, and FIG. 20). In comparison to the low efficiency of direct protein transduction (~1.27%), the MP nanoparticles dramatically promote the intracellular delivery of protein cargos with ~43.7% transduction efficiency (percentage of cells transduced). More importantly, the EMP nanoparticles further enhance the transduction efficiency to ~77.5% while the lipids decorated LMP nanoparticles only have a transduction efficiency of ~28.2% (FIG. 21). Thus, EVM camouflage of the MP nanoparticles enables specific targeting to the homotypic cells and significantly enhances the protein transduction efficiency.

Figure 22A:
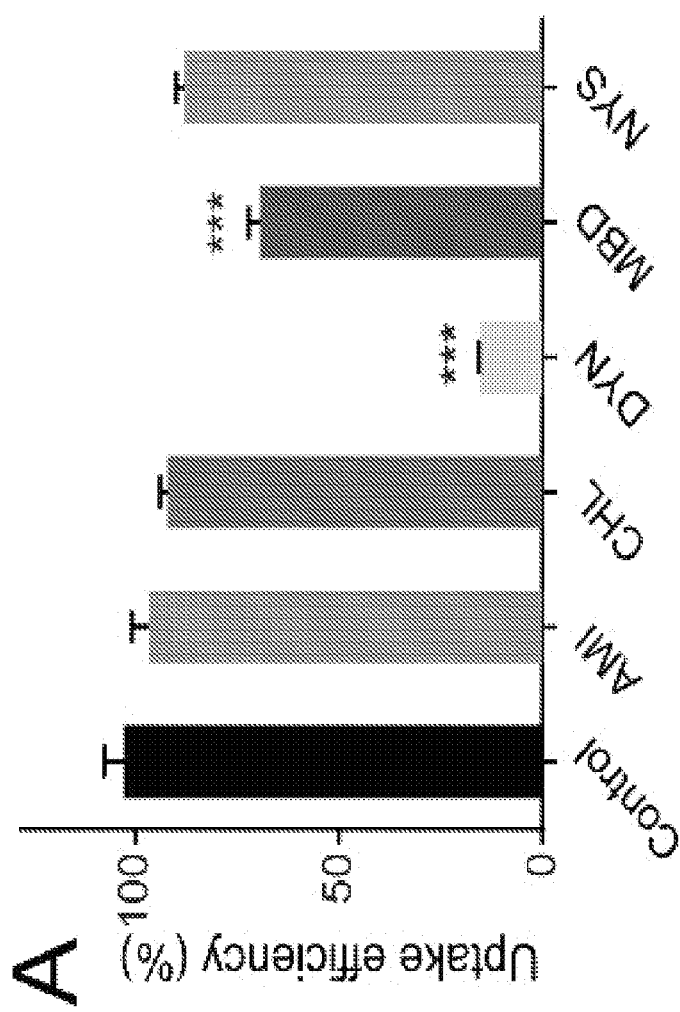
FIGS. 22A-D, depicts that the internalization of EMP nanoparticles goes through an endocytosis pathway.
Figure 22B:
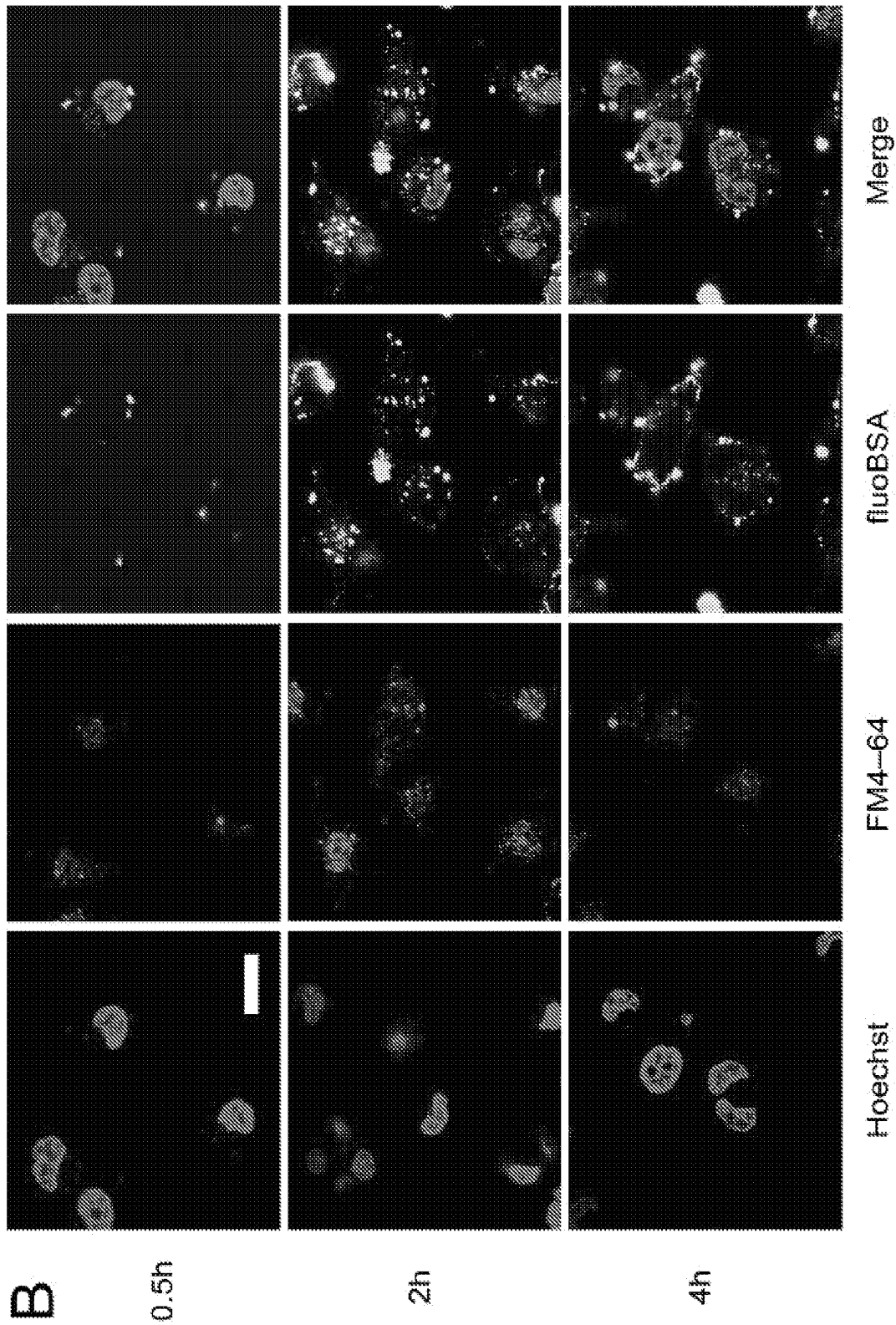
Figure 22C:
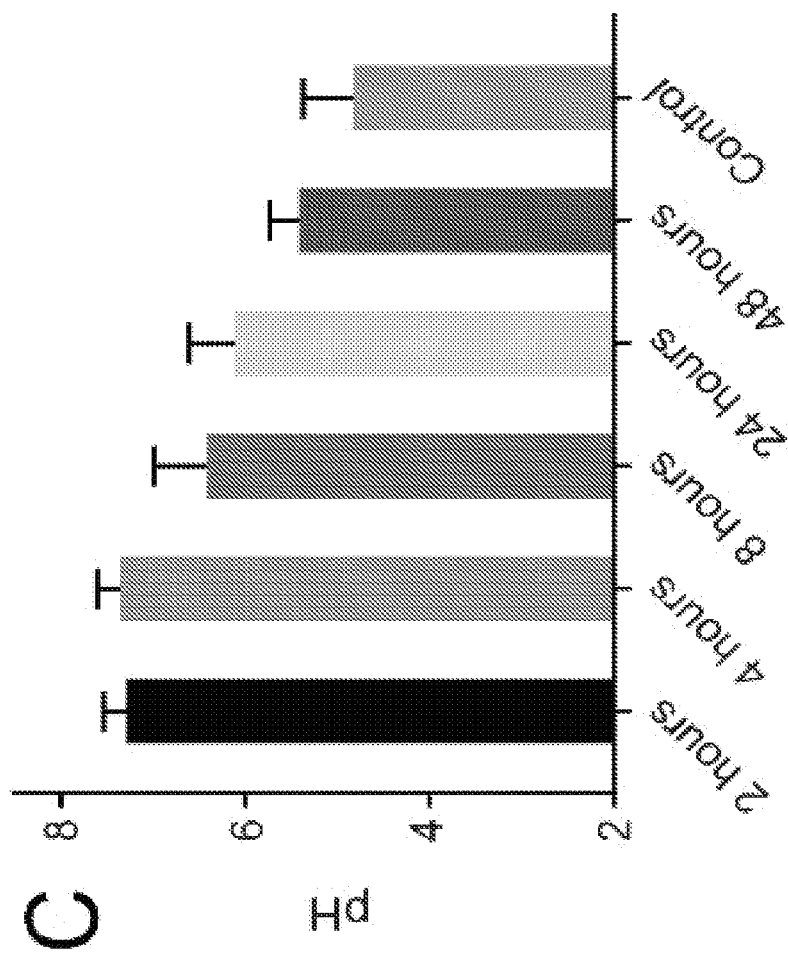
Figure 22D:
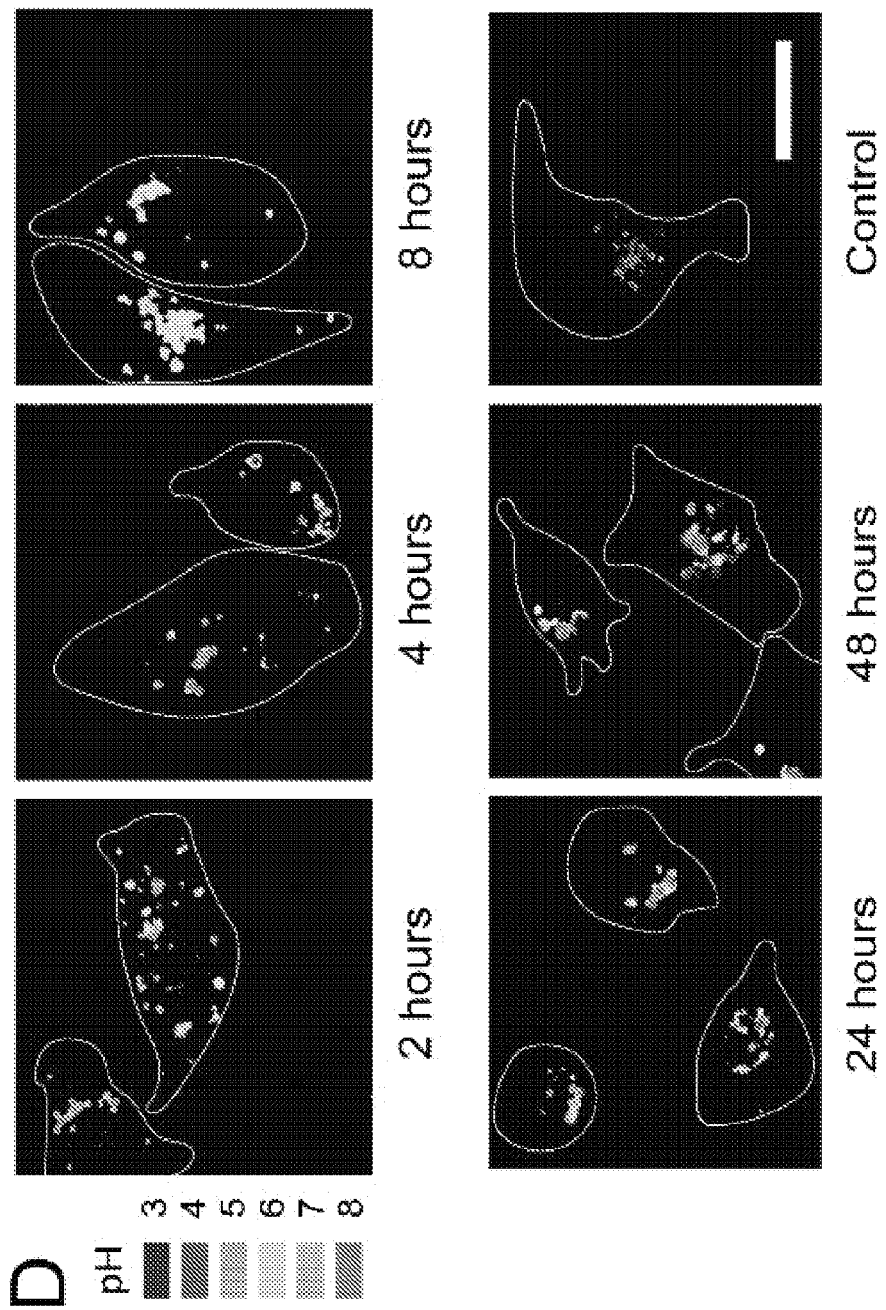
Figures 23A, 23B:
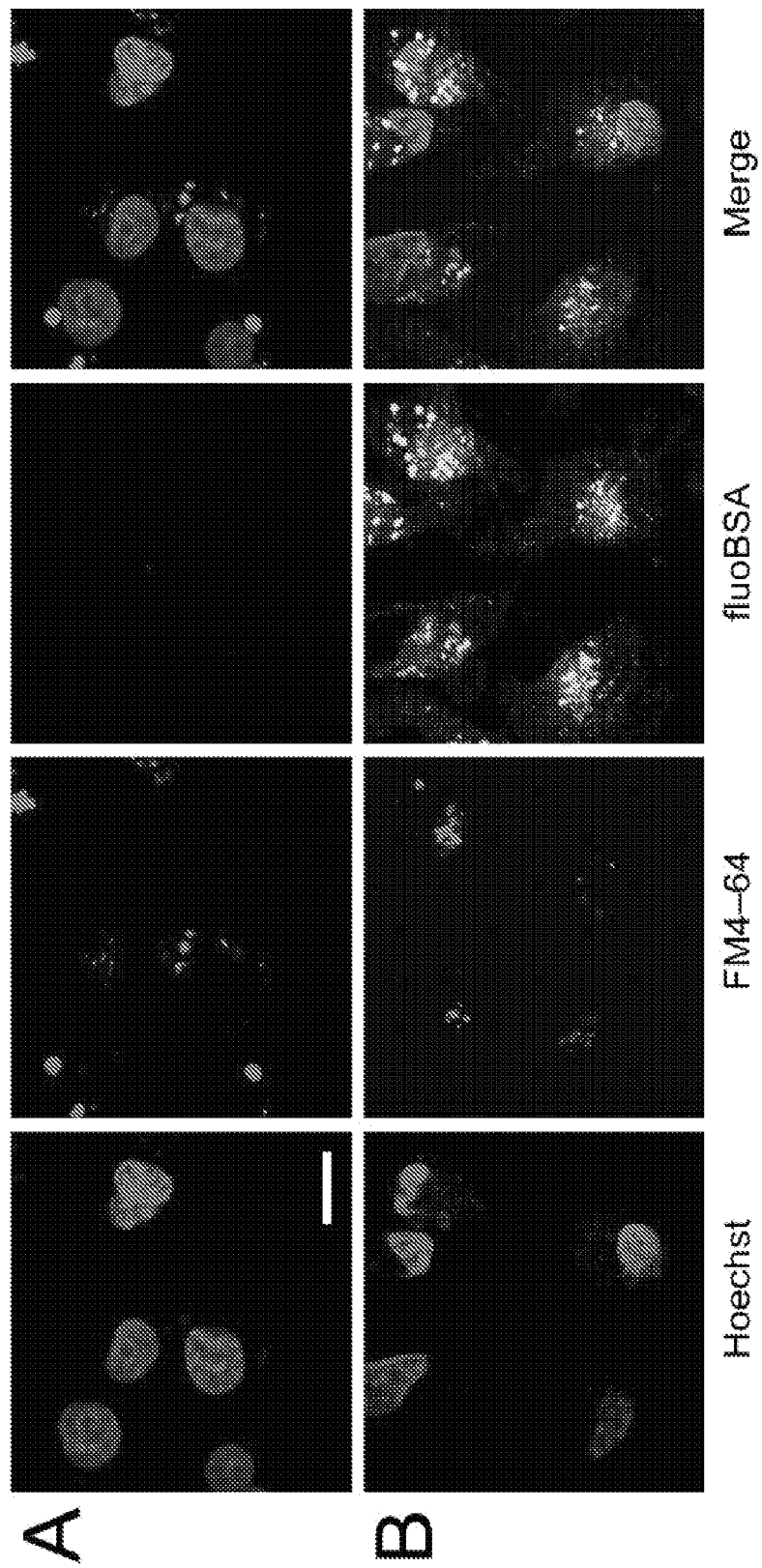
FIGS. 23A-B, depicts laser scanning microscopy analysis.
Figures 24A, 24B, 24C:
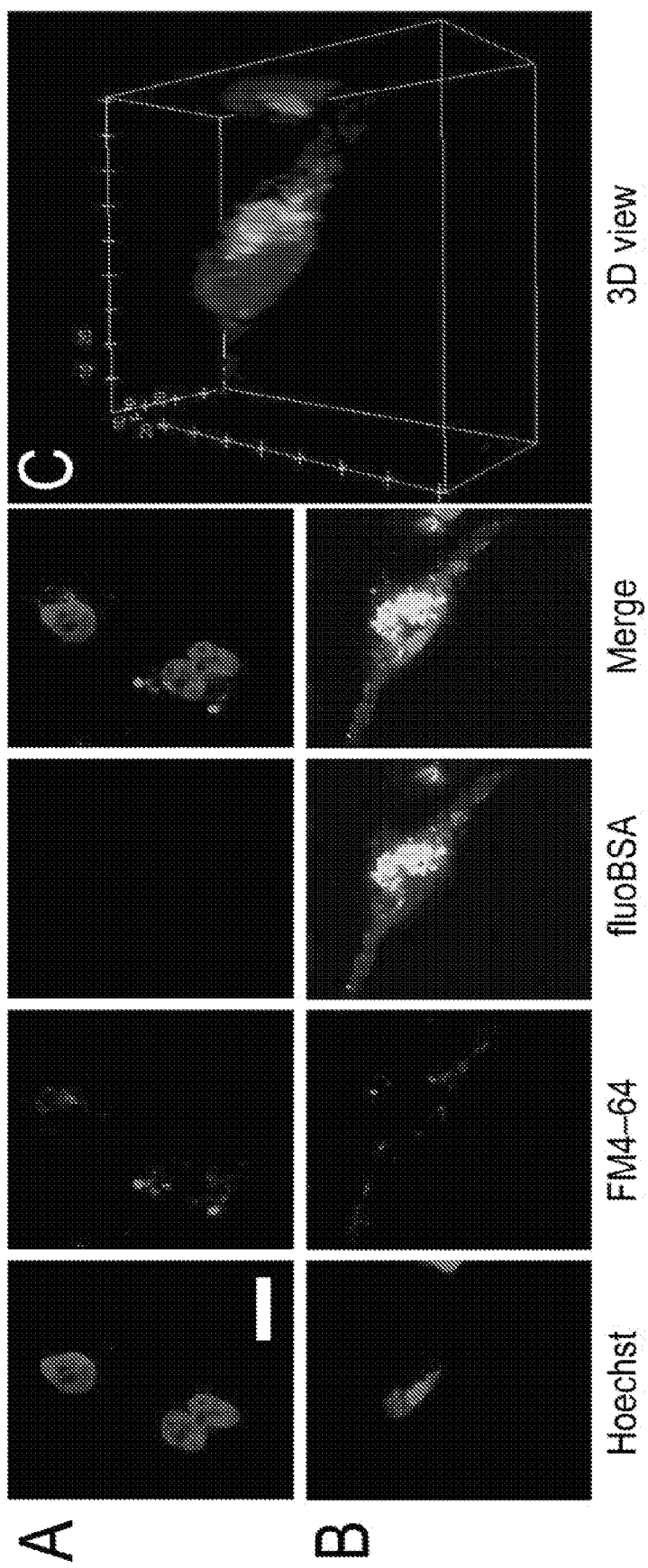
FIGS. 24A-C, depicts laser scanning microscopy analysis.
Figure 25:
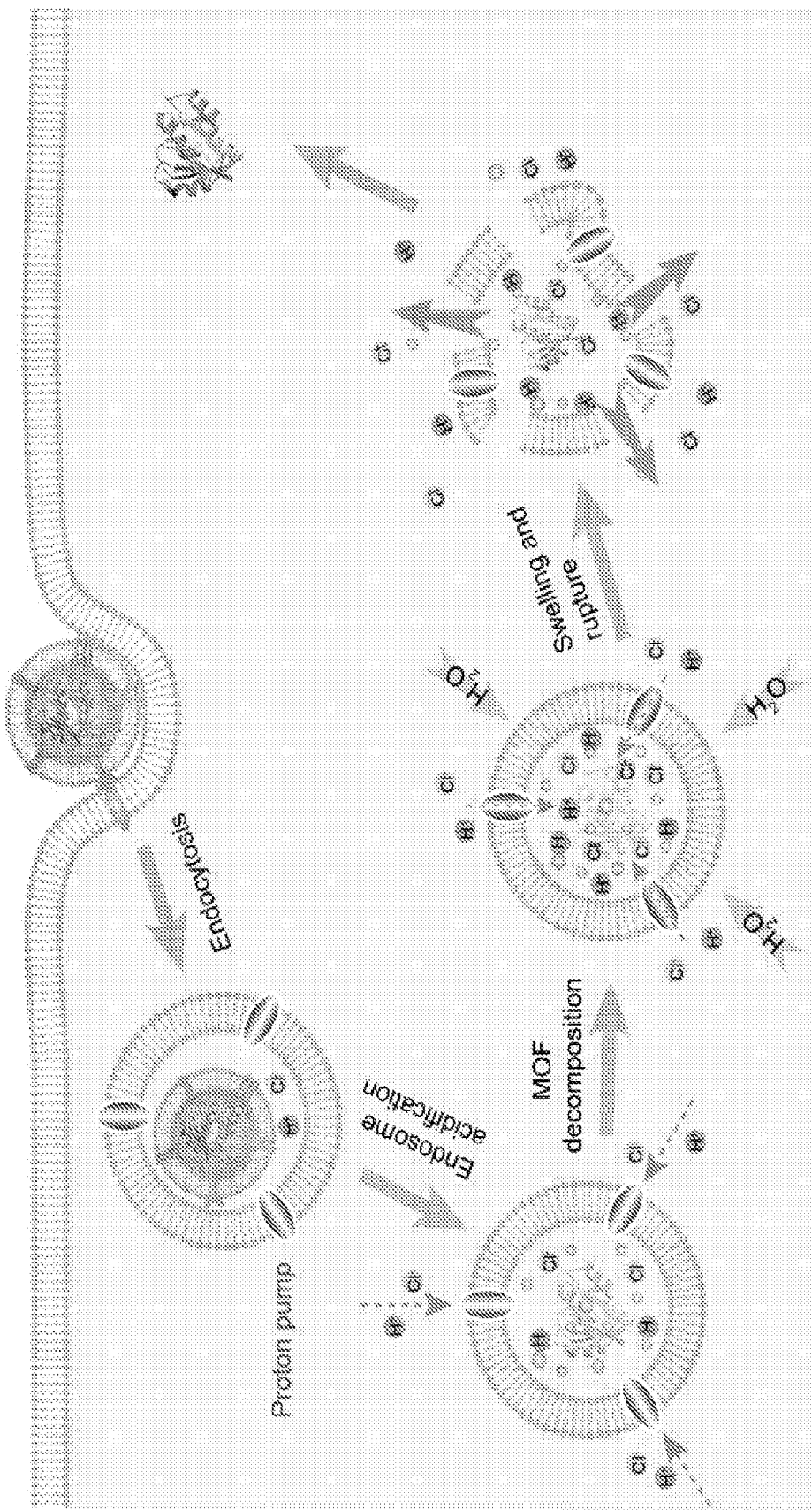
FIG. 25 depicts an illustration of the endosomal escape of EMP nanoparticles by the 'proton sponge' effect. After uptake, the designed pH-sensitive MOF matrix of the EMP nanoparticles can release the organic ligand of imidazole derivative, which has a buffering effect upon protonation of the imidazole ring. Accumulation of protons together with their counter ions in the endosomes stimulates entrance of water from the cytosol to balance the high osmotic pressure inside the endosomes. Swelling of the endosomes in the presence of ligands eventually leads to endosome rupture and release of guest molecules.

Internalization and intracellular release mechanism. To elucidate the internalization mechanism of the EMP nanoparticles, the cells were incubated with various endocytosis inhibitors, including chlorpromazine (CHL, inhibitor of clathrin-mediated endocytosis), amiloride (AMI, inhibitor of $Na^+/H^+$ pump related macropinocytosis), dynasore (DYN, inhibitor of dynamin), methyl-beta-cyclodextrin (MBC, inhibitor of cholesterol-dependent endocytosis), and nystatin (NYS, inhibitor of lipid raft-caveolae endocytosis) (Iversen et al., 2011, Nano Today, 6:176-185; Gilleron et al., 2013, Nat. Biotechnol., 31:638-646). As indicated by flow cytometry analysis (FIG. 22A), inhibitors DYN and MBC resulted in significant reduction of intracellular delivery of proteins, implying EMP nanoparticle uptake is mainly mediated by pathways of dynamin- and cholesterol-dependent endocytosis (Gilleron et al., 2013, Nat. Biotechnol., 31:638-646; Macia et al., 2006, Dev. Cell, 10:839-850). The intracellular trafficking of EMP nanoparticles in MDA-MB-231 cells was analyzed using a red fluorescent endosome marker (FM4-46) to track the endocytosis (FIG. 22B). EMP nanoparticles rapidly attached to the cell membrane within 30 minutes. Colocalization of green fluorescent from the protein with red fluorescence from the endosome was observed in 2 hours, suggesting the EMP nanoparticles entered the endosomes. After 4 hours, considerable depletion of green fluorescence out of endosomes was observed, and the green fluorescence gradually diffused to the whole cytoplasm as time progressed (FIG. 23A-B, and FIG. 24A-C), indicating the successful intracellular delivery of proteins. The mechanism of protein release to the cytosol was then further studied. As shown in FIG. 25, the intracellular release of proteins could be ascribed to the 'proton-sponge' effect (Varkouhi et al., 2011, J. Control. Release, 151:220-228). After internalization by cells, the EMP nanoparticles go through endocytosis pathway, and the intravesicular pH drops along the endocytic pathway, from pH 6.0-6.5 in early endosomes to pH 4.5-5.5 in late endosomes and lysosomes (Sorkin et al., 2002, Nat. Rev. Mol. Cell Bio., 3:600-614). Notably, due to the acid-labile noncovalent bond, the designed pH-sensitive MOF matrix of the EMP nanoparticles can release the organic ligand of imidazole derivative, which shows a buffering effect upon protonation of the imidazole ring (Pack et al., 2000, Biotechnol. Bioeng., 67:217-223; Moreira et al., 2009, Acta Biomaterialia, 5:2995-3006). Using a ratiometric dye (Lysosensor Yellow/Blue DND-160), the lysosomal pH was determined (FIG. 22C), and the evolution of lysosomal pH was observed by the laser scanning microscopy (FIG. 22D). It was observed the intracellular vesicle pH dramatically increased in the first four hours upon incubation with the EMP nanoparticles, due to the buffering effect of the release ligands. Furthermore, the rapid diffusion of zinc ions in the whole cytosol was also observed in a few hours (FIG. 26A-B), indicating the interference with endosome pH would lead to the disruption of the endosomal membrane and release of guest molecules through the 'proton-sponge' effect.

Figures 26A, 26B:
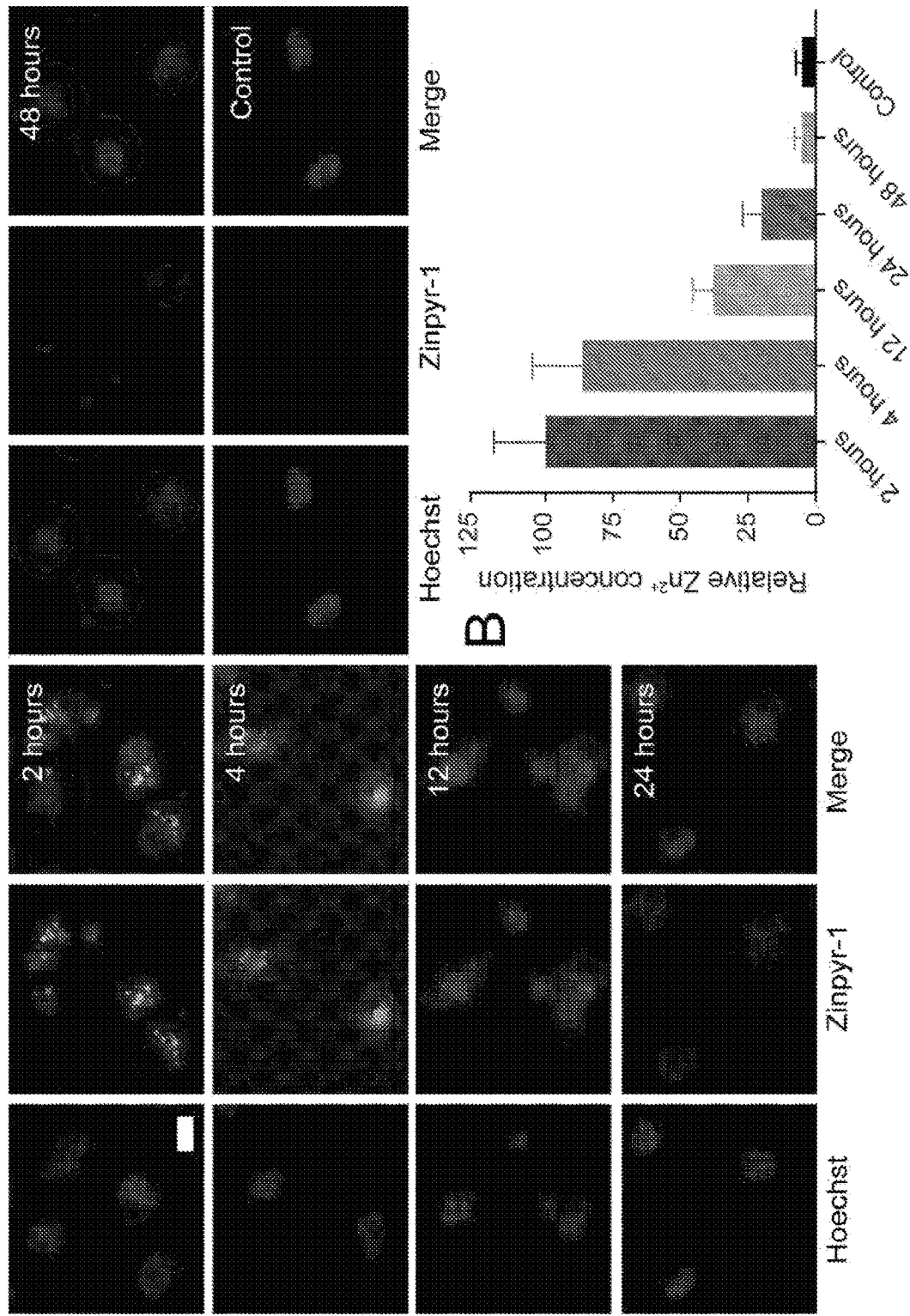
FIGS. 26A-B, depicts the evolution of intracellular zinc ions after internalization of EMP nanoparticles.
Figure 27:
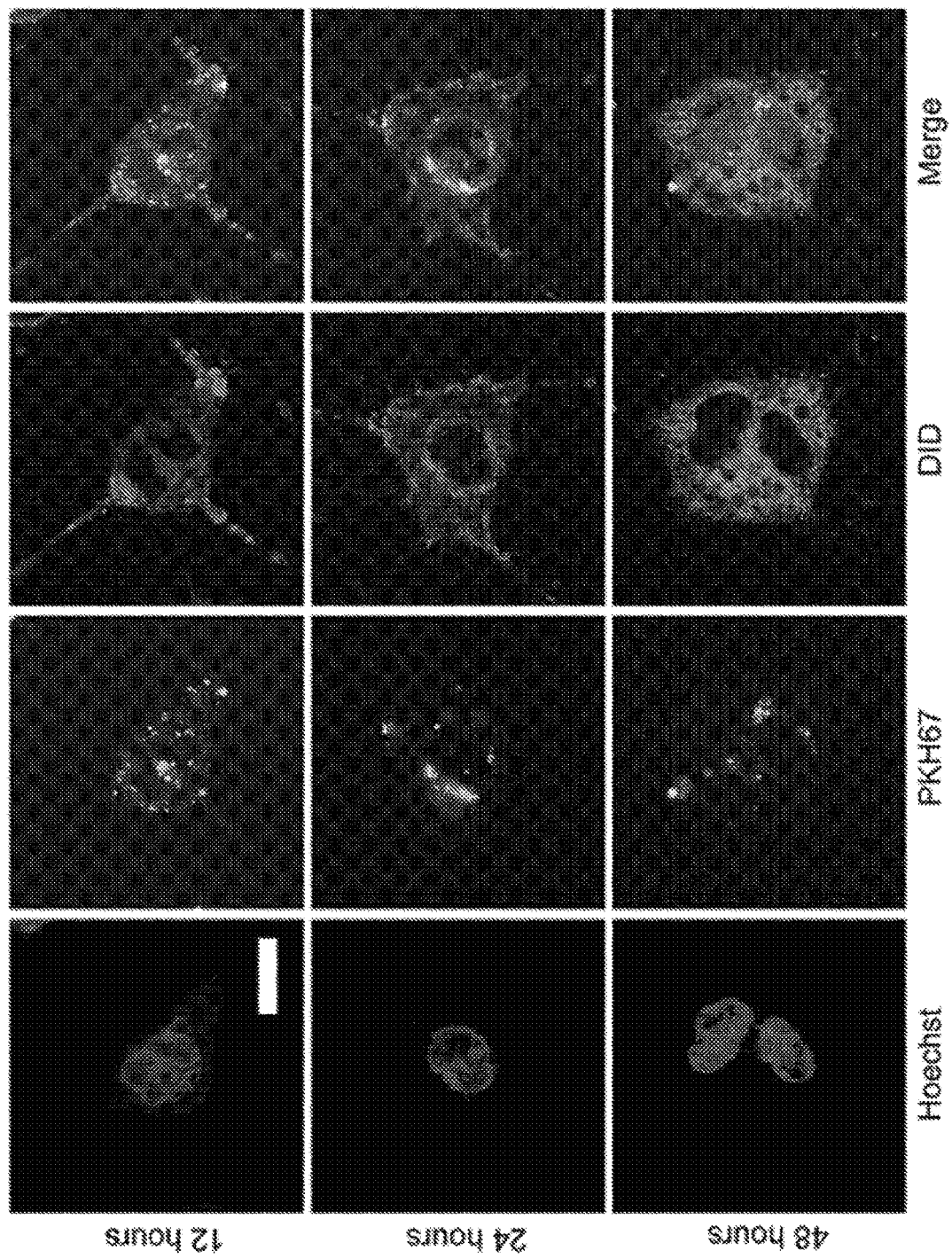
FIG. 27 depicts the time-dependent intracellular evolution and distribution of the EVM from the EMP nanoparticles. EVM was labelled with PKH67 (green channel) before construction of the EMP nanoparticles. MDA-MB-231 cells were stained with a DiD lipophilic dye to label the plasma membrane. Cell nucleus was stained with the Hoechst 33342. Scale bar: 20 μm.
Figures 28A, 28B:
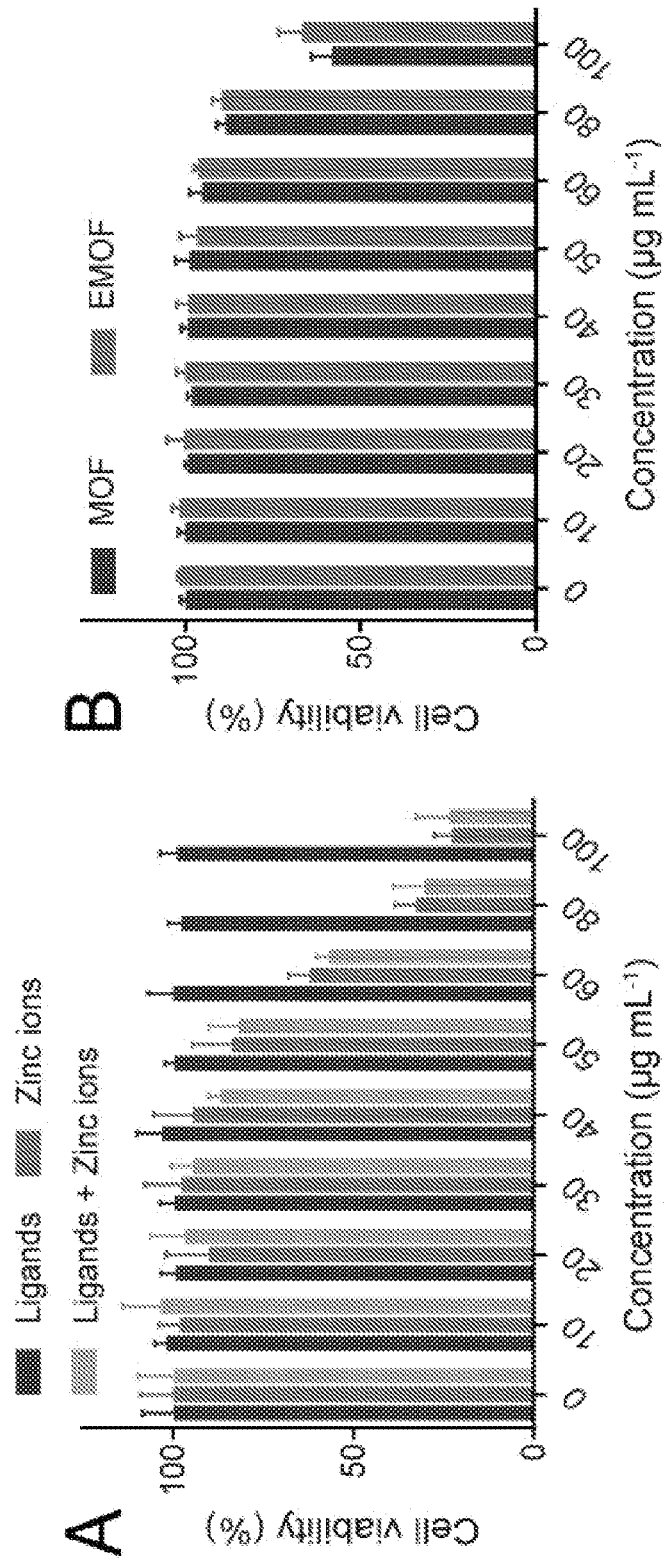
FIGS. 28A-B, depicts biocompatibility assays of the EMP nanoparticles.
Figure 29A:
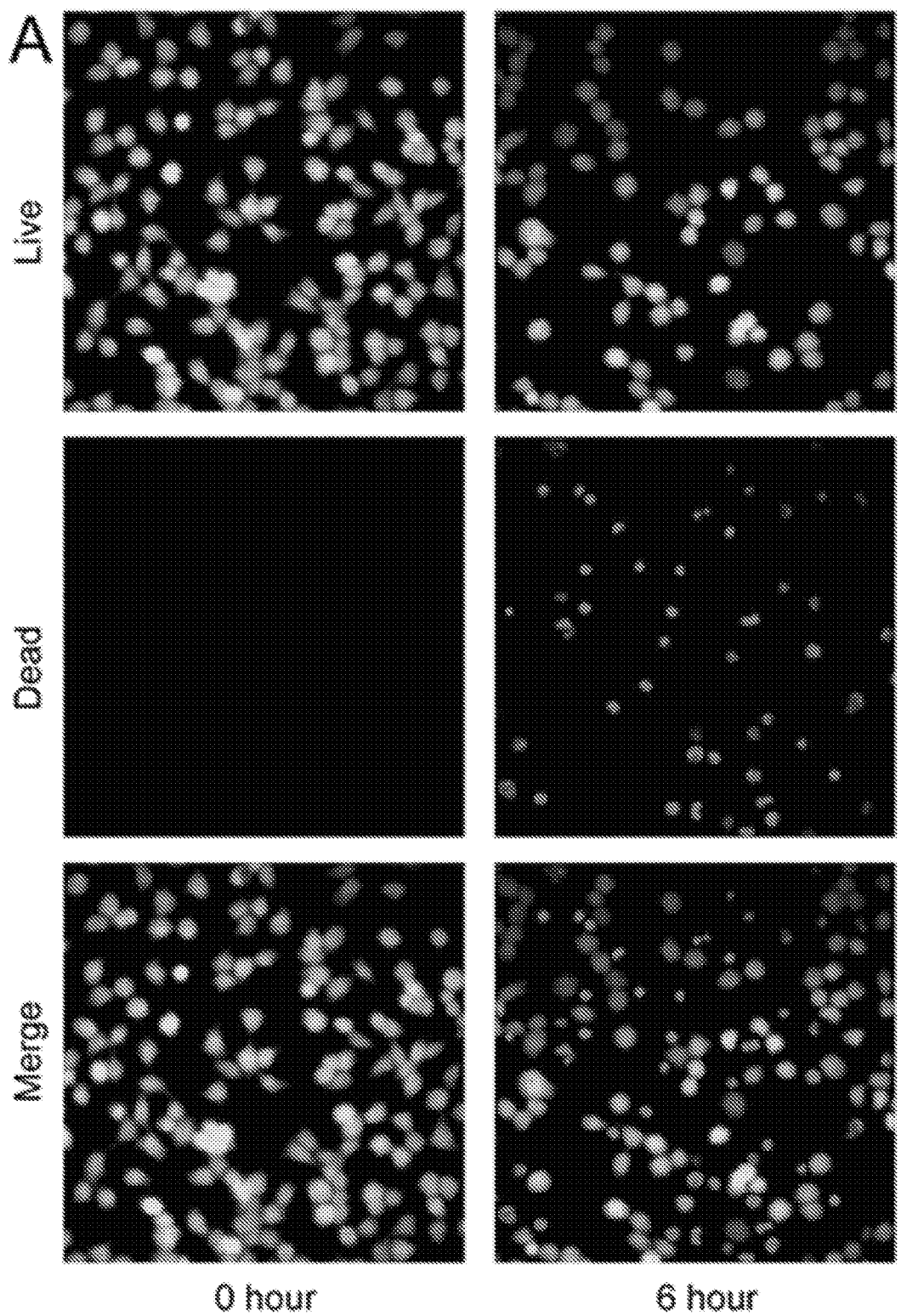
FIGS. 29A-D, depicts that biomimetic EMP nanoparticles with encapsulated therapeutic proteins gelonin can promote the protein transduction in vitro and in vivo for inhibition of MDA-MB-231 tumor growth.
Figures 29B, 29C, 29D:
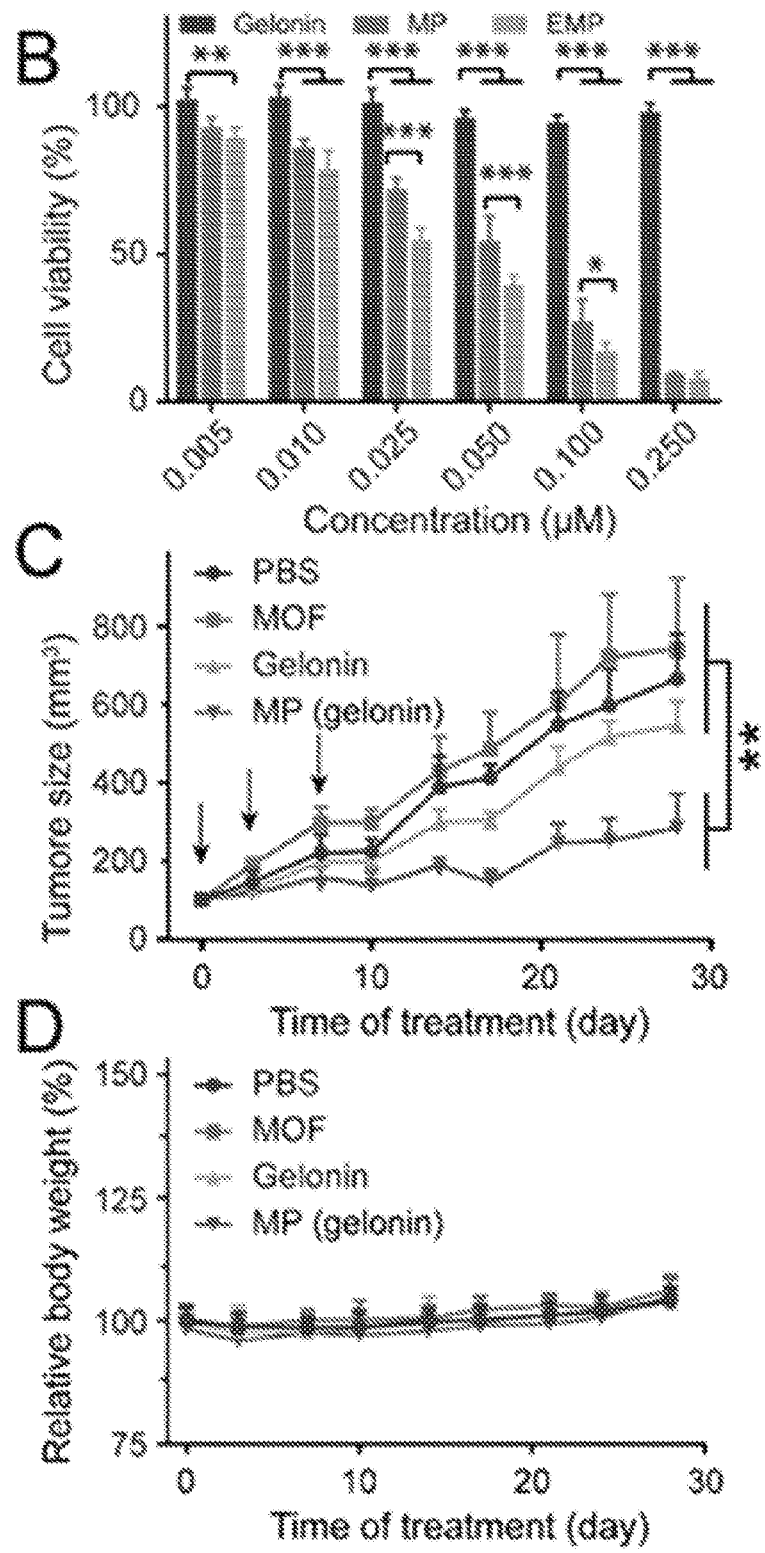

EMP nanoparticles suppress tumor growth in mouse xenograft model. Before application of the EMP nanoparticle in intracellular delivery of therapeutic proteins, the intracellular evolution of their components and the biocompatibility was studied. FIG. 26A-B reveals the intracellular evolution of the zinc ions upon internalization of EMP nanoparticles. Apparently, the released zinc ions were secreted out of the cells in several hours, because cells have a complex and important zinc homeostasis system, and there are many proteins that are dedicated to $Zn^{2+}$ transport and buffering (Eide, 2005, Biochimica et Biophysica Acta (BBA)-Molecular Cell Rsearch, 1763:711-722). Interestingly, different from rapid clearance of the zinc ions from the intracellular environment, the EVM component from the internalized EMP decayed relatively slow. As shown in FIG. 27, after internalization for 12 hours, EVM was mainly located in the perinuclear region and cell peripheries. Furthermore, the colocalization of green and red fluorescence was observed, which may be due to the fusion of EVM with cellular membrane (Parolini et al., 2009, J. Biol. Chem. 284:34211-34222). After internalization for 24 hours, a large amount of green fluorescence located in the cell peripheries disappeared, implying the part of EVM was expelled out of the cell. In addition, considerable green fluorescence was still located in the perinuclear region and colocalized with the red fluorescence, implying the EVM with abundant sphingomyelin may recycle back to the plasma membrane (Koivusalo et al., 2007, Mol. Biol. Cell, 18:5113-5123). With the extension of time, diffused and decreased green fluorescence from EVM was observed, indicating the gradual clearance or transformation of EVM. The cell toxicity of the EMP nanoparticles and their components was also checked. As shown in FIG. 28A-B, the nanoparticles and materials have no significant cytotoxicity at the reasonably low dosage used in the subsequent experiments.

To further study the effectiveness of MP and EMP nanoparticles for protein transduction and their therapeutic potential, encapsulation, and delivery of bioactive therapeutic proteins in vitro and in vivo were studied. Gelonin, an N-glycosidase protein with a molecular weight of 28 kDa, triggers cell apoptosis by cleaving a specific glycosidic bond in rRNA and thereby disrupting protein synthesis (Veenendaal et al., Proc. Natl. Acad. Sci., 99:7866-7871). However, besides the susceptibility and the fragile nature of the protein, unlike other ribosomal toxins (e.g. ricin and abrin), gelonin lacks a translocation domain and thus its intracellular delivery is a great challenge (Chu et al., 2006, Cancer Res., 66:5989-5992). Gelonin proteins were caged into MP nanoparticles and further camouflaged with EVM derived from MDA-MB-231 cells as the EMP nanoparticles. The therapeutic potential of the MP and EMP nanoparticles was first examined by assessing the in vitro cytotoxicity of nanoparticles against MDA-MB-231 cells using the CCK-8 assay. Without loading the therapeutic proteins, the MOF nanoparticles and EVM enveloped EMOF nanoparticles have no significant cytotoxicity to MDA-MB-231 cells under 80 μg mL$^{-1}$ (FIG. 28B). However, cell live-dead assay clearly reveals that massive cell apoptosis happened within 6 hours after incubation with the EMP nanoparticles (FIG. 29A-D). MP and EMP nanoparticles with loaded gelonin induce significant cell apoptosis, and the EMP nanoparticles have a significantly lower half-maximal inhibitory concentration (IC50: ~0.025 μM) than that (IC50: ~0.05 UM) of MP nanoparticles (FIG. 29B), while the dose is about 5-10 times lower than that in previous studies (Veenendaal et al., 2002, Proc. Natl. Acad. Sci., 99:7866-7871; Ellington et al., 2005, Cancer Res. 65:1455). In contrast, native gelonin has no apparent cytotoxicity against MDA-MB-231 cells due to their poor membrane permeability. The effectiveness of intracellular delivery of gelonin by nanoparticles in vivo was further checked. To evaluate the in vivo toxicity, PBS, MOF nanoparticles, gelonin and gelonin-loaded MP nanoparticles were injected directly into the mouse orthotopic xenograft tumors formed with MDA-MB-231 cells, respectively. Similar to the in vitro results, negligible therapeutic effect (P>0.1) was observed in the mice treated with empty MOF nanoparticles or gelonin alone (Figure S24C), while intratumoral injection of gelonin-loaded MP nanoparticles shows remarkably inhibition effect towards tumor growth, indicating the successful intracellular delivery of the bioactive proteins in vivo. Besides, no significant change of mice body weight was observed during the treatment (FIG. 29D), implying the safety of the nanoparticles.

Figure 30A:
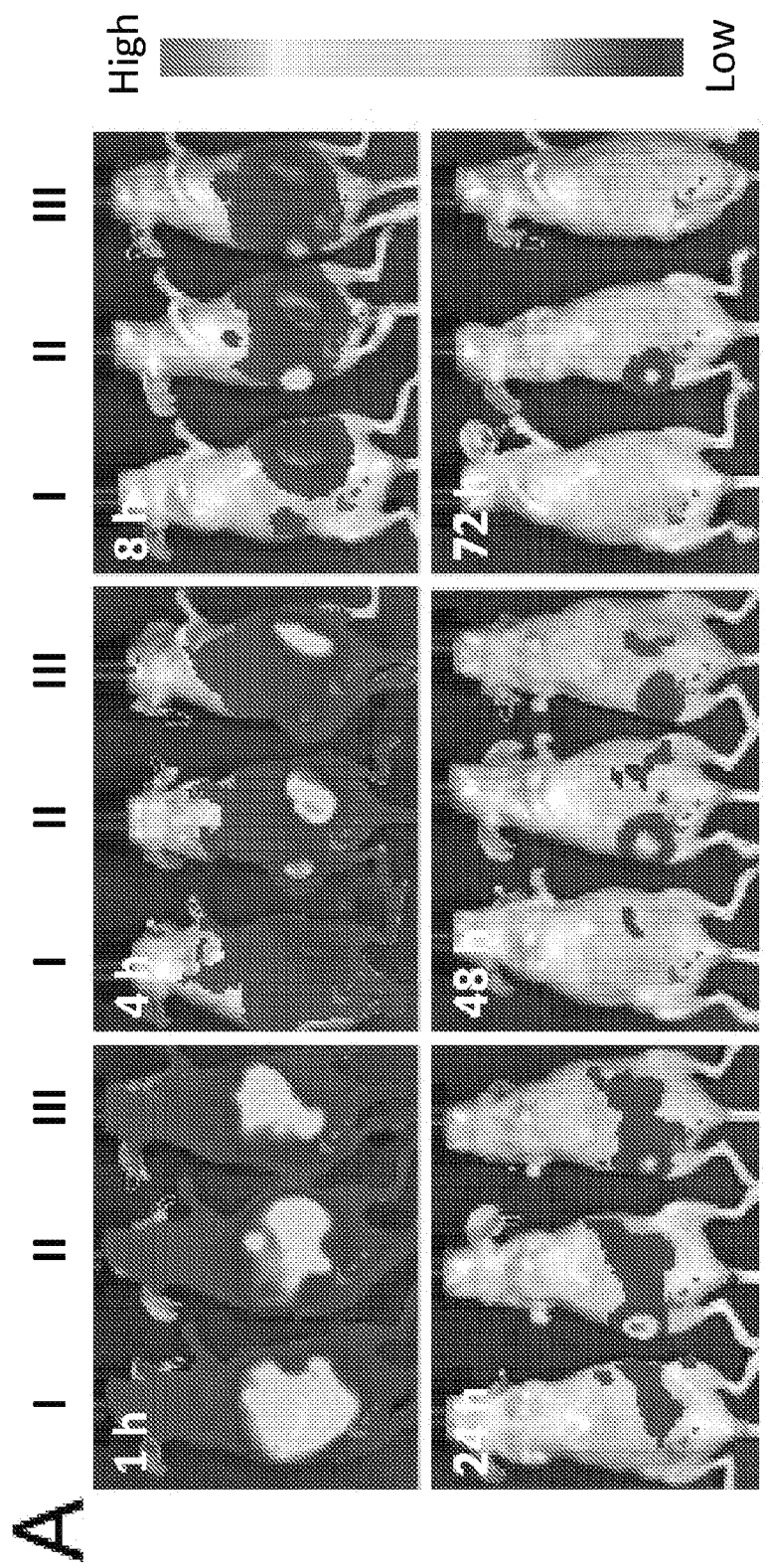
Figure 30E:
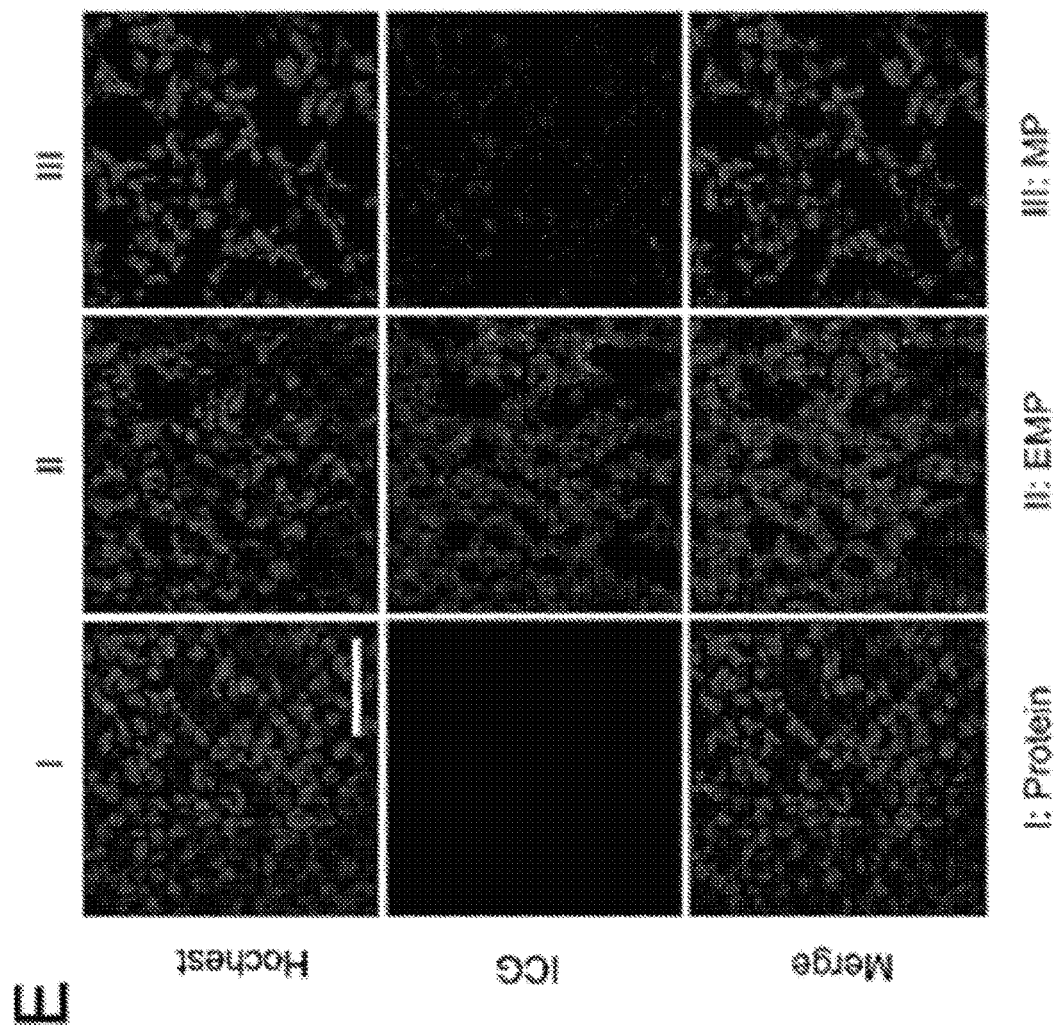

After camouflaging with EV membrane, systemic delivery of therapeutic proteins by the EMP nanoparticles was achieved. To evaluate the tumor targeting capability of EMP nanoparticles, EMP nanoparticles loaded with indocyanine green (ICG)-labeled proteins (gelonin) were administrated into the MDA-MB-231 tumor-bearing mice intravenously via the tail vein. Mice injected with EMP or MP nanoparticles exhibited apparent fluorescence signal at the tumor sites after 4 hours post-injection (FIG. 30A), indicating the accumulation of nanoparticles at the tumor sites. Moreover, the mice group treated with EMP nanoparticles camouflaged with MDA-MB-231 EVM showed much higher fluorescence intensity than the groups of mice treated with protein and MP nanoparticles, indicating the notable targeting ability of EMP nanoparticles. As time extended, EMP nanoparticles continuously accumulated at the tumor site in the first 24 hours. Relatively strong fluorescence could be observed even after 72 hours, while fluorescent signals from other parts of the body were undetectable anymore (FIG. 30B). Mice were euthanized after 3 days, and tumor and major organs were retrieved for ex vivo imaging. The retained fluorescence intensity of the EMP nanoparticles at tumor sites is significantly higher than those of other organs and those of the protein along and the MP nanoparticle groups (FIG. 6C). Quantitative region-of-interest (ROI) analysis shows that fluorescence intensity at the tumor sites of mice treated with the EMP nanoparticle is about 11 and 4 folds higher than those treated with protein alone and MP nanoparticles (FIG. 30D), respectively. Additionally, the promoted protein transduction efficiency was confirmed by laser scanning microscopy analysis of the cryosections of the tumors (FIG. 30E). Apparently, much brighter red fluorescence from ICG labels was observed in the mouse tumor cryosection samples treated with the EMP nanoparticles than those treated with native proteins or the MP nanoparticles. Taken together, the above results demonstrate that the EVM camouflage can alleviate the rapid clearance of nanoparticles, selectively target their homotypic tumors and promote the proteins intracellular transduction.

Figures 31A, 31B, 31C, 31D:
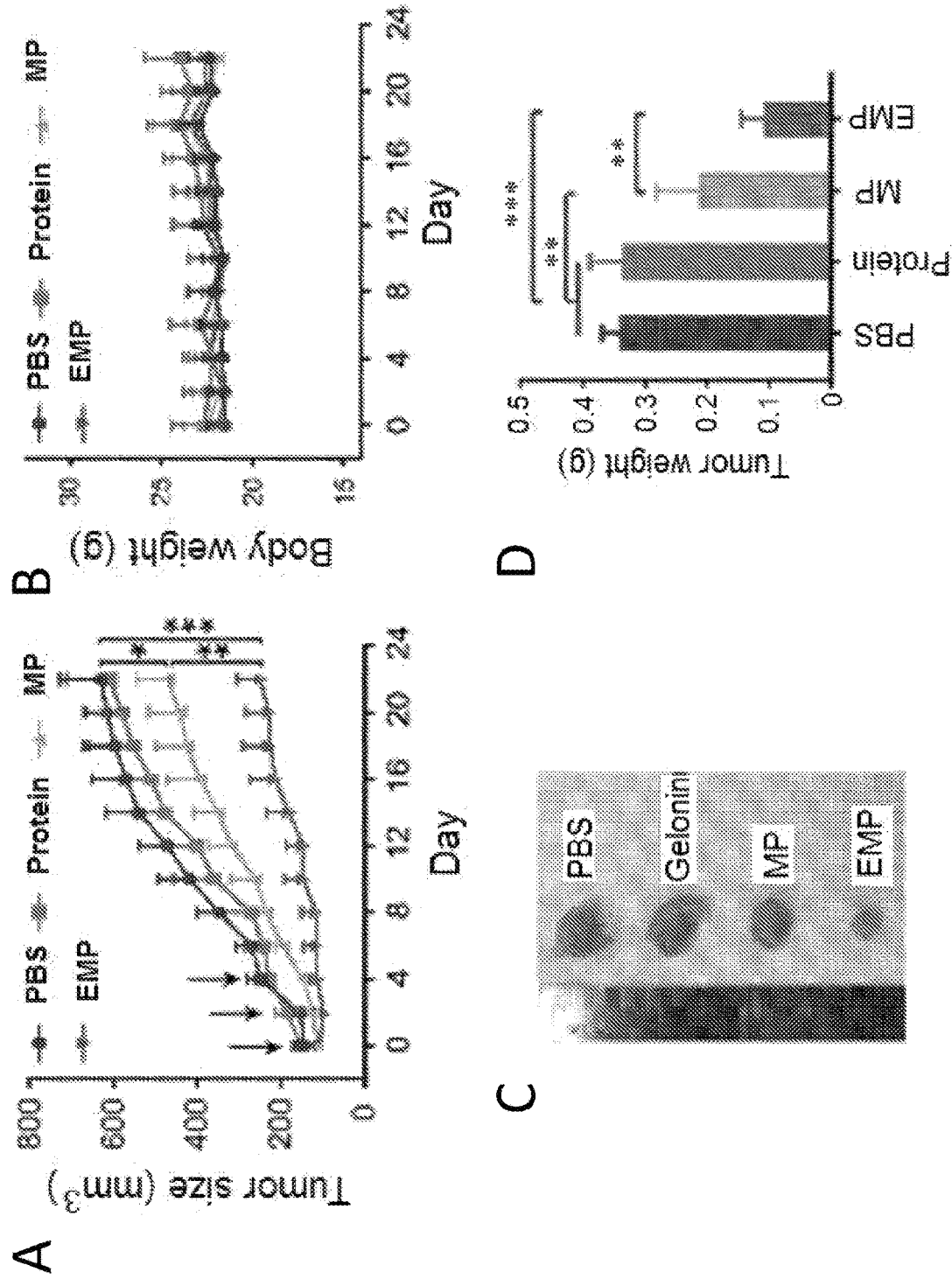
FIGS. 31A-H, depicts the systemic transduction of therapeutic proteins (gelonin) for inhibition of tumor growth.
Figures 31E, 31F, 31G:
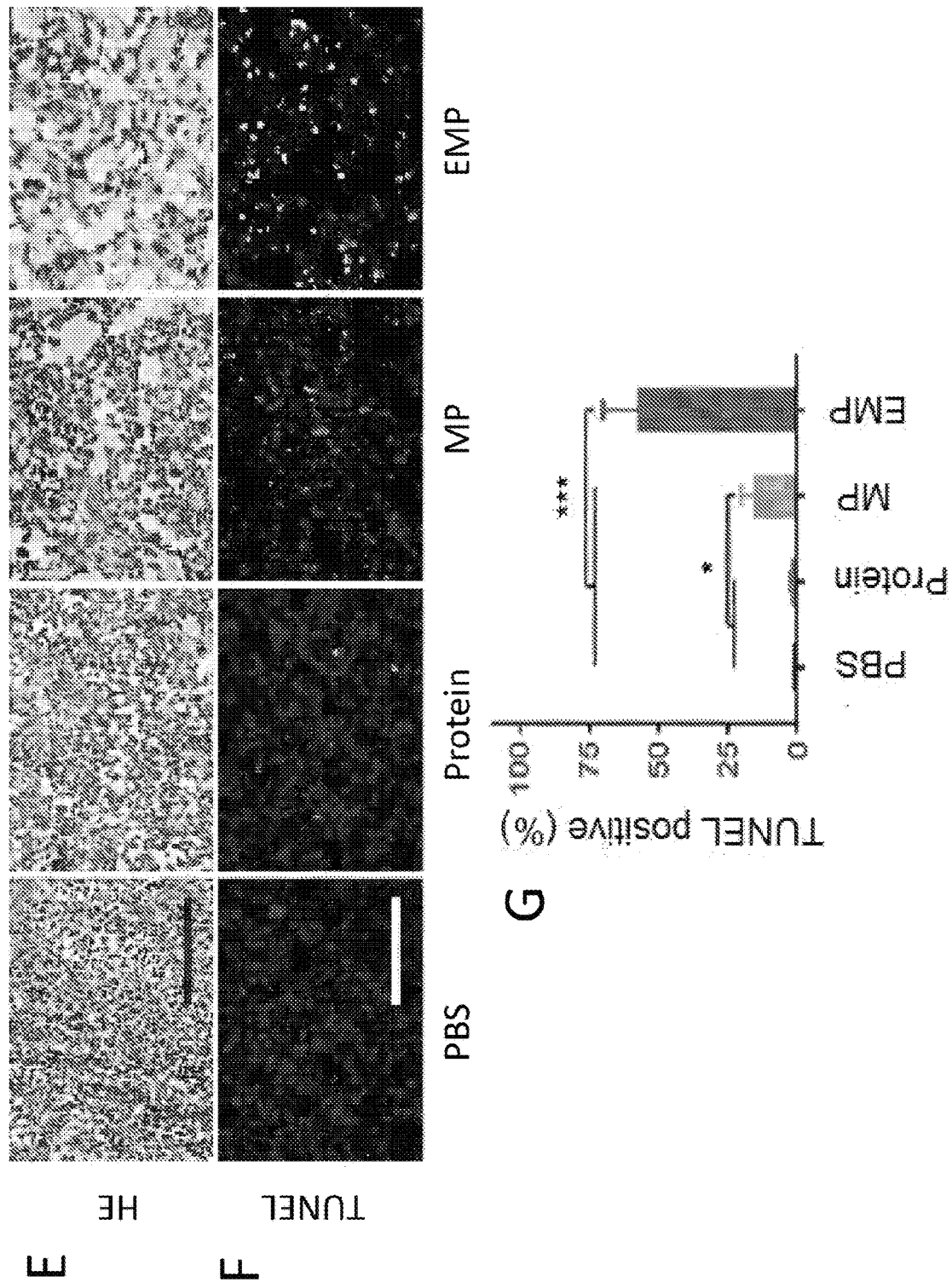
Figure 31H:
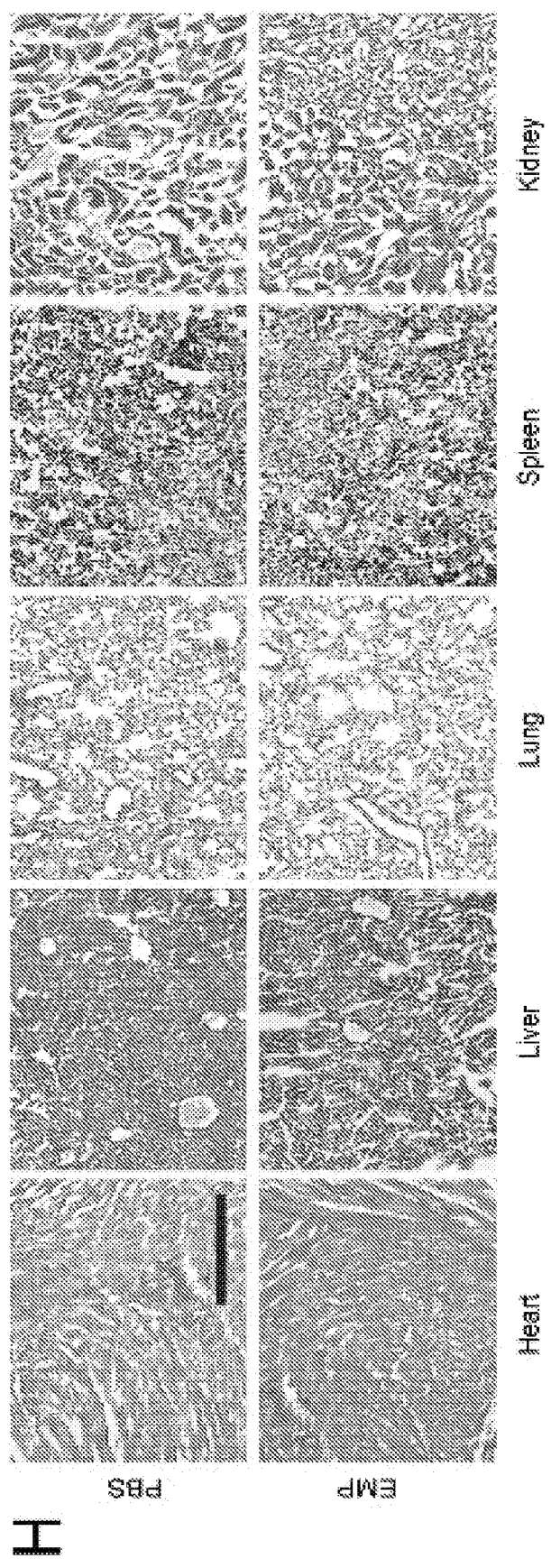
Figure 32:
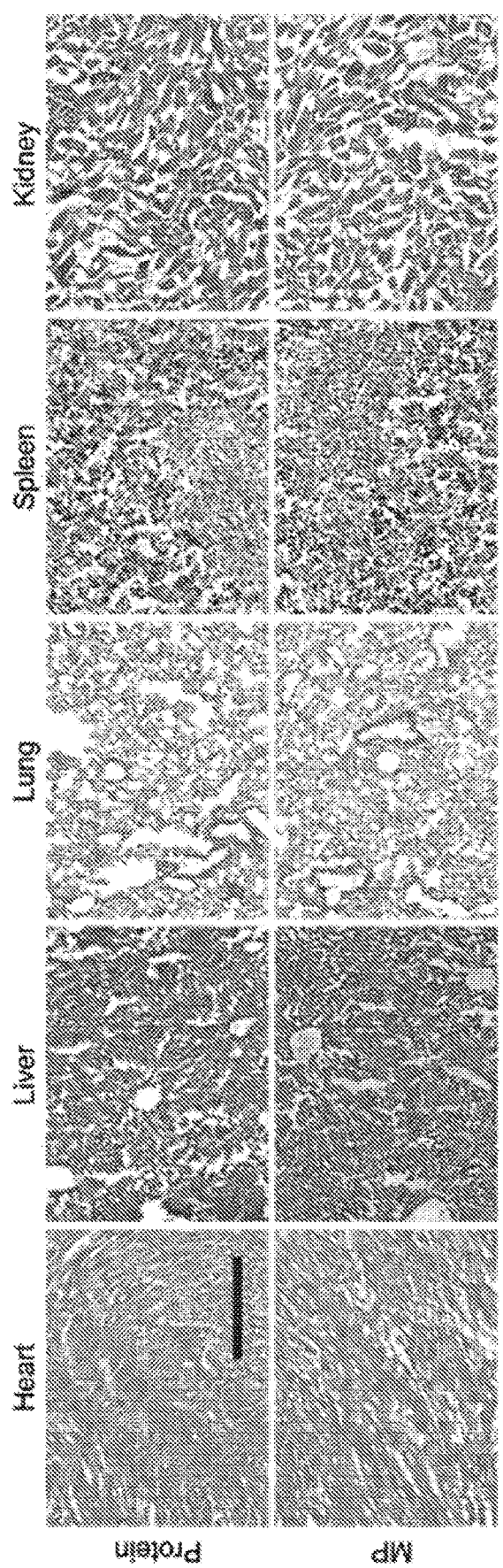
FIG. 32 depicts histological (H&E) analysis of main organs from mice and shows no evident systemic toxicity of the nanoparticles after intravenous injection of gelonin protein and MP nanoparticles for 22 days. Scale bar: 100 μm.

The potential of systemic delivery, homotypic targeting and intracellular transduction of therapeutic proteins by the EMP nanoparticles to inhibit tumor growth in vivo was then studied using the orthotopic MDA-MB-231 tumor-bearing mice. Apparently, in comparison to the PBS control group, no significant difference was observed on the tumor growth after intravenous injection of native gelonin (FIG. 31A). However, the EMP and MP nanoparticles can effectively inhibit the tumor growth. More importantly, tumor size in mice treated with the EMP nanoparticles is significantly smaller than those in all other groups, revealing the camouflage of EVM remarkably improves the therapeutic efficacy. In addition, during the treatment, no significant difference in the body weight of mice was observed among different groups (FIG. 31B). Tumors were also collected and weighted after euthanasia of mice (FIG. 31C, D), which further confirms the therapeutic effect of EMP nanoparticles. Histologic analysis of the tumor sections stained with the hematoxylin and eosin (H&E) indicate an apparent decrease of tumor cell density in tumor tissue after systemic administration of the EMP nanoparticles (FIG. 31E). Besides, in situ TUNEL assay clearly demonstrates massive cell apoptosis in the tumor tissue after treatment by the EMP nanoparticles (FIG. 31F), which is about 4 folds of the group treated with the MP nanoparticles (FIG. 31G). On the contrary, PBS and gelonin alone treatments resulted in negligible cell apoptosis. Histological examination of the main organs including heart, liver, lung, spleen, and kidney finds no pathological abnormalities in the mice treated with native gelonin, MP nanoparticles or EMP nanoparticles (FIG. 31H and FIG. 32), indicating negligible systemic toxicity of the gelonin proteins and the MP and EMP nanoparticles. Collectively, the EVM camouflaged EMP nanoparticles can apparently target homotypic tumor tissue, assist intracellular transduction of therapeutic protein in systemic delivery, and show high potency for inhibition of tumor growth with minimal toxicity to other major organs.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A nanoparticle comprising:
   an outer surface comprising an extracellular vesicle membrane (EVM) removed from an extracellular vesicle (EV) of a cancer cell of a type of cancer such that the EVM substantially lacks tumorigenic constituents of the EV from which the EVM is derived, the EVM being between 20 nanometers (nm) and 200 nm in size;
   an inner core comprising a metal-organic framework element including at least one metal ion and at least one organic molecule linker compound, the metal-organic framework element formed via mixing (i) a first aqueous solution comprising the at least one organic molecule linker compound and an agent, wherein the at least one organic molecule linker includes 2-methylimidazole and the agent includes a protein or a nucleic acid, with (ii) a second aqueous solution comprising zinc, wherein a ratio of moles of zinc to moles of the at least one organic molecule linker compound is between 0.01 and 0.1 so that the metal-organic framework element encapsulates the protein or the nucleic acid so that the inner core is positionable within the EVM having the size of between 20 nm and 200 nm,
   wherein the EVM of the outer surface coating enveloping the metal-organic framework element therein so that the nanoparticle is deliverable to a cancer cell of the type of cancer, the metal-organic framework element facilitating intracellular transduction of the the protein or the nucleic acid to the cancer cell via a pH sensitive release of the the protein or the nucleic acid complex into the cancer cell.

2. The nanoparticle of claim 1, wherein the at metal-organic framework element encapsulates the protein.

3. The nanoparticle of claim 2, wherein the cancer cell of the type of cancer from which the EV is derived is a tumor cell of the type of cancer.

4. The nanoparticle of claim 3, wherein the tumor cell is from supernatants of cultured tumor cells or a tumor of a patient.

5. The nanoparticle of claim 3, wherein the EVM entirely lacks tumorigenic contents constituents of the EV from which the EVM is derived.

6. A method of targeted delivery of a protein to a cell, the method comprising administering to a subject a composition comprising a nanoparticle of claim 2.

7. The nanoparticle of claim 1, wherein the nanoparticle comprises a loading capacity of about 20% to 41% for a bovine serum albumin (BSA) concentration range of 1-2 mg/mL.

8. The nanoparticle of claim 2, wherein the nanoparticle comprises a loading capacity of about 20% to 41% for a bovine serum albumin (BSA) concentration range of 1-2 mg/mL.

9. The nanoparticle of claim 1, wherein the EVM entirely lacks tumorigenic constituents of the EV from which the EVM is derived.

10. The nanoparticle of claim 1, wherein the EVM substantially lacks tumorigenic constituents of the EV from which the EVM is derived such that the EVM lacks between 70% and 100% of the tumorigenic constituents of the EV.

11. The nanoparticle of claim 2, wherein the EVM substantially lacks tumorigenic constituents of the EV from which the EVM is derived such that the EVM lacks between 95% and 100% of the tumorigenic constituents of the EV.

12. The nanoparticle of claim 1, wherein the at least one organic molecule linker includes functional groups selected from the group consisting of a carboxylate, a phosphonate, an amine, an azide, a cyanide, a squaryl, an imidazole, and mixtures thereof.

13. The nanoparticle of claim 12, wherein the EVM encapsulates the metal-organic framework element via mixing of a solution having the EVM and the metal-organic framework at a ratio that ranges between 10:1 to 1:1 on a mass basis via ultrasonication to induce self-assembly of the EVM to the metal-organic framework element.

14. The nanoparticle of claim 13, wherein the metal-organic framework element encapsulates the protein.

15. The nanoparticle of claim 14, wherein the EVM has a diameter of between 20 nanometers (nm) and 100 nm.

16. The nanoparticle of claim 1, wherein the EVM has a diameter of between 20 nanometers (nm) and 100 nm.

17. The nanoparticle of claim 1, wherein the EVM substantially lacks tumorigenic constituents of the EV from which the EVM is derived such that the EVM lacks between 97% and 100% of the tumorigenic contents of the EV from which the EVM is derived.

18. The nanoparticle of claim 1, wherein the EVM substantially lacks tumorigenic constituents of the EV from which the EVM is derived such that the EVM lacks tumorigenic contents of the EV from which the EVM is derived and also lacks an entirety of proteins of the EV from which the EVM is derived and/or also lacks an entirety of nucleic acids of the EV from which the EVM is derived.

* * * * *